(12) United States Patent
Gocho et al.

(10) Patent No.: US 9,931,883 B2
(45) Date of Patent: *Apr. 3, 2018

(54) IMAGE DISPLAY AND LABELED DEVICE

(71) Applicant: TOPPAN PRINTING CO., LTD., Tokyo (JP)

(72) Inventors: Satoshi Gocho, Tokyo (JP); Takayoshi Hayashi, Tokyo (JP); Yasushi Kishimoto, Tokyo (JP); Toshiki Toda, Tokyo (JP); Akira Nagano, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,273

(22) Filed: Dec. 20, 2016

(65) Prior Publication Data

US 2017/0100956 A1 Apr. 13, 2017

Related U.S. Application Data

(63) Continuation of application No. 13/362,480, filed on Jan. 31, 2012, now Pat. No. 9,557,457, which is a
(Continued)

(30) Foreign Application Priority Data

Aug. 13, 2009 (JP) .................................. 2009-187654
Feb. 19, 2010 (JP) .................................. 2010-034799
(Continued)

(51) Int. Cl.
*B42D 25/328* (2014.01)
*B42D 25/324* (2014.01)
(Continued)

(52) U.S. Cl.
CPC ........... *B42D 25/328* (2014.10); *B42D 25/21* (2014.10); *B42D 25/24* (2014.10); *B42D 25/324* (2014.10);
(Continued)

(58) Field of Classification Search
CPC .... B42D 15/10; G02B 5/0236; G02B 5/0257; G02B 5/0284; G02B 5/1861; G02B 5/32; G03H 1/0011; G03H 1/0244
See application file for complete search history.

(56) References Cited

U.S. PATENT DOCUMENTS 4,999,065 A 3/1991 Wilfert
6,318,757 B1 11/2001 Ritchie et al.
(Continued)

FOREIGN PATENT DOCUMENTS

JP 49-131142 12/1974
JP 64-61295 3/1989
(Continued)

OTHER PUBLICATIONS

Int'l Search Report for PCT/JP2010/063327, dated Sep. 7, 2010.
(Continued)

*Primary Examiner* — Jennifer L. Doak

(57) ABSTRACT

An image display according to an embodiment includes a first image-displaying portion that displays first information about a certain object as a first image of object color, and a second image-displaying portion that displays second information about the object as a second image of structural color provided by a relief structure, the relief structure including at least one structure selected from the group consisting of diffraction grating, hologram, and light-scattering structure having an anisotropic light-scattering property. According to an example, the object is a person, and the first image includes a facial image of the person. A labeled article
(Continued)

according to another embodiment includes the image display, and a substrate supporting the image display.

2 Claims, 45 Drawing Sheets

Related U.S. Application Data continuation of application No. PCT/JP2010/063327, filed on Aug. 5, 2010.

(30) Foreign Application Priority Data

Feb. 19, 2010 (JP) ................................ 2010-034800
Mar. 23, 2010 (JP) ................................ 2010-066885

(51) Int. Cl.
| | | |
|---|---|---|
| B42D 25/21 | (2014.01) | |
| B42D 25/24 | (2014.01) | |
| B42D 25/42 | (2014.01) | |
| B42D 25/47 | (2014.01) | |
| G02B 5/18 | (2006.01) | |
| G03H 1/00 | (2006.01) | |
| G03H 1/02 | (2006.01) | |
| G03H 1/04 | (2006.01) | |

(52) U.S. Cl.
CPC ............. *B42D 25/42* (2014.10); *B42D 25/47* (2014.10); *G02B 5/1842* (2013.01); *G03H 1/0011* (2013.01); *G03H 1/0244* (2013.01); *G03H 2001/0497* (2013.01); *G03H 2210/54* (2013.01)

(56) References Cited

U.S. PATENT DOCUMENTS

| | | |
|---|---|---|
| 2003/0183695 A1 | 10/2003 | Labrec et al. |
| 2006/0228471 A1 | 10/2006 | Menz et al. |
| 2008/0316556 A1 | 12/2008 | Eto et al. |

FOREIGN PATENT DOCUMENTS

| | | |
|---|---|---|
| JP | 04-136810 | 5/1992 |
| JP | 6-64373 | 3/1994 |
| JP | 07-125403 | 5/1995 |
| JP | 7-199781 | 8/1995 |
| JP | 8-161449 | 6/1996 |
| JP | 10-48411 | 2/1998 |
| JP | 10-86539 | 4/1998 |
| JP | 11-120319 | 4/1999 |
| JP | 2000-039508 | 2/2000 |
| JP | 2000-141863 | 5/2000 |
| JP | 2001-126046 | 5/2001 |
| JP | 2001-322393 | 11/2001 |
| JP | 2002-226740 | 8/2002 |
| JP | 2002-254840 | 9/2002 |
| JP | 2003-122234 | 4/2003 |
| JP | 2003-170685 | 6/2003 |
| JP | 2003-256786 | 9/2003 |
| JP | 2004-54265 | 2/2004 |
| JP | 2004-070532 | 3/2004 |
| JP | 2004-117636 | 4/2004 |
| JP | 2005-208601 | 8/2005 |
| JP | 2005-319777 | 11/2005 |
| JP | 2006-123174 | 5/2006 |
| JP | 2007-1163 | 1/2007 |
| JP | 2007-240786 | 9/2007 |
| JP | 2008-501553 | 1/2008 |
| JP | 2008-83226 | 4/2008 |
| JP | 2008-83532 | 4/2008 |
| JP | 2008-107483 | 5/2008 |
| JP | 2008-188866 | 8/2008 |
| JP | 2009-80205 | 4/2009 |
| JP | 2009-90531 | 4/2009 |
| JP | 3155265 | 11/2009 |
| WO | 99/17941 | 4/1999 |
| WO | 2008/152389 A2 | 12/2008 |

OTHER PUBLICATIONS

Office Action issued by the Japanese Patent Office dated Oct. 1, 2013 in corresponding Japanese patent application No. 2009-187654.
Office Action issued by the Japanese Patent Office dated Dec. 24, 2013 in corresponding Japanese patent application No. 2009-187654.
Extended European Search Report dated Aug. 17, 2012 issued in corresponding European Patent Application No. 10808165.4.
Chinese Office Action dated Jun. 5, 2013 in corresponding Chinese Application No. 201080035873.6.
Japanese Office Action dated Jul. 9, 2013 in corresponding Japanese Application No. 2009-187654.
Japanese Office Action dated Jul. 9, 2013 in corresponding Japanese Application No. 2010-034799.
Japanese Office Action dated Jul. 16, 2013 in corresponding Japanese Application No. 2010-066885.
Japanese Office Action dated Jul. 16, 2013 in corresponding Japanese Application No. 2010-034800.
International Preliminary Report on Patentability for PCT/JP2010/063327, dated Mar. 22, 2012.
Office Action for U.S. Appl. No. 13/362,480 dated May 9, 2014.
Office Action for U.S. Appl. No. 13/362 dated Aug. 15, 2014.
Final Office Action for U.S. Appl. No. 13/362 dated Feb. 11, 2015.
Advisory Action for U.S. Appl. No. 13/362 dated May 12, 2015.
Final Office Action for U.S. Appl. No. 13/362 dated Oct. 8, 2015.
Advisory Action for U.S. Appl. No. 13/362 dated Jan. 11, 2016.
Office Action for U.S. Appl. No. 13/362 dated Feb. 25, 2016.
Final Office Action for U.S. Appl. No. 13/362 dated Jun. 15, 2016.
Office Action for U.S. Appl. No. 13/362 dated Sep. 20, 2016.
U.S. Appl. No. 13/362,480, filed Jan. 31, 2012, Satoshi Gosho et al., Toppan Printing Co., Ltd.
Office Action for U.S. Appl. No. 13/362,480 dated Aug. 15, 2014.
Final Office Action for U.S. Appl. No. 13/362,480 dated Feb. 11, 2015.
Advisory Action for U.S. Appl. No. 13/362,480 dated May 12, 2015.
Final Office Action for U.S. Appl. No. 13/362,480 dated Oct. 8, 2015.
Advisory Action for U.S. Appl. No. 13/362,480 dated Jan. 11, 2016.
Office Action for U.S. Appl. No. 13/362,480 dated Feb. 25, 2016.
Final Office Action for U.S. Appl. No. 13/362,480 dated Jun. 15, 2016.
Office Action for U.S. Appl. No. 13/362,480 dated Sep. 20, 2016.

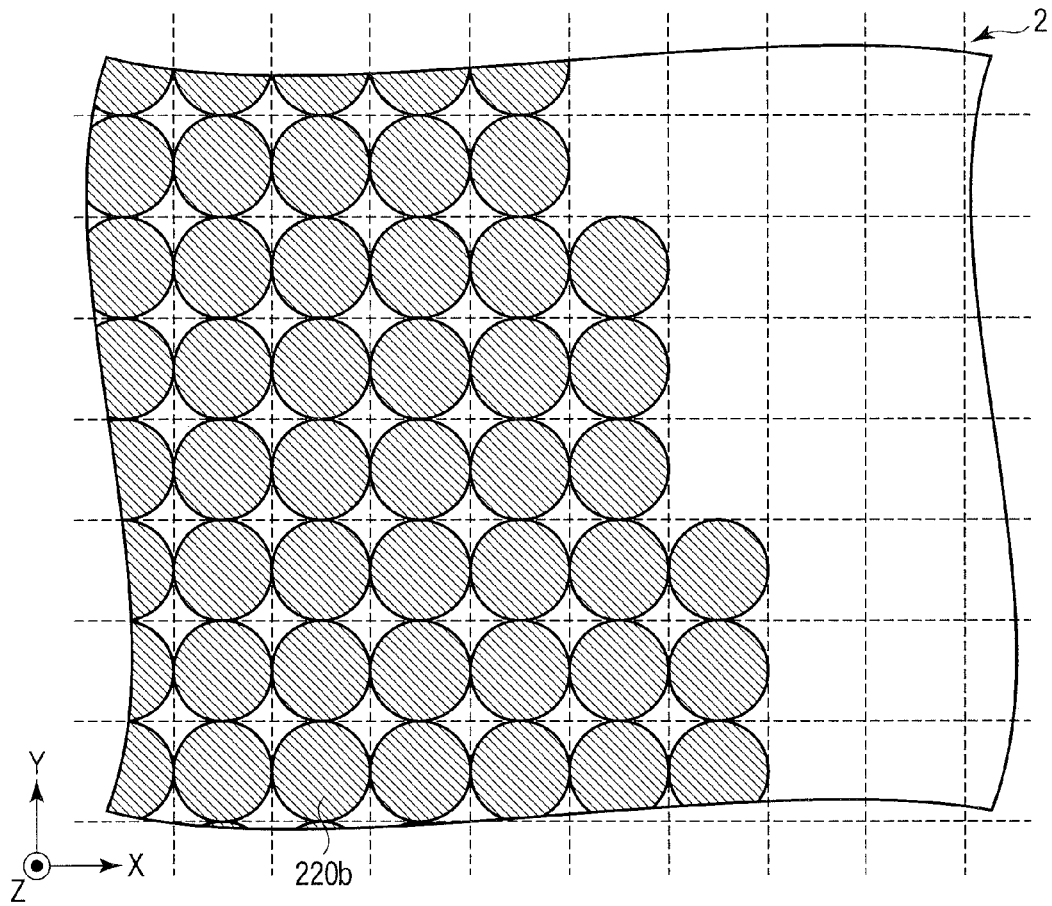
F I G. 4
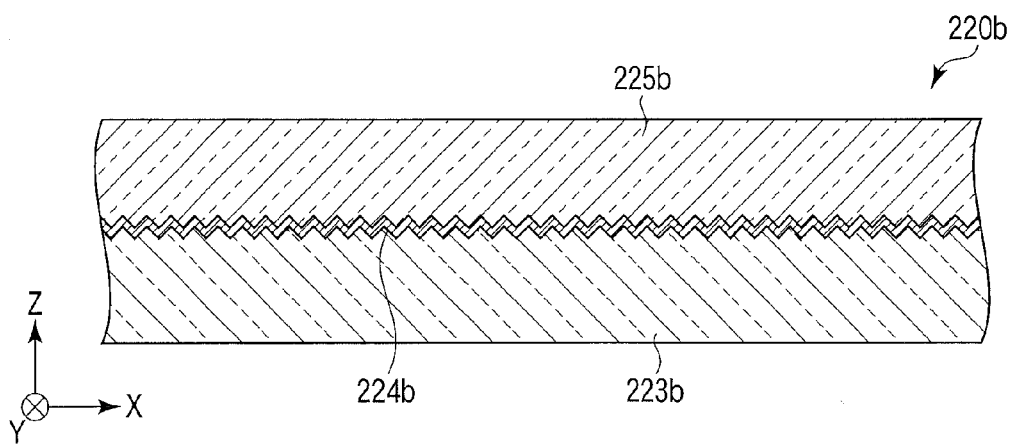
F I G. 5

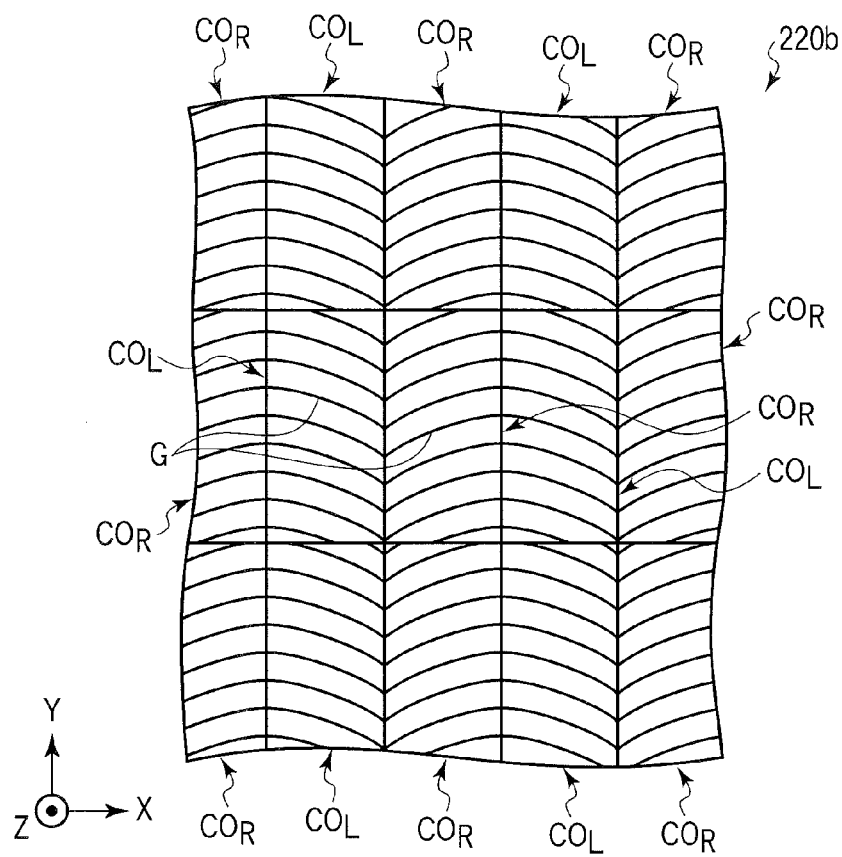
F I G. 9
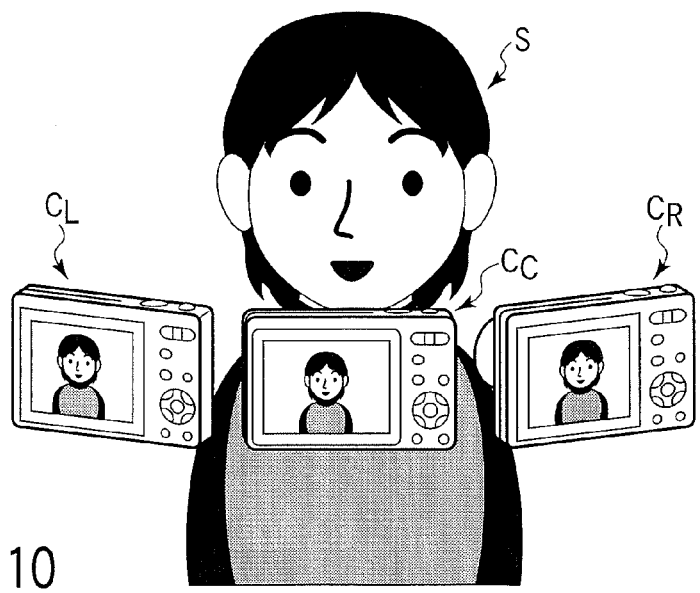
F I G. 10

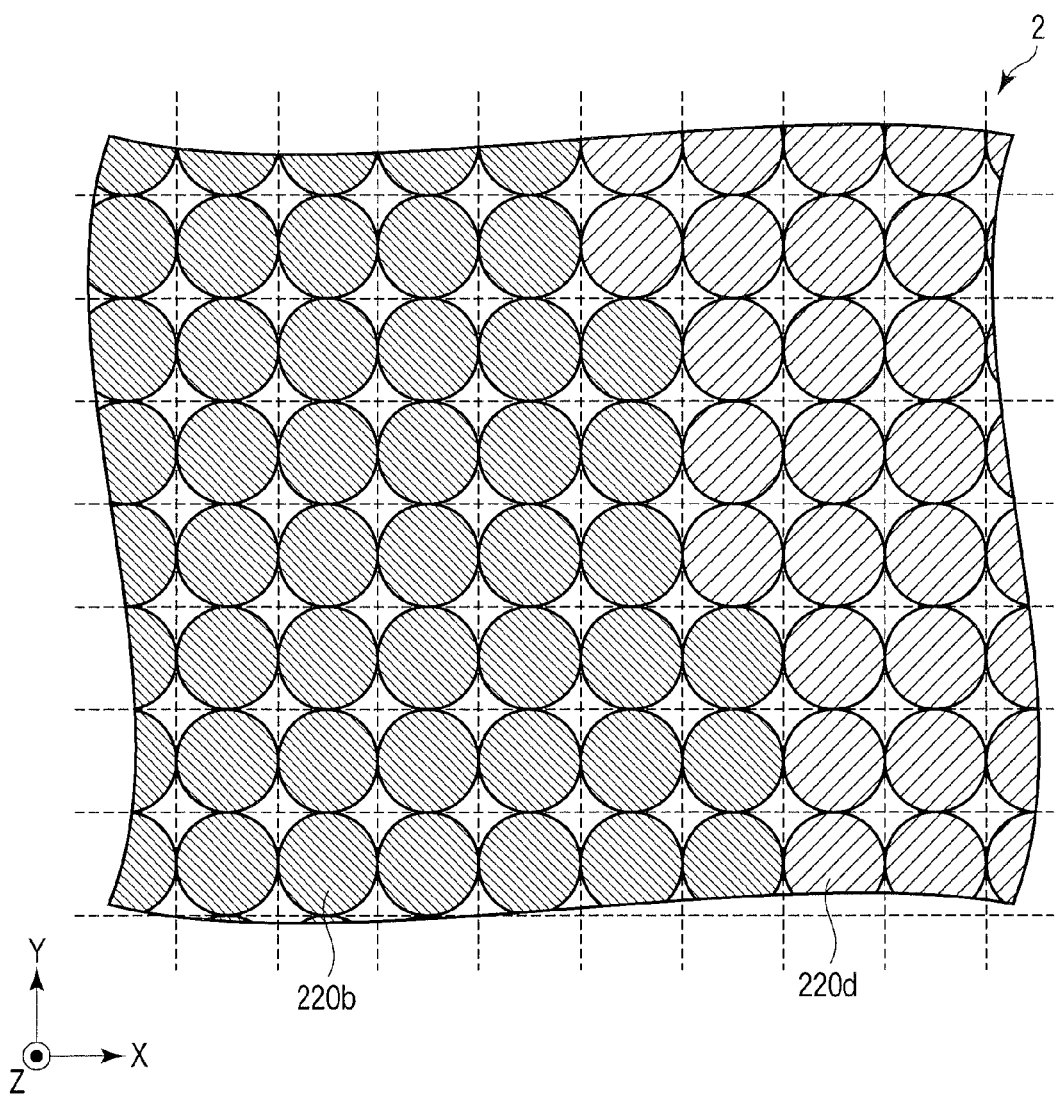
F I G. 17

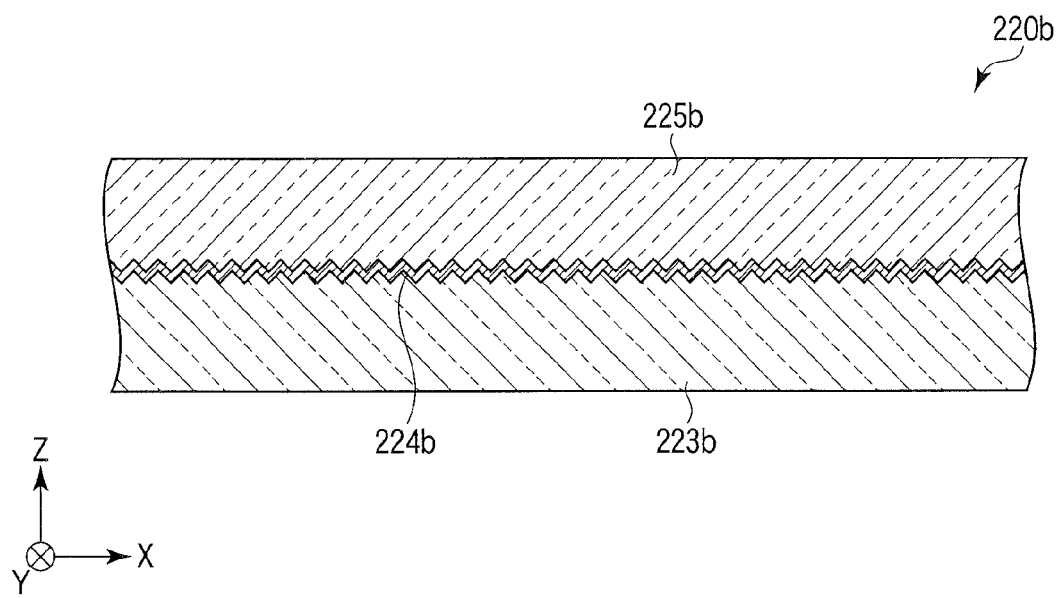
F I G. 18
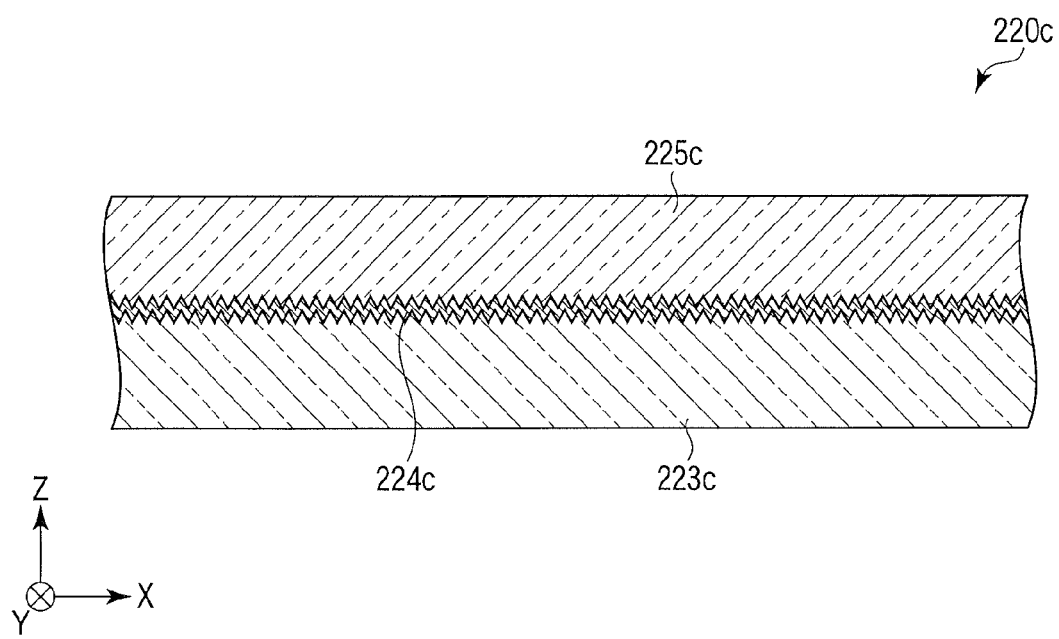
F I G. 19

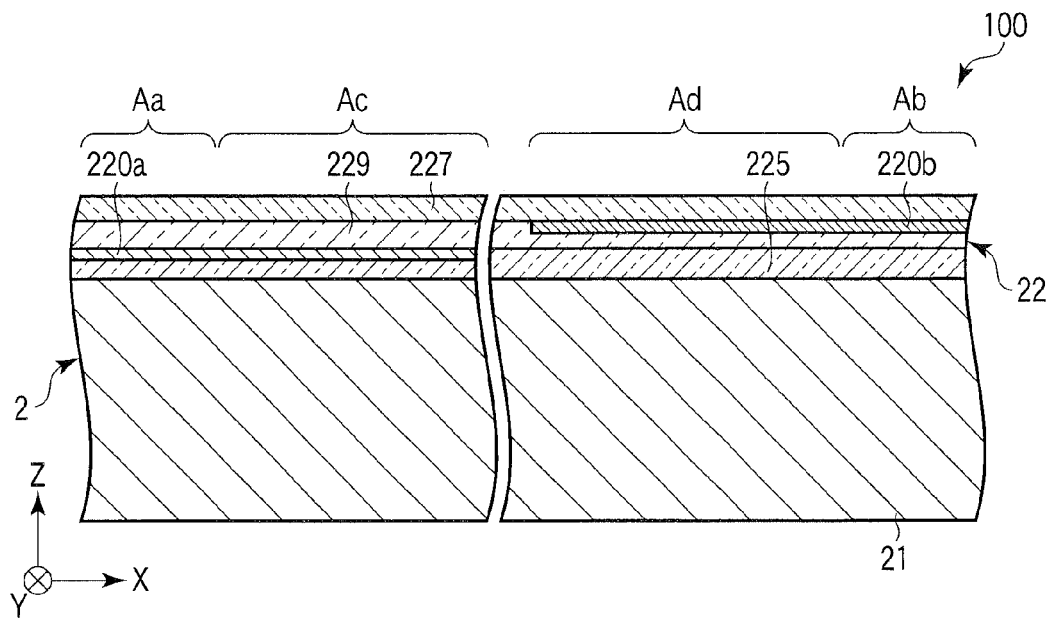
F I G. 20
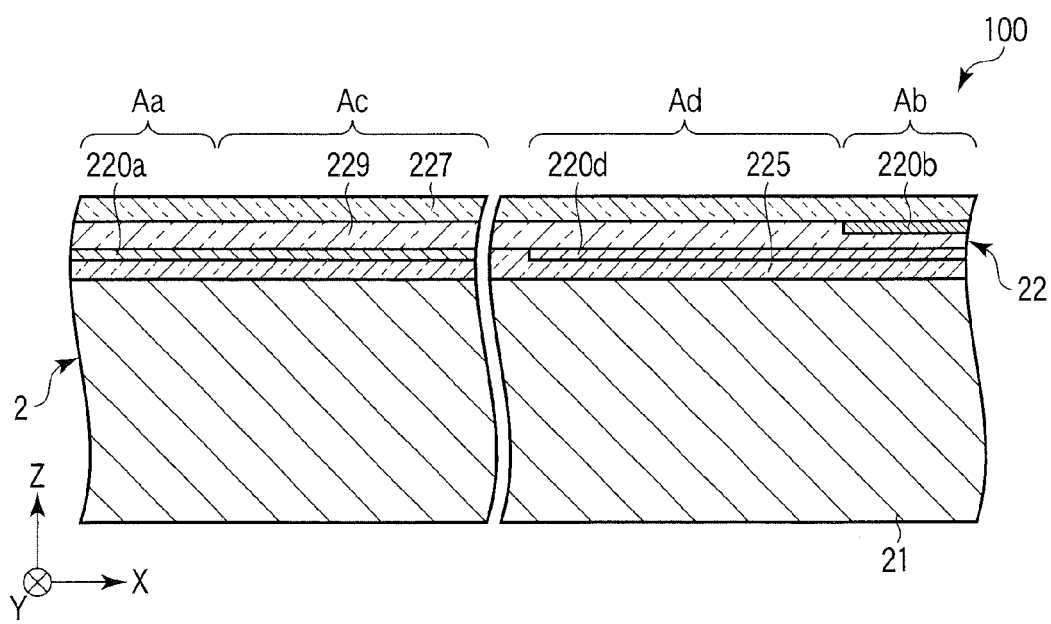
F I G. 21

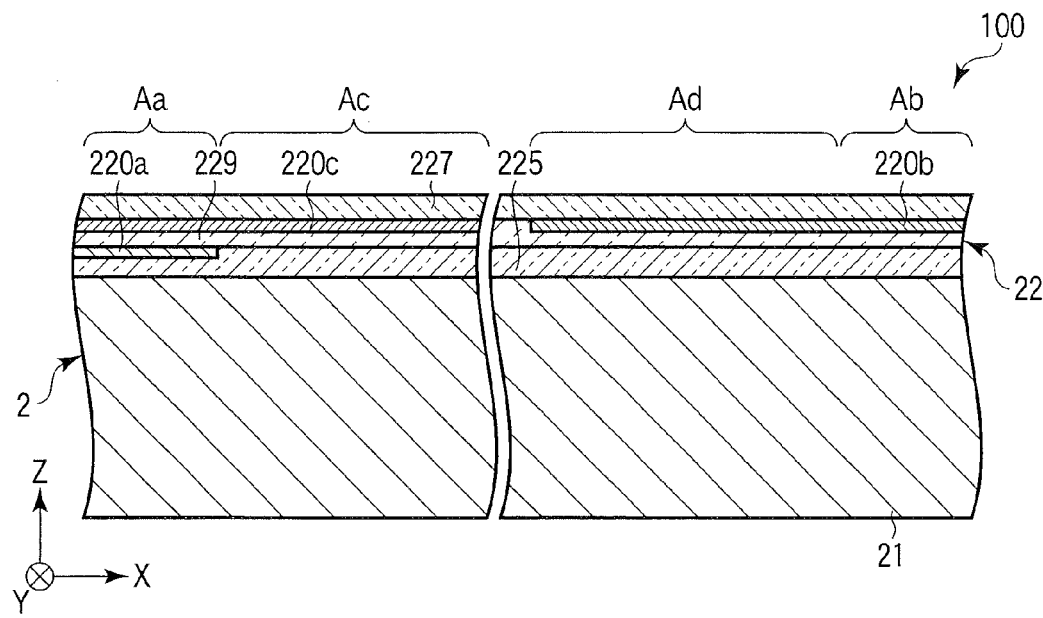
F I G. 24
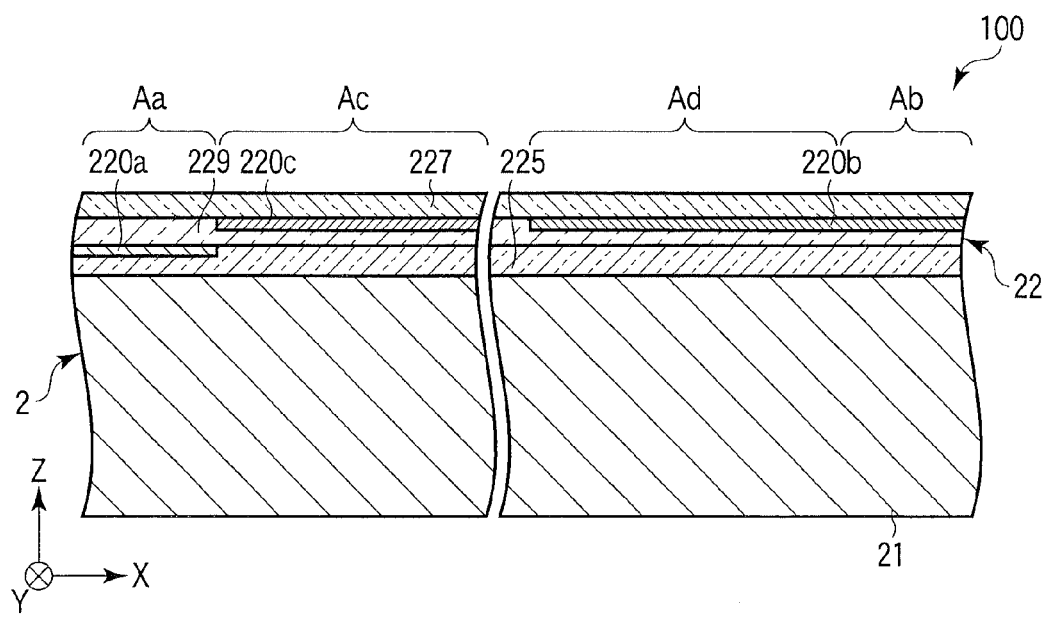
F I G. 25

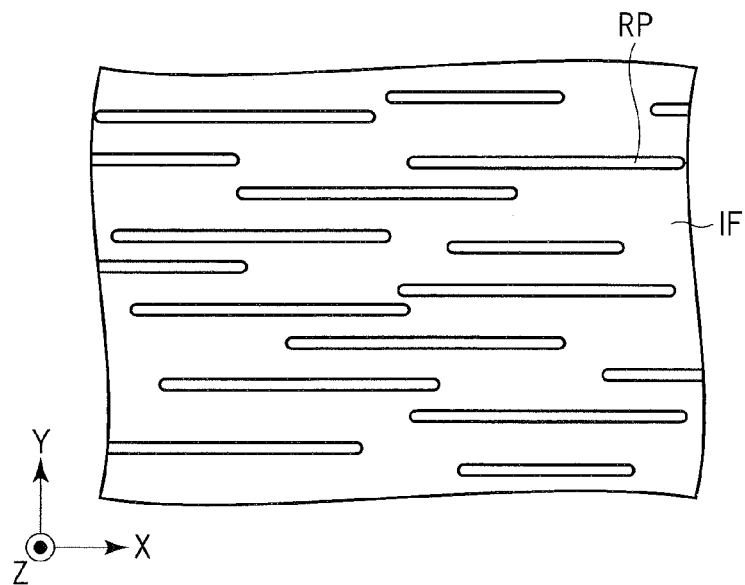
F I G. 30
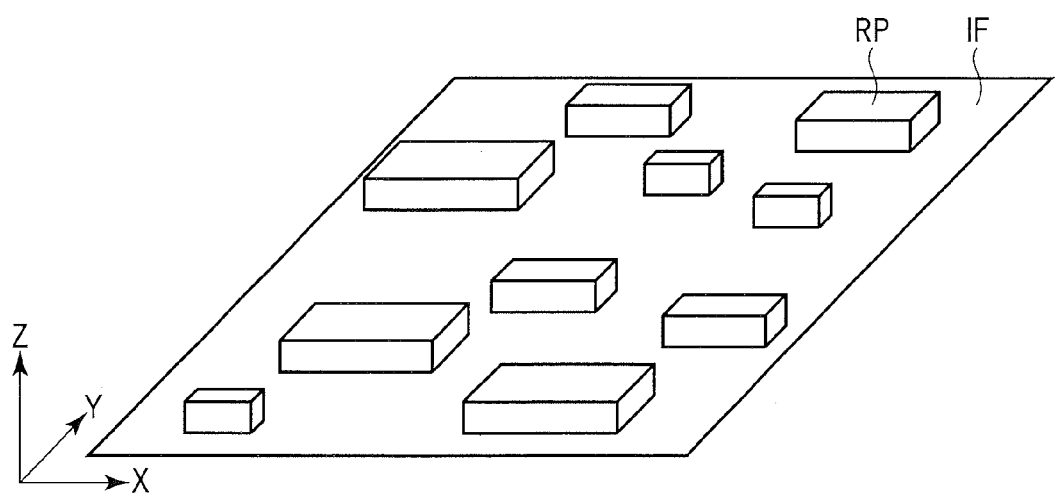
F I G. 31

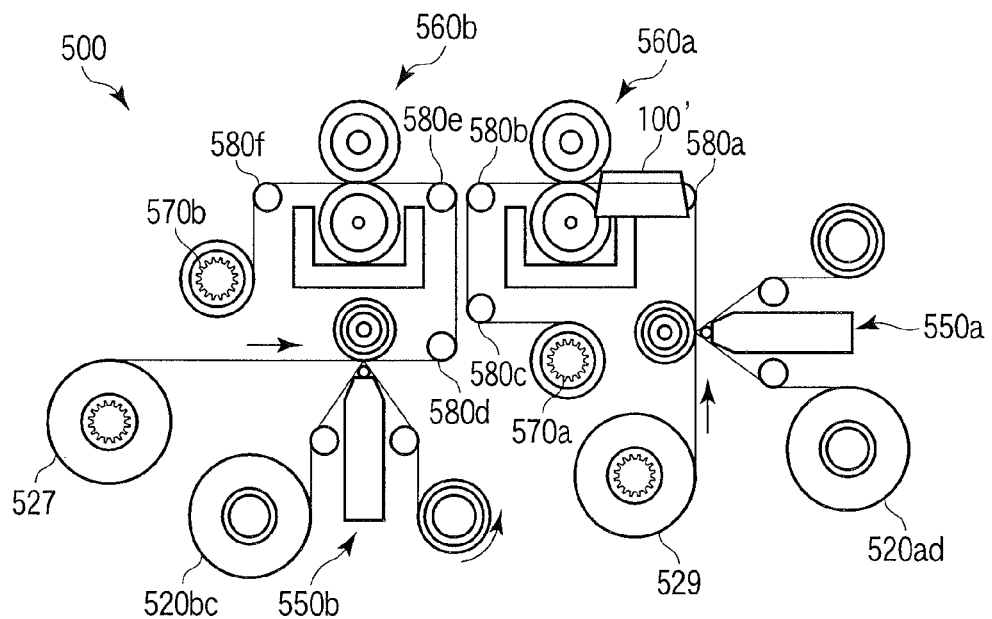
F I G. 34
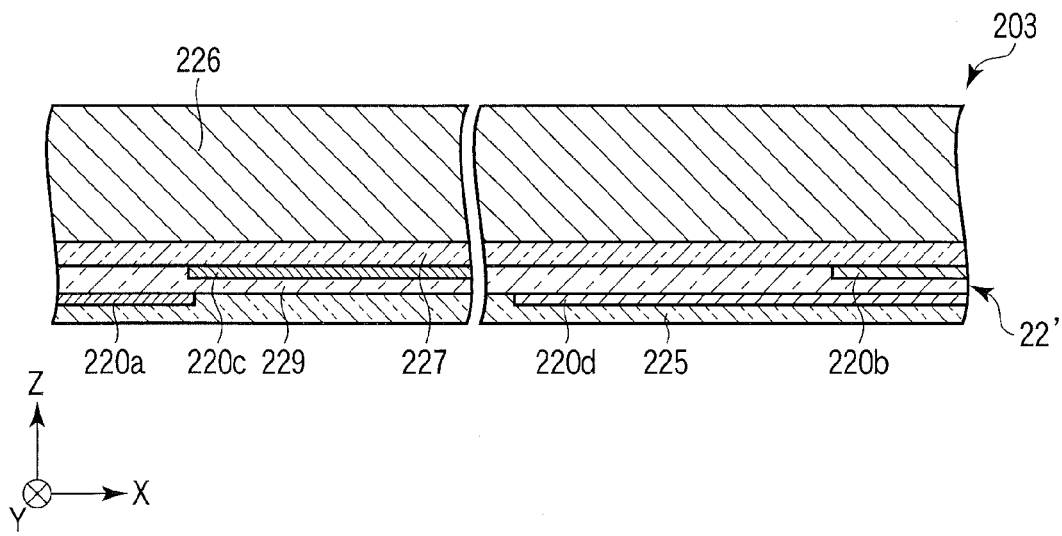
F I G. 35

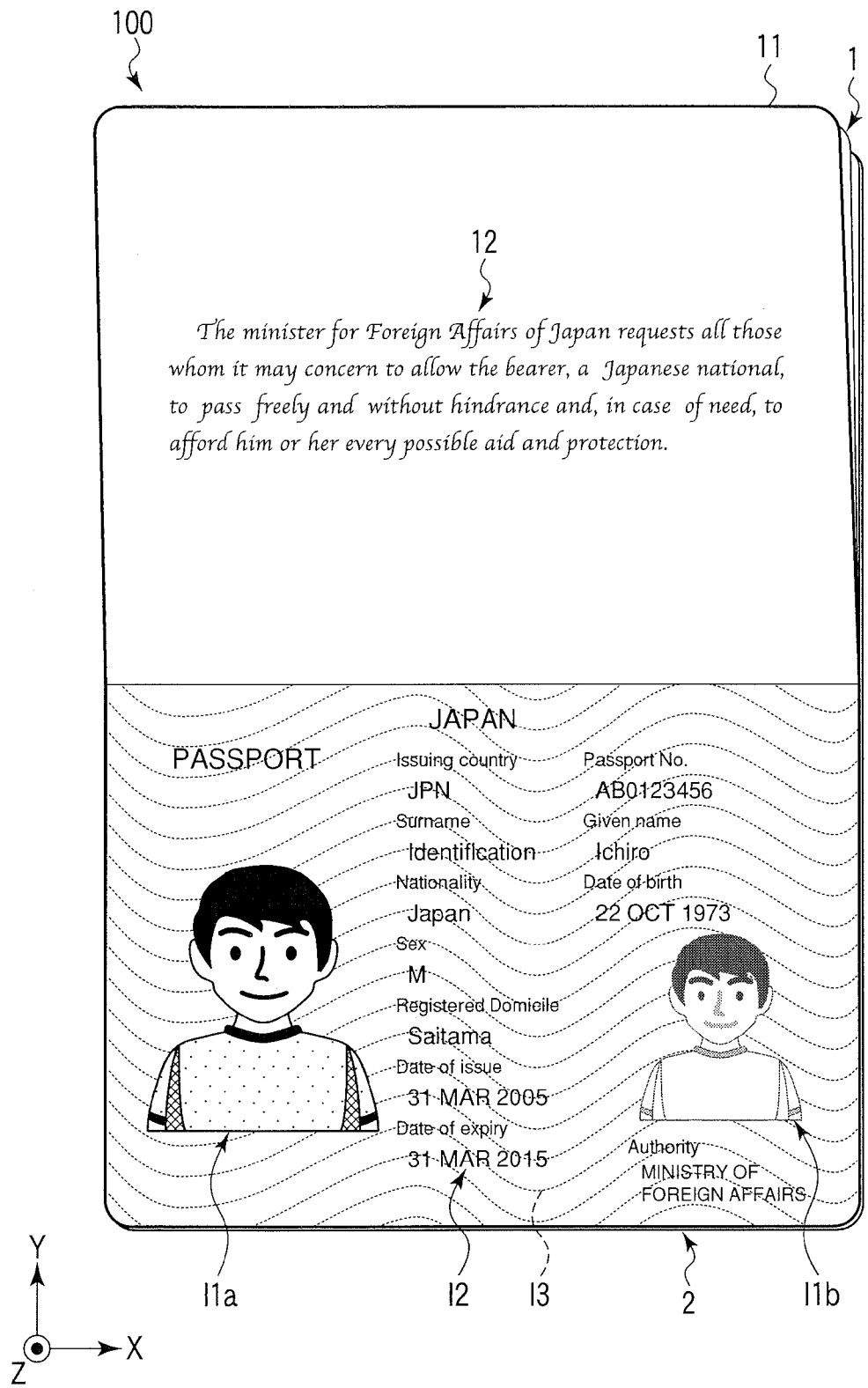
F I G. 36

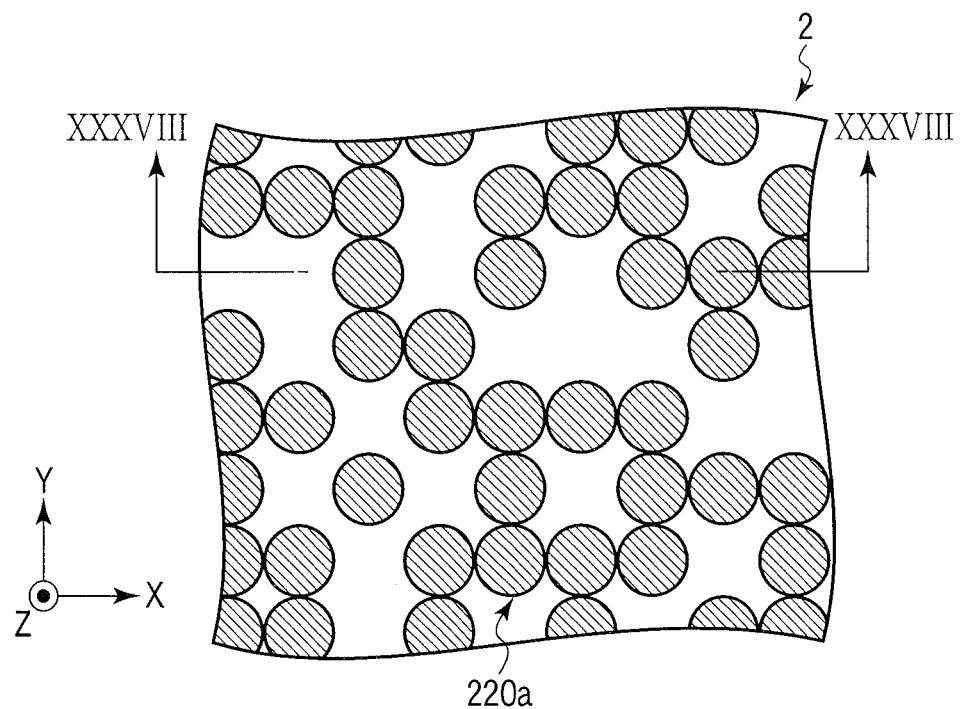
F I G. 37
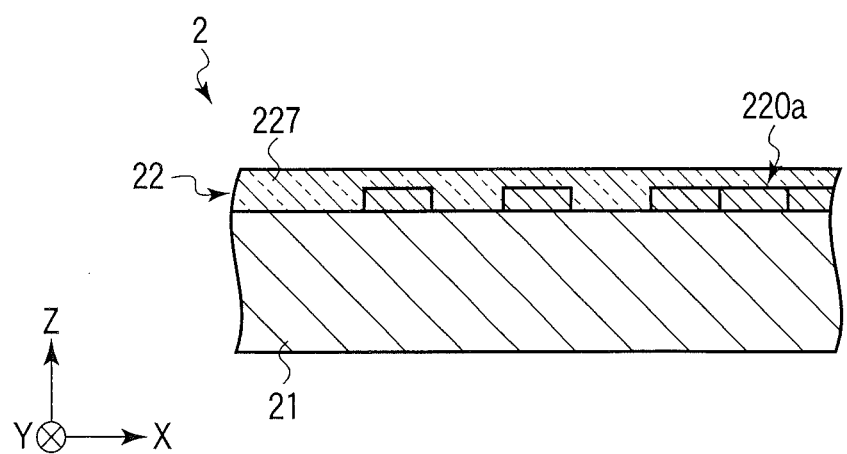
F I G. 38

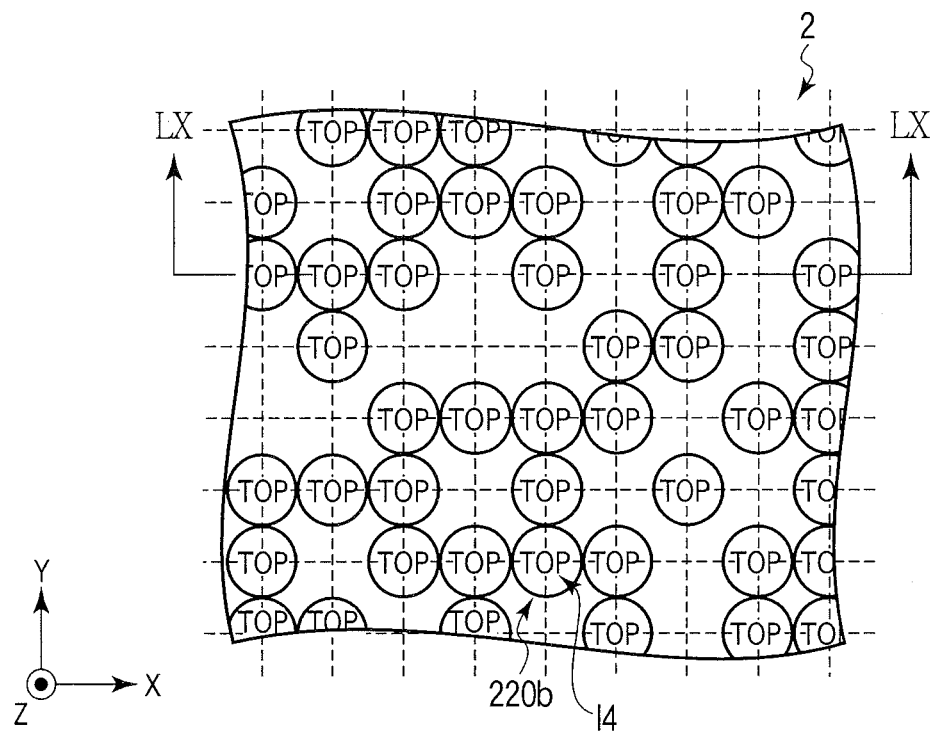
F I G. 39
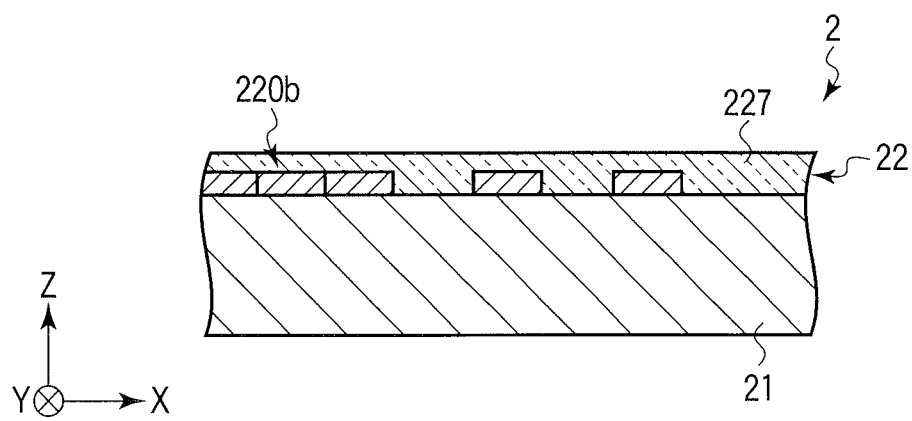
F I G. 40

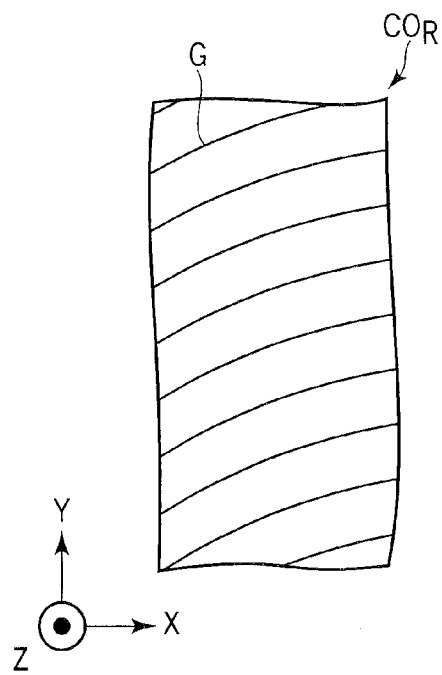
F I G. 45
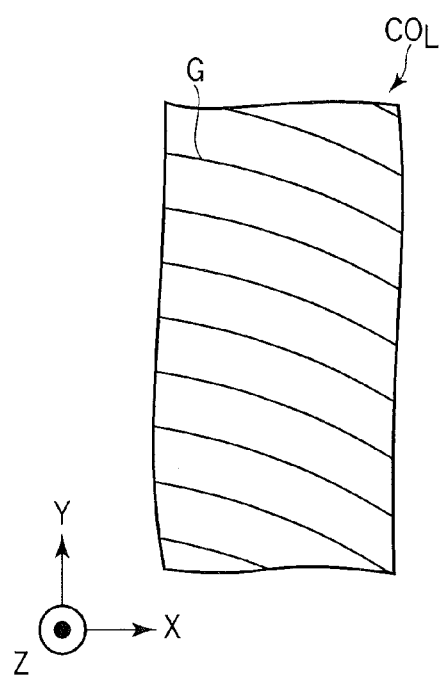
F I G. 46

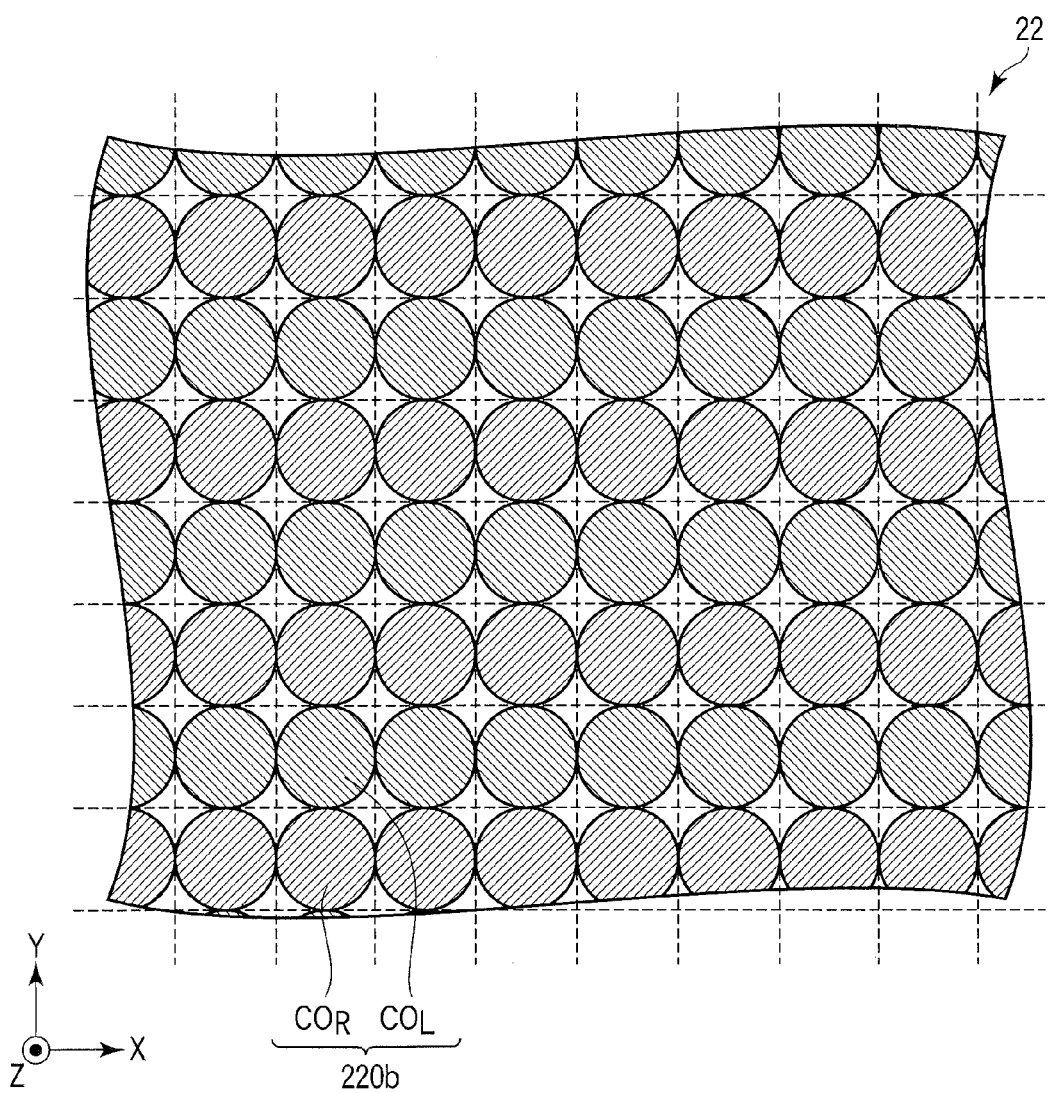
F I G. 47

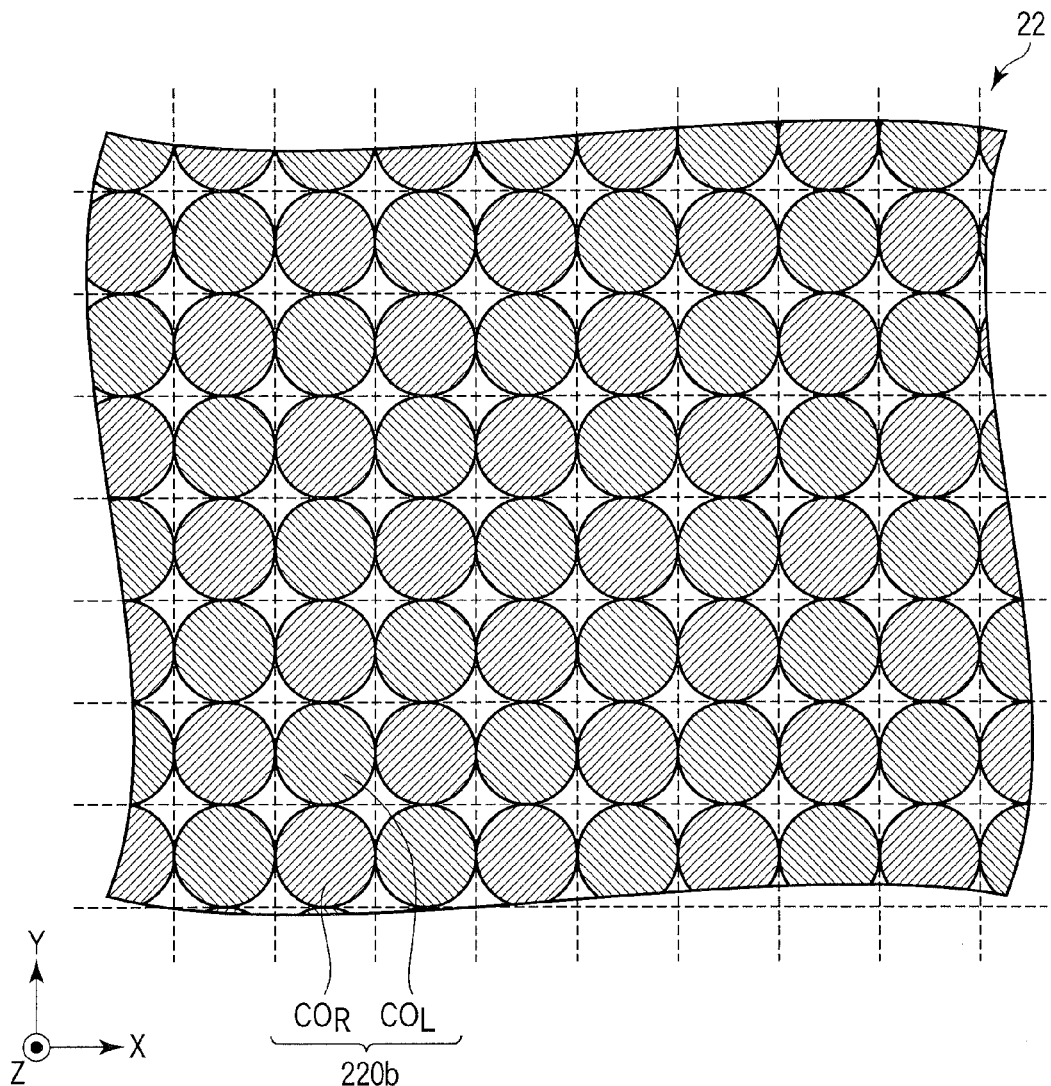
F I G. 48

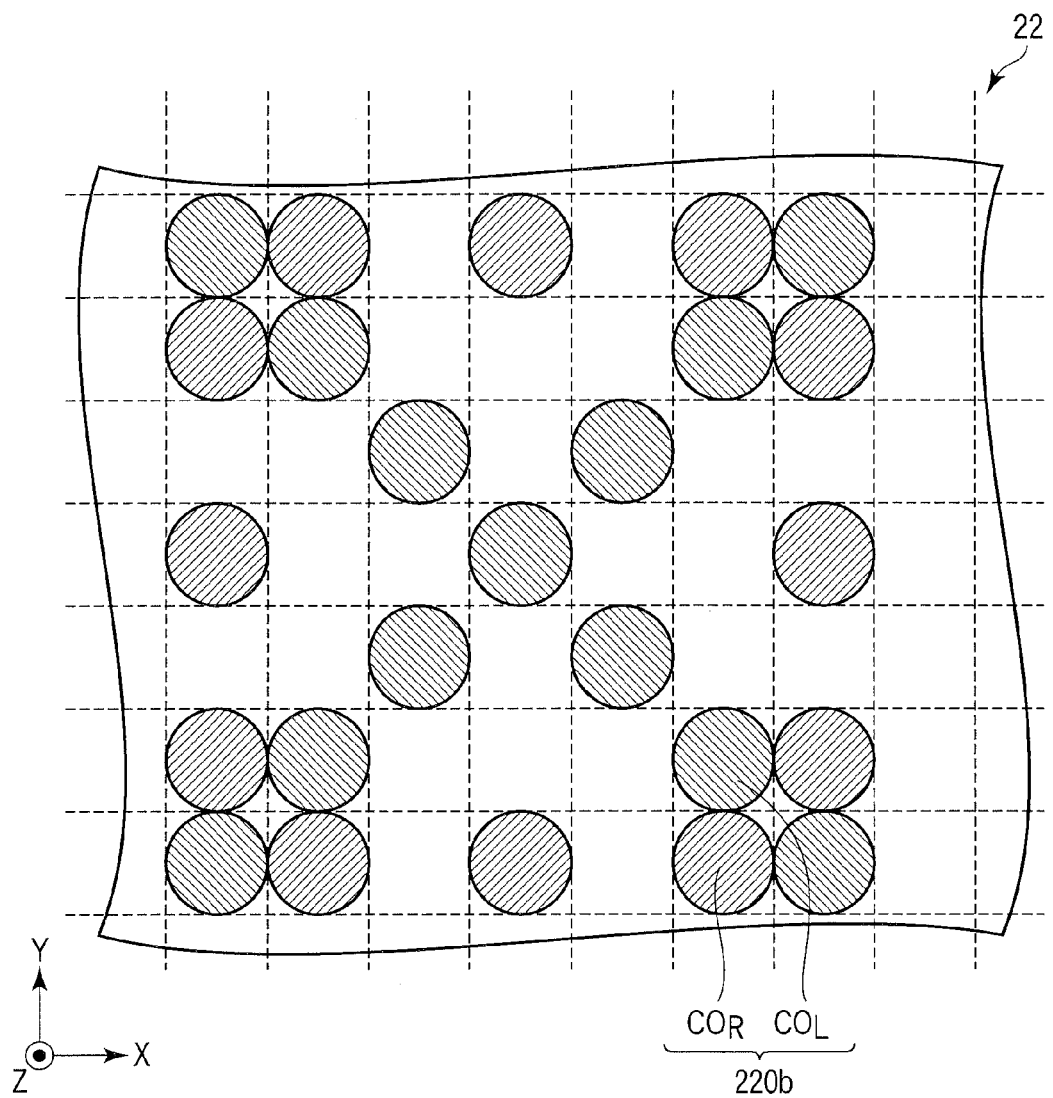
F I G. 49

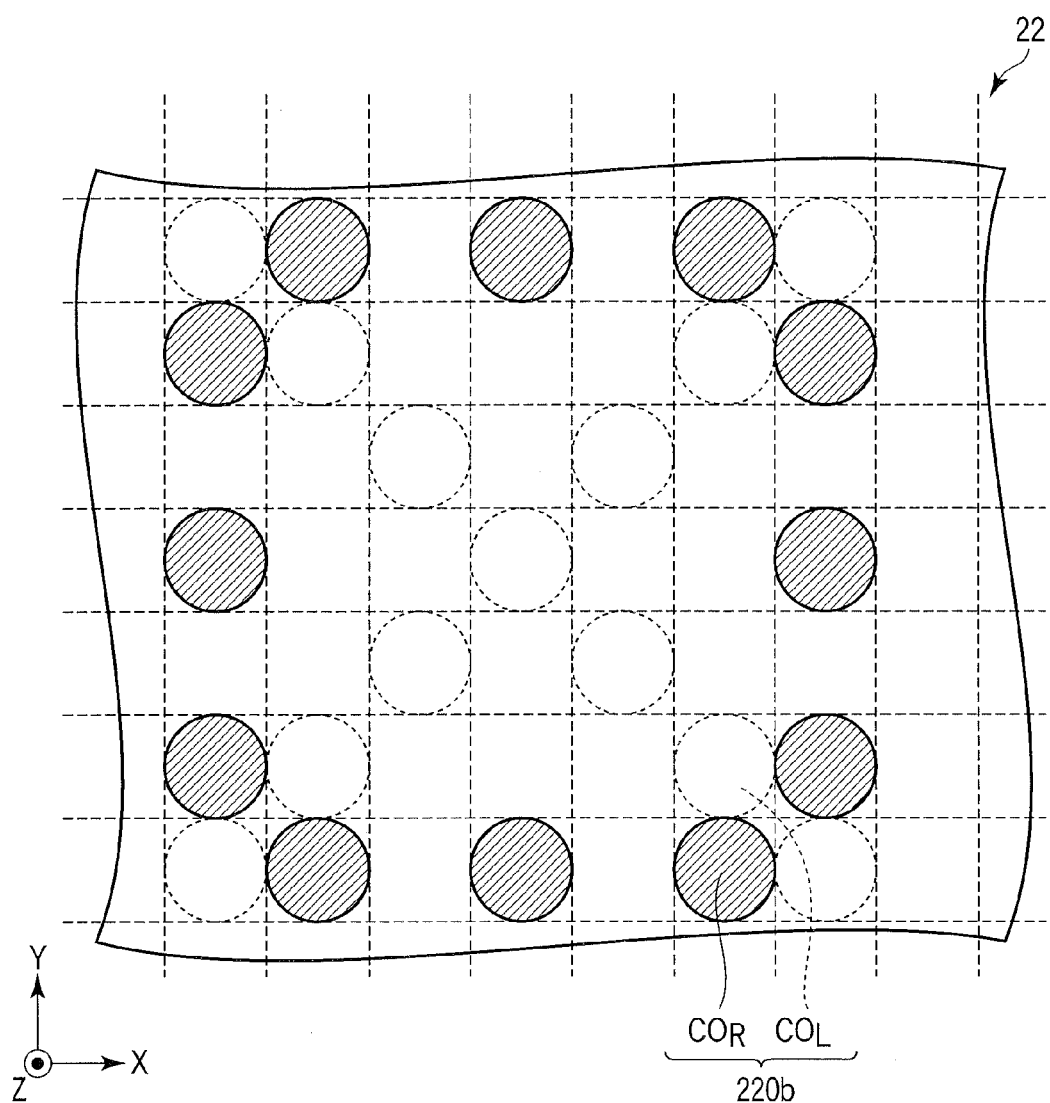
F I G. 50

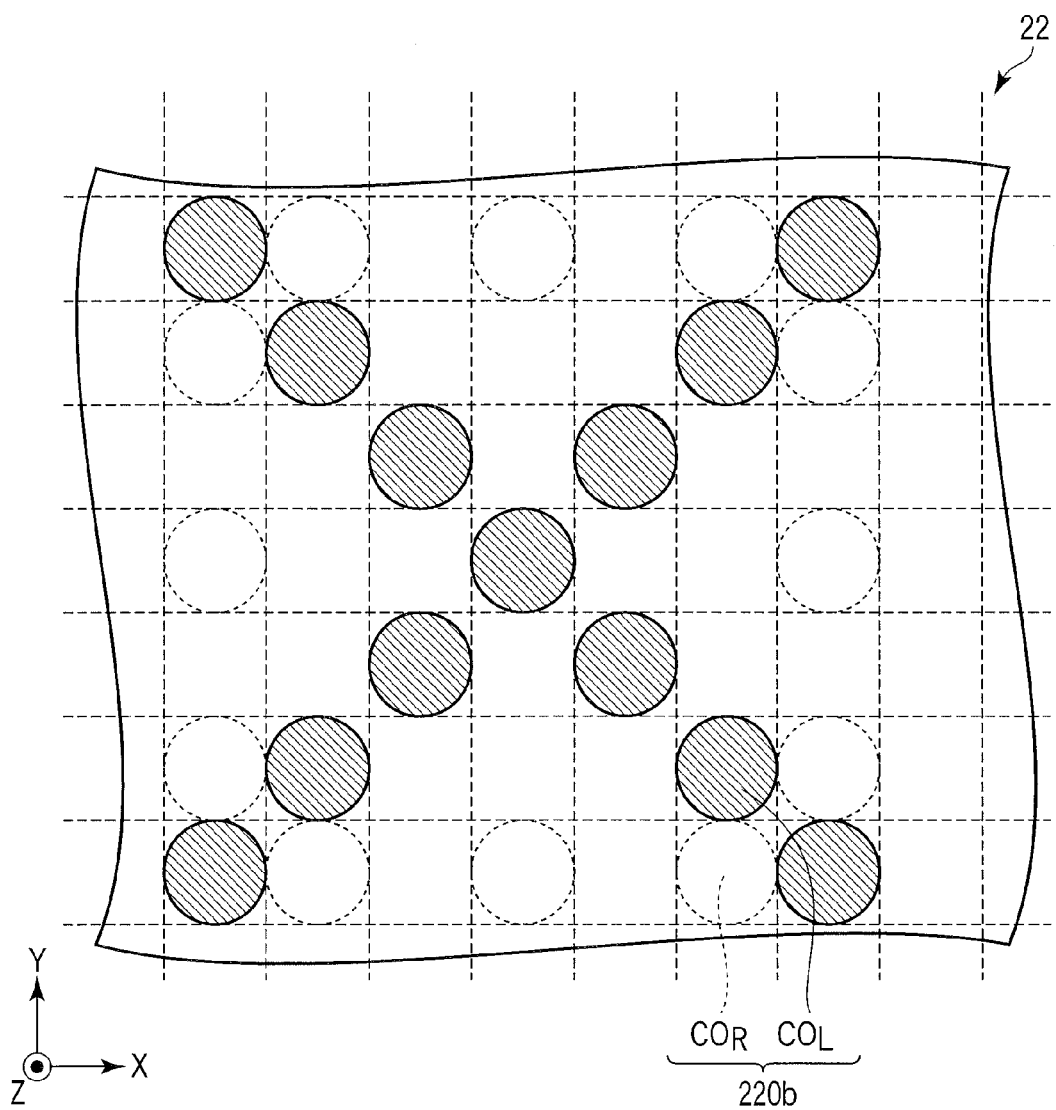
F I G. 51

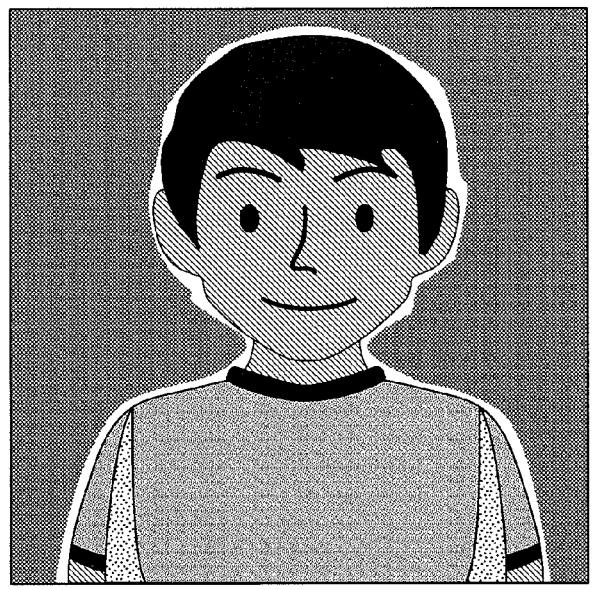
F I G. 52
F I G. 53

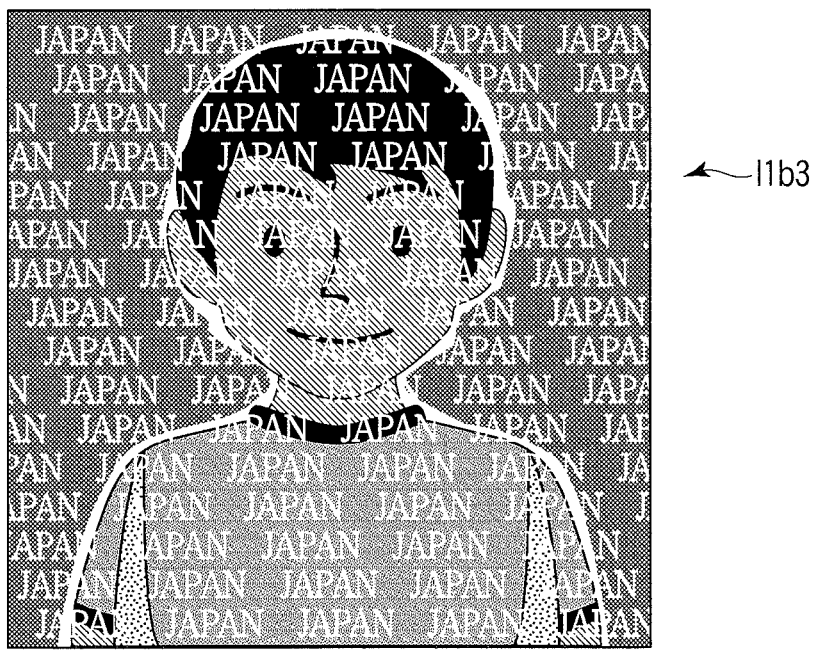
F I G. 54

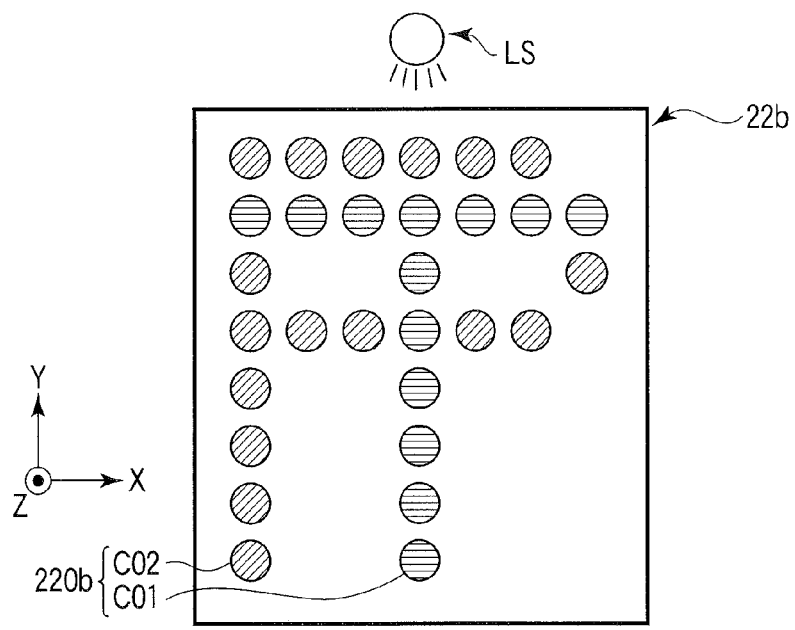
F I G. 55
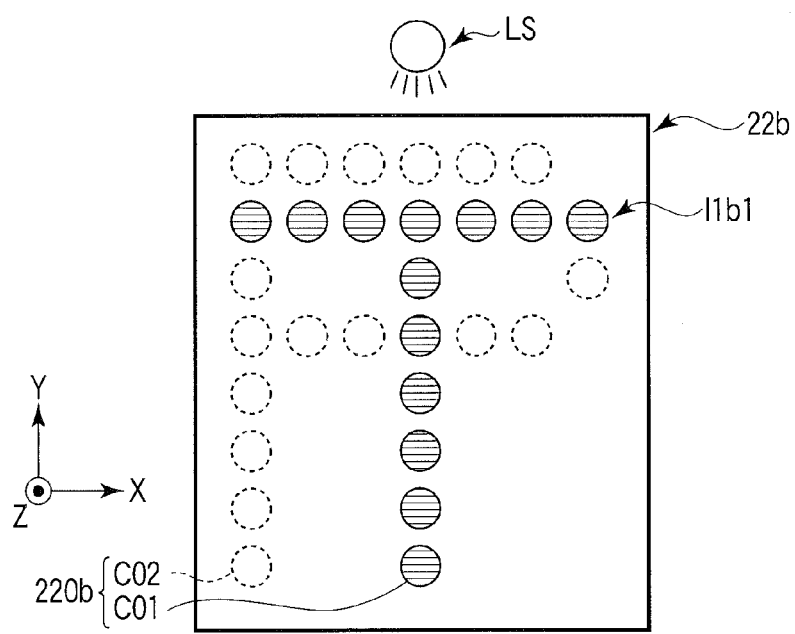
F I G. 56

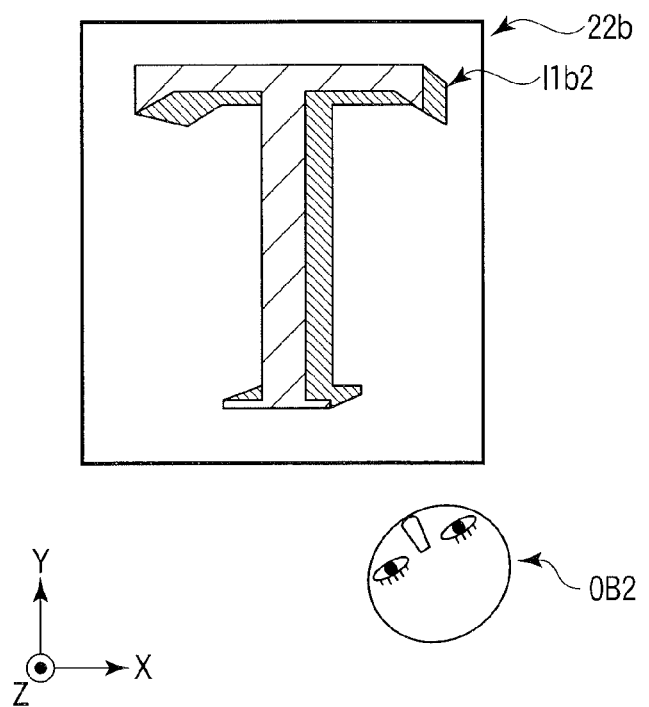
F I G. 59
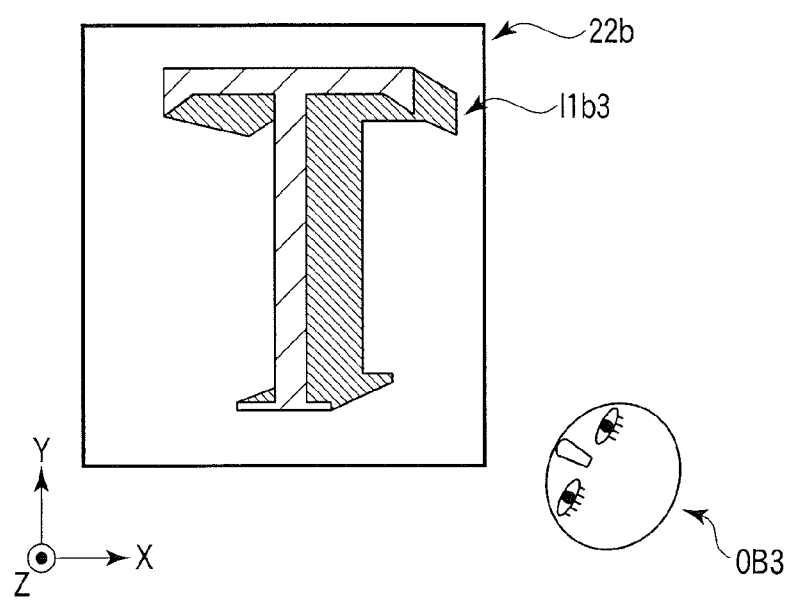
F I G. 60

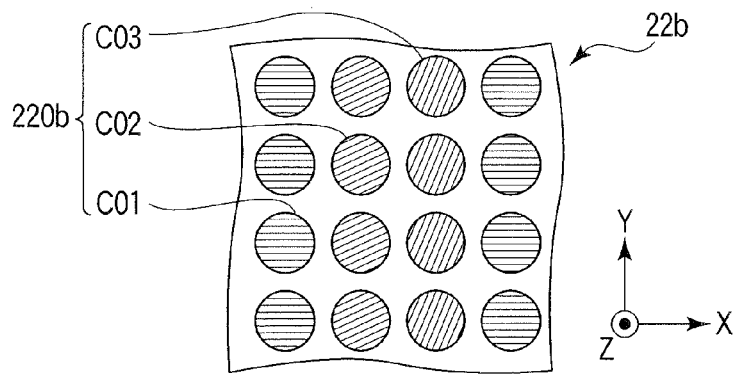
F I G. 61
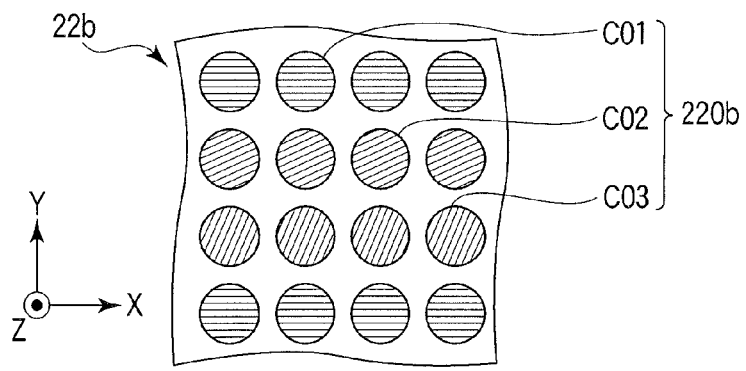
F I G. 62
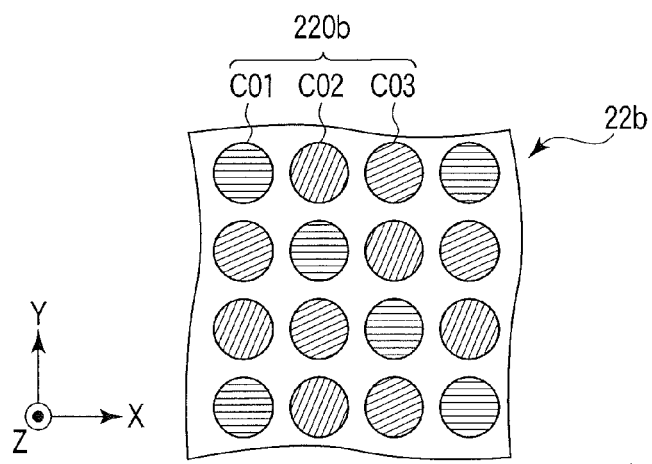
F I G. 63

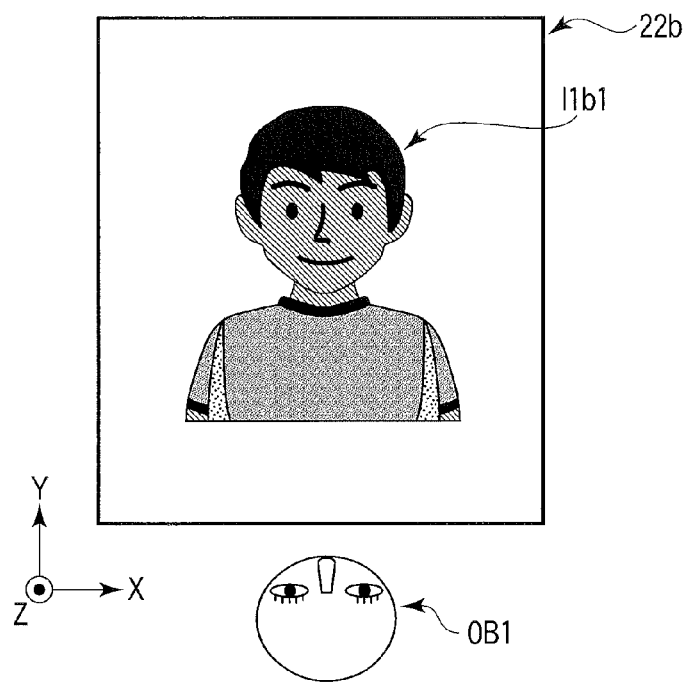
F I G. 68
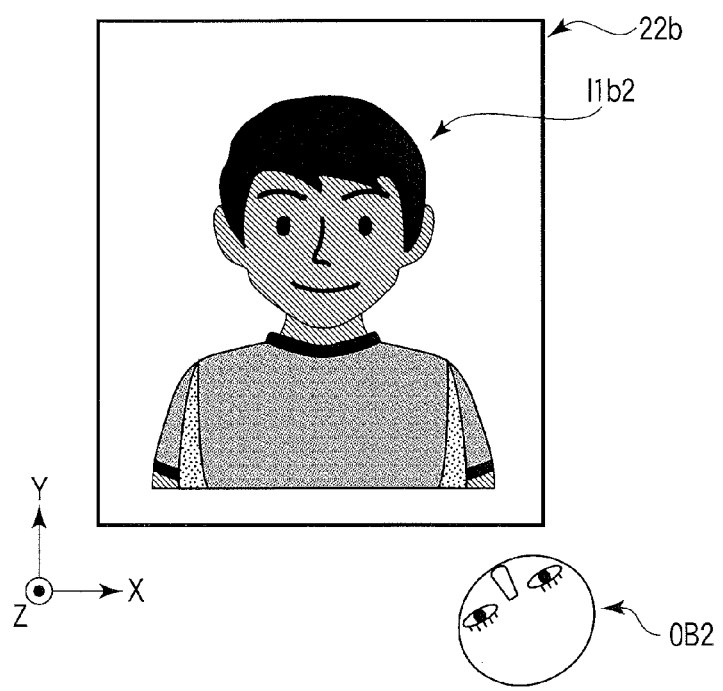
F I G. 69

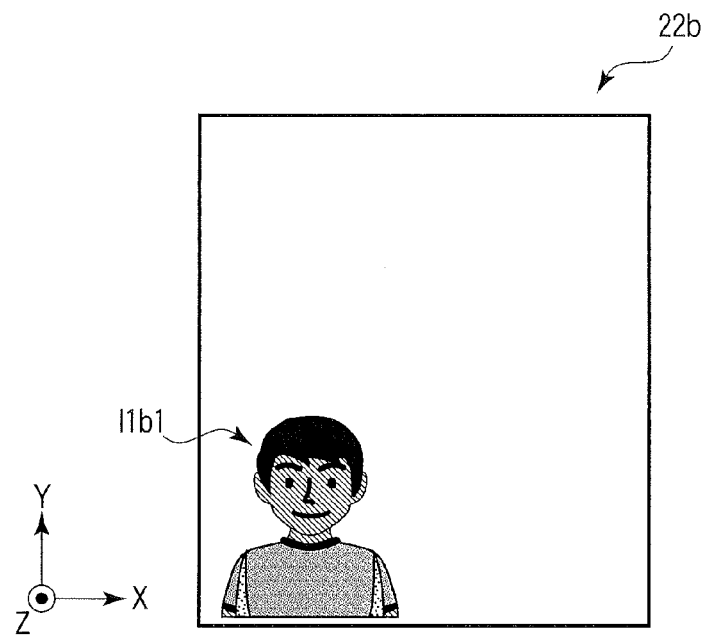
F I G. 77
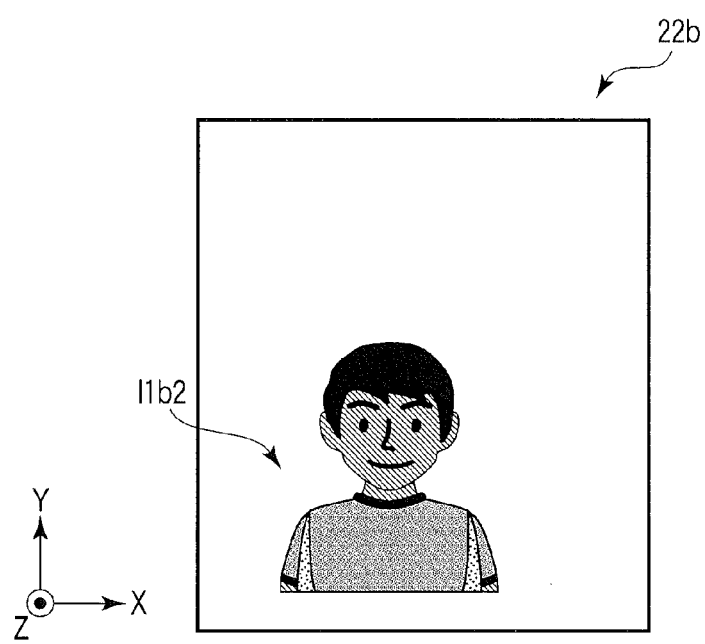
F I G. 78

IMAGE DISPLAY AND LABELED DEVICE

CROSS REFERENCE TO RELATED APPLICATIONS

This application is a Continuation application of U.S. application Ser. No. 13/362,480, filed Jan. 31, 2012, which is a continuation of PCT Application No. PCT/JP2010/063327, filed Aug. 5, 2010 and based upon and claiming the benefit of priority from prior Japanese Patent Applications No. 2009-187654, filed Aug. 13, 2009; No. 2010-034799, filed Feb. 19, 2010; No. 2010-034800, filed Feb. 19, 2010; and No. 2010-066885, filed Mar. 23, 2010, the entire contents of all of which are incorporated herein by reference.

BACKGROUND OF THE INVENTION

1. Field of the Invention

The present invention relates to an image display technique.

2. Description of the Related Art

Many individual authentication media such as passport and identification (ID) card use facial images in order to allow individual authentication with visual check.

In the past, for example, a photographic paper having a facial image printed thereon was adhered to a booklet so as to issue a passport. Such a passport, however, may be tampered by replacing the photographic printing with another one.

For this reason, in recent years, information about the facial image tends to be digitalized, and the digitalized information is reproduced on the booklet. For example, thermal transfer recording method using a transfer ribbon is considered as the method for reproducing the image.

However, printers of thermal transfer recording method using sublimation dye or colored thermoplastic resin are widely available in recent years. In view of such circumstances, it is not necessarily difficult to remove the facial image from the passport and record another facial image thereon.

Jpn. Pat. Appln. KOKAI Publication No. 2000-141863 describes that a facial image is recorded by the above method, and the same facial image is further recorded thereon using fluorescent ink. Jpn. Pat. Appln. KOKAI Publication No. 2002-226740 describes that a facial image is recorded using ink containing colorless or light-colored fluorescent dye and colored pigments. Jpn. Pat. Appln. KOKAI Publication No. 2003-170685 describes that an ordinary facial image and a facial image formed with pearl pigments are arranged side by side.

When these techniques are applied to a passport, it is difficult to tamper with the passport. However, the facial image recorded using fluorescent material cannot be perceived unless a special light source such as an ultraviolet lamp is used. Although the facial image formed with pearl pigments can be perceived with unaided eyes, the particle sizes of pearl pigments are large, and therefore, it is difficult to form a high-resolution image using this.

BRIEF SUMMARY OF THE INVENTION

An object of the present invention is to provide an image display that displays a high quality image and is hard to tamper with information thereon.

According to a first aspect of the present invention, there is provided an image display comprising a first image-displaying portion that displays first information about a certain object as a first image of object color, and a second image-displaying portion that displays second information about the object as a second image of structural color provided by a relief structure, the relief structure including at least one structure selected from the group consisting of diffraction grating, hologram, and light-scattering structure having an anisotropic light-scattering property.

According to a second aspect of the present invention, there is provided a labeled article comprising the image display according to the first aspect, and a substrate supporting the image display.

BRIEF DESCRIPTION OF THE SEVERAL VIEWS OF THE DRAWING

FIG. 4 is an enlarged plan view showing another part of the labeled article shown in FIG. 1;

FIG. 5 is a cross sectional view schematically showing an example of a structure that can be employed in a second image-displaying portion included in the labeled article shown in FIG. 1;

FIG. 9 is a plan view schematically showing an example of a structure that can be used to display a three-dimensional image;

FIG. 10 is a view schematically showing an example of a method of shooting a three-dimensional image;

FIG. 17 is an enlarged plan view of another part of the labeled article shown in FIG. 14;

FIG. 18 is an enlarged cross sectional view of a part of the labeled article shown in FIG. 14;

FIG. 19 is an enlarged cross sectional view of another part of the labeled article shown in FIG. 14;

FIG. 20 is a cross sectional view schematically showing another example of a structure that can be employed in the labeled article shown in FIG. 14;

FIG. 21 is a cross sectional view schematically showing still another example of a structure that can be employed in the labeled article shown in FIG. 14;

FIG. 24 is a cross sectional view schematically showing still another example of a structure that can be employed in the labeled article shown in FIG. 14;

FIG. 25 is a cross sectional view schematically showing still another example of a structure that can be employed in the labeled article shown in FIG. 14;

FIG. 30 is a plan view schematically showing an example of a structure that can be employed in an image-displaying portion producing structural color using light scattering;

FIG. 31 is a perspective view schematically showing another example of a structure that can be employed in an image-displaying portion producing structural color using light scattering;

FIG. 34 is a view schematically showing an example of a manufacturing apparatus that can be used to manufacture the labeled article shown in FIG. 14;

FIG. 35 is a view schematically showing an example of a transfer foil that can be used for manufacturing the labeled article shown in FIG. 14;

FIG. 36 is a plan view schematically showing an individual authentication medium according to the third embodiment of the present invention;

FIG. 37 is an enlarged plan view showing a part of the image display included in the labeled article of FIG. 36;

FIG. 38 is a cross sectional view taken along the line XXXVIII-XXXVIII of the image display shown in FIG. 37;

FIG. 39 is an enlarged plan view showing another part of the image display included in the labeled article shown in FIG. 36;

FIG. 40 is a cross sectional view taken along the line LX-LX of the image display shown in FIG. 39;

FIG. 45 is a plan view schematically showing an example of a diffraction structure that can be employed in the image display of the labeled article shown in FIGS. 36 to 39;

FIG. 46 is a plan view schematically showing an example of a diffraction structure that can be used in combination with the diffraction structure shown in FIG. 45;

FIG. 47 is a plan view schematically showing an example of an arrangement of the diffraction structure shown in FIGS. 45 and 46;

FIG. 48 is a plan view schematically showing another example of an arrangement of the diffraction structure shown in FIGS. 45 and 46;

FIG. 49 is a plan view schematically showing an example of an image display that employs the arrangement shown in FIG. 48;

FIG. 50 is a plan view schematically showing an image displayed by the image display shown in FIG. 49;

FIG. 51 is a plan view schematically showing another image displayed by the image display shown in FIG. 49;

FIG. 52 is a plan view schematically showing an example of an image that can be displayed by an image display employing the arrangement shown in FIG. 48;

FIG. 53 is a plan view schematically showing another example of an image display that employing the arrangement shown in FIG. 48;

FIG. 54 is a plan view schematically showing still another example of an image display that employing the arrangement shown in FIG. 48;

FIG. 55 is a plan view schematically showing an example of an image display that employs a configuration similar to an image display according to the fourth embodiment of the present invention;

FIG. 56 is a plan view schematically showing one of the images displayed by the image display shown in FIG. 55;

FIG. 59 is a plan view schematically showing another image that can be displayed by the image display displaying the image shown in FIG. 58;

FIG. 60 is a plan view schematically showing another image that can be further displayed by the image display displaying the image shown in FIG. 58;

FIG. 61 is a plan view schematically showing an example of an arrangement of a diffraction structure that can be employed in the image display displaying the image shown in FIGS. 58 to 60;

FIG. 62 is a plan view schematically showing another example of an arrangement of a diffraction structure that can be employed in the image display displaying the image shown in FIGS. 58 to 60;

FIG. 63 is a plan view schematically showing still another example of an arrangement of a diffraction structure that can be employed in the image display displaying the image shown in FIGS. 58 to 60;

FIG. 68 is a plan view schematically showing an example of an image that can be displayed when the image display of the labeled article according to the fourth embodiment of the present invention employs another structure;

FIG. 69 is a plan view schematically showing another image that can be displayed by the image display displaying the image shown in FIG. 68;

FIG. 77 is a plan view schematically showing one of the images that can be displayed by the image display according to another modification;

FIG. 78 is a plan view schematically showing another image that can be displayed by the image display displaying the image shown in FIG. 77.

DETAILED DESCRIPTION OF THE INVENTION

Figure 1:
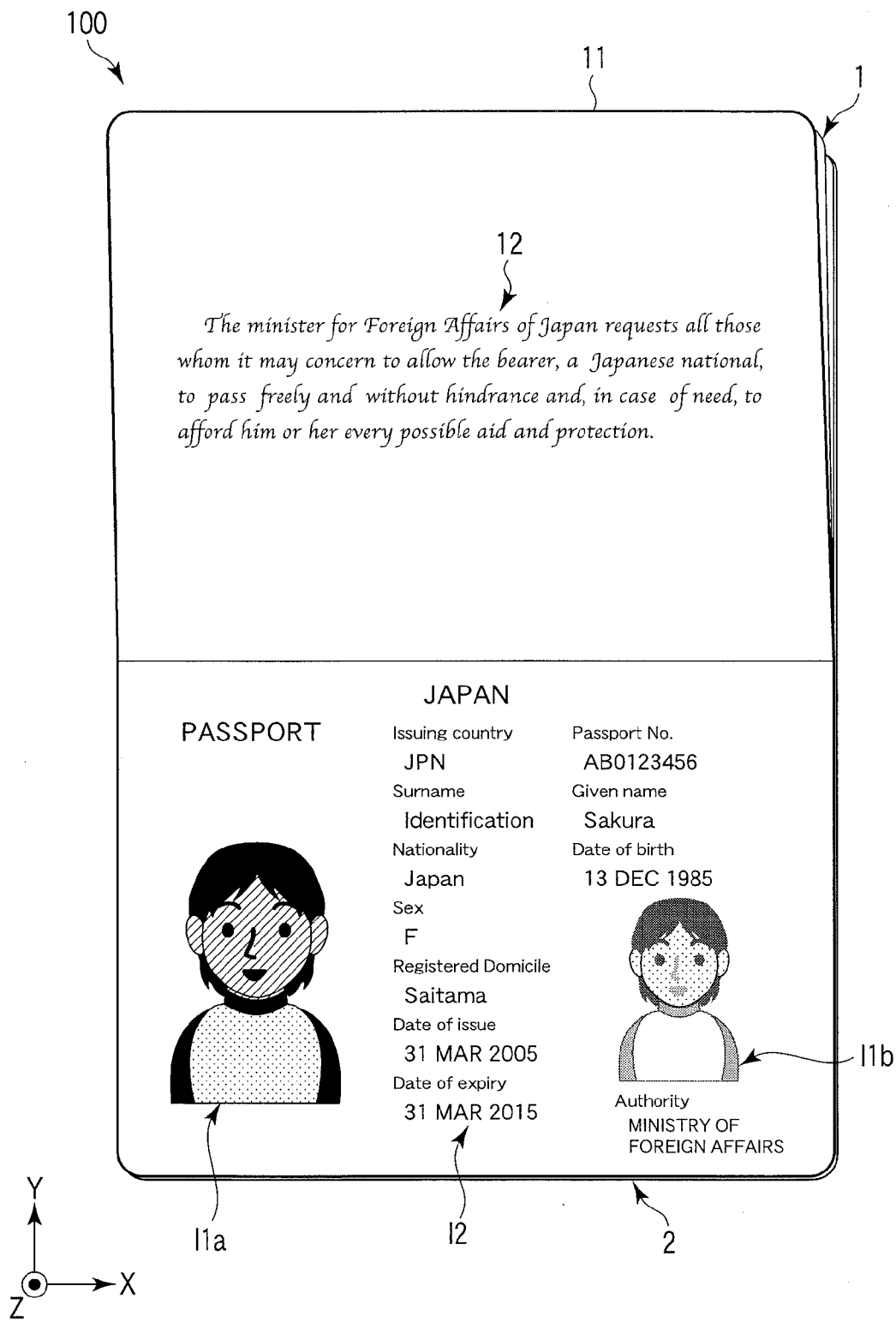
FIG. 1 is a plan view schematically showing a labeled article according to the first embodiment of the present invention.

Embodiments of the present invention will be hereinafter described in detail with reference to drawings. It should be noted that constituent elements achieving the same or similar functions are denoted with the same reference numerals throughout the drawings, and redundant explanation thereof is omitted.

First Embodiment

The first embodiment relates to, for example, the following techniques.

(1) An image display comprising a first image-displaying portion that displays first information about a certain object as a first image of object color, and a second image-displaying portion that displays second information about the object as a second image of structural color provided by a relief structure, the relief structure including at least one structure selected from the group consisting of diffraction grating, hologram, and light-scattering structure having an anisotropic light-scattering property.

(2) The image display according to the item (1), wherein when seen in a direction perpendicular to a display surface, the first and second image-displaying portions do not overlap each other.

(3) The image display according to the item (1), wherein when seen in a direction perpendicular to a display surface, the first and second image-displaying portions completely overlap each other.

(4) The image display according to the item (1), wherein when seen in a direction perpendicular to a display surface, the first and second image-displaying portions partially overlap each other.

(5) The image display according to any one of the items (1) to (4), wherein the second image-displaying portion includes dot-shaped portions, and each center of the dot-shaped portions is located on a lattice point of a virtual planar lattice.

(6) The image display according to any one of the items (1) to (5), wherein the object is a person.

(7) The image display according to the item (6), wherein the first and second images include the same pattern.

(8) The image display according to the item (6), wherein the first and second images include the same facial image.

(9) The image display according to any one of the items (1) to (8), wherein the size of the first image-displaying portion is 0.1 to 30 times the size of the second image-displaying portion.

(10) The image display according to any one of the items (1) to (9), wherein the second image-displaying portion has a visible light-transmitting property.

(11) The image display according to any one of the items (1) to (10), wherein the second image-displaying portion includes a layered structure including a first low refractive index layer having a visible light-transmitting property and a first high refractive index layer having a refractive index higher than that of the first low refractive index layer.

(12) The image display according to the item (11), wherein the first high refractive index layer is made of at least one material selected from the group consisting of metal, metal oxide, intermetallic compound, and resin.

(13) The image display according to any one of the items (1) to (12), further comprising a diffraction/scattering layer for diffracting or scattering external light.

(14) The image display according to the item (13), wherein the diffraction/scattering layer has a visible light-transmitting property and at least partially faces a front surface of the first image-displaying portion.

(15) The image display according to the item (14), wherein the diffraction/scattering layer includes a layered structure including a second low refractive index layer having a visible light-transmitting property and a second high refractive index layer having a refractive index higher than that of the second low refractive index layer.

(16) The image display according to the item (14), wherein the second high refractive index layer is made of at least one material selected from the group consisting of metal, metal oxide, intermetallic compound, and resin.

(17) A labeled article comprising the image display according to any one of the items (1) to (16), and a substrate supporting the image display.

(18) The labeled article according to the item (17), wherein the labeled article is an individual authentication medium.

The effects of the techniques according to the items (1) to (17) will be individually described.

In the image display according to the item (1), the first information about the certain object is displayed as a first image of object color. The first image of object color has excellent visibility.

In the image display according to the item (1), the second information about the above object is displayed as the second image of structural color provided by the relief structure. The relief structure includes at least one structure selected from the group consisting of diffraction grating, hologram, and light-scattering structure having anisotropic light-scattering property. The color of the image displayed by the diffraction grating or the hologram changes according to the observation direction or the illumination direction. The light-scattering performance of the light-scattering structure having the anisotropic light-scattering property changes according to the illumination direction. Therefore, this image display provides special visual effects. It is extremely difficult to tamper with the information displayed by the hologram, the diffraction grating or the light-scattering structure.

It should be noted that an "object color" is a color produced by a bulk material having smooth surface. When particular white light is used as the illumination light, the "object color" is determined by the absorption spectrum and the reflectance spectrum of the material itself that makes up the object.

On the other hand, a "structural color" is a color provided by the structure of the object. The "structural color" is generated by, for example, at least one of light diffraction and light scattering. Alternatively, the "structural color" is generated by confining light.

In the image display according to the item (2), the first and second image-displaying portions do not overlap each other when seen in a direction perpendicular to the display surface. Therefore, with the image display according to the item (2), one of the first and second images does not reduce the visibility of the other of the first and second images.

In the image display according to the item (3), the first and second image-displaying portions completely overlap each other when seen in a direction perpendicular to the display surface. The second image-displaying portion has, for example, a light-transmitting property, and is interposed between the first image-displaying portion and the observer. Therefore, the observer visually recognizes only the first image when the intensity of the diffracted light from the relief structure or the scattered light is low. When the intensity of the diffracted light from the relief structure or the scattered light is high, the observer visually recognizes only the second image, or visually recognizes the superposition of the first image and the second image. Therefore, for example, when the first and second images include the same pattern, and at least one of the illumination direction and the observation direction is changed, at least a part of the image displayed by this image display can change the color between object color and structural color without changing the pattern.

In the image display according to the item (4), the first and second image-displaying portions partially overlap each other when seen in a direction perpendicular to the display surface. The second image-displaying portion has, for example, a light-transmitting property, and is interposed at least partially between the first image-displaying portion and the observer. Therefore, the observer visually recognizes only the first image when the intensity of the diffracted light from the relief structure or the scattered light is low. When the intensity of the diffracted light from the relief structure or the scattered light is high, the observer visually recognizes only the second image, visually recognizes an image including a part of the first image and the second image, or visually recognizes an image including the superposition of the first image and the second image. Therefore, for example, when the first and second images respectively include the first and second patterns, and the first and second patterns are different from each other, the image displayed by the image display changes as follows. When at least one of the illumination direction and the observation direction is changed, the image displayed by the image display can change both of the pattern and the color.

In the image display according to the item (5), the second image-displaying portion includes dot-shaped portions, and each center of these dot-shaped portions is located on a lattice point of a virtual planar lattice. When thermal transfer using a thermal head is utilized, the second image-displaying portion having such structure is obtained in normal cases.

In the image display according to the item (6), the object is a person. In other words, the first and second information include personal information of the same person. In this case, it is more difficult to counterfeit the image display, and in addition, the image display can be used for individual authentication.

In the image display according to the item (7), the first and second images include the same pattern. Here, as an example, the image display can be verified by comparing the pattern of one of the first and second images with the pattern of the other of the first and second images.

In the image display according to the item (8), the first and second images include the same facial image. This image display can be used for, for example, individual authentication. Here, as an example, the image display can be verified by comparing the first and second images.

In the image display according to the item (9), the first image-displaying portion has a size of area 0.1 to 30 times the size of area of the second image-displaying portion. In this case, it is easy to compare the pattern of one of the first and second images with the pattern of the other of the first and second images.

In the image display according to the item (10), the second image-displaying portion has a visible light-transmitting property. In this case, the structure behind the second image-displaying portion may be seen through. In other words, more complicated visual effects can be achieved.

In the image display according to the item (11), the second image-displaying portion includes a layered structure including a first low refractive index layer having a visible light-transmitting property and a first high refractive index layer having a refractive index higher than that of the first low refractive index layer. This layered structure can be used as a reflection layer such as a reflection layer having a light-transmitting property. The reflection layer enhances the visual effects given by the relief structure. When the reflection layer has a light-transmitting property, the structure behind the second image-displaying portion may be seen through.

In the image display according to the item (12), the first high refractive index layer is made of at least one material selected from the group consisting of metal, metal oxide, intermetallic compound, and resin. These materials are suitable for achieving high reflectance and/or high transmittance.

The image display according to the item (13) further includes a diffraction/scattering layer for diffracting or scattering external light. When the diffraction/scattering layer is provided, a more complicated image can be displayed by the image display.

In the image display according to the item (14), the diffraction/scattering layer has a visible light-transmitting property, and at least partially faces the front surface of the first image-displaying portion. In this case, the structure behind the diffraction/scattering layer may be seen through. In other words, more complicated visual effects can be achieved.

The diffraction/scattering layer according to the item (15) includes a layered structure including a second low refractive index layer having a visible light-transmitting property and a second high refractive index layer having a refractive index higher than that of the second low refractive index layer. This layered structure can be used as a reflection layer such as a reflection layer having a light-transmitting property. The reflection layer enhances the visual effects given by the relief structure. When the reflection layer has a light-transmitting property, the structure behind the diffraction/scattering layer may be seen through.

In the image display according to the item (16), the second high refractive index layer is made of at least one material selected from the group consisting of metal, metal oxide, intermetallic compound, and resin. These materials are suitable for achieving high reflectance and/or high transmittance.

The labeled article according to the item (17) includes the image display according to any one of the items (1) to (16) and the substrate supporting this image display. Therefore, in the labeled article, high quality image is displayed by the image display, and in addition, it is difficult to tamper with the information recorded on the image display.

The labeled article according to the item (18) is an individual authentication medium. Since the individual authentication medium includes the above image display, the individual authentication medium achieves excellent anti-counterfeiting effects.

Subsequently, the first embodiment will be described with reference to drawings.

FIG. 1 is a plan view schematically showing a labeled article according to the first embodiment of the present invention.

The labeled article 100 shown in FIG. 1 is a booklet such as a passport used as an individual authentication medium. FIG. 1 depicts a booklet when the booklet is open.

In the explanation below, an X direction and a Y direction are directions parallel to a display surface of an image display and intersect each other. Typically, the X and Y directions are perpendicular to each other. A Z direction is a direction perpendicular to the X direction and the Y direction. In other words, the Z direction is a thickness direction.

This individual authentication medium 100 includes a cahier 1 and a cover sheet 2.

The cahier 1 includes one or more paper slips 11. Typically, print patterns 12 such as character strings and ground tints are provided on the paper slips 11. The cahier 1 is formed by folding, in two, a paper slip 11 or a bundle of a plurality of paper slips 11. The paper slip 11 may include, e.g., an IC (integrated circuit) chip on which personal information is to be recorded and an antenna which allows communication with the IC chip in a noncontacting manner.

The cover sheet 2 is folded in two. The cover sheet 2 and the cahier 1 are laid such that the cahier 1 is sandwiched by the cover sheet 2 when the booklet is closed. The cover sheet 2 and the cahier 1 are integrated by, e.g., binding them together at positions of creases thereof.

The cover sheet 2 displays an image including personal information. This personal information includes individual authentication information used for individual authentication. This personal information can be classified into, for example, biometric information and non-biometric personal information.

The biometric information is one of features of a living body that is unique to the individual. Typically, the biometric information is a feature that can be distinguished by an optical method. For example, the biometric information is at least one image or pattern of a face, a fingerprint, an iris and a vein.

The non-biometric personal information is personal information other than the biometric information. The non-biometric personal information is, for example, at least one of name, birth date, age, blood type, gender, nationality, address, domicile of origin, phone number, affiliation, and status. The non-biometric personal information may contain the characters entered by typewriting, may contain characters that are entered by mechanically-reading a hand-written characters such as a signature, or may contain both of them.

Figure 2:
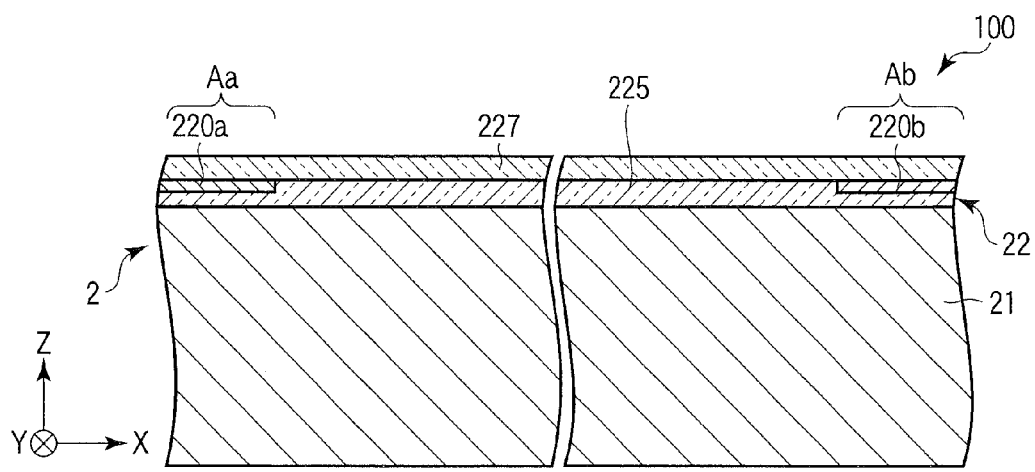
FIG. 2 is a cross sectional view schematically showing an example of a structure that can be employed is the labeled article shown in FIG. 1.

In FIG. 1, the cover sheet 2 displays images I1a, I1b, and I2. In FIG. 2, reference symbols Aa and Ab represent regions corresponding to the images I1a and I1b, respectively.

The images I1a and I2 are images of object color. In this case, "object color" is a color represented using absorption and reflection of light as described above. More specifically, an "object color" produced by a certain object is a color corresponding to optical properties of materials that make up the object such as a reflectance spectrum and a transmittance spectrum.

The images I1a and I2 can be visually recognized when they are illuminated with white light and observed with unaided eyes. One of the images I1a and I2 may be omitted.

The images I1a and I2 can be made with, e.g., at least one of dye and pigment or a mixture including a transparent resin and at least one of dye and pigment. In this case, the images I1a and I2 can be formed by thermal transfer recording method using a thermal head, an ink jet recording method, an electrophotographic method, or a combination of two or more of them. Alternatively, the images I1a and I2 can be formed by forming a layer including a heat-sensitive color-producing agent and drawing on this layer with laser beam. Alternatively, the images I1a and I2 can be formed by photography. Alternatively, a combination of these methods may be used. At least a part of the image I2 may be formed by thermal transfer recording method using a hot stamp, may be formed by a printing method, or may be formed using a combination of them.

The image I1b is an image of structural color. In this case, "structural color" is a color provided by the structure of the object as described above. The "structural color" is a color displayed by using refraction, diffraction, interference, reflection, or a combination of two or more of them. More specifically, the "structural color" produced by a certain object is a color that varies depending on optical properties of materials of the object such as a refractive spectrum and absorption spectrum, the structure of the object such as the shape of the surface or the interface, and the thickness and the number of layers. Typically, an object that produces the "structural color" is made of a transparent material, a material that can have metallic luster, or a combination thereof.

The "structural color" can be produced by, for example, hologram, diffraction grating, light-scattering structure, or a combination of two or more of them. A structure in which recessed portions and/or protruding portions are arranged regularly or irregularly can achieve an effect of confining incident light when a ratio of depth or height with respect to a width or a diameter of the recessed portion and the protruding portion is sufficiently large, and a pitch of the recessed portions and/or protruding portions is sufficiently small. In other words, a low reflectivity can be achieved. The "structural color" may be produced by such structure or a combination of such structure and one or more of hologram, diffraction grating, and light-scattering structure. Here, as an example, it is assumed that the image I1b is an image displayed by the diffraction grating.

The image I1b is formed by, for example, thermal transfer recording method using a thermal head. Alternatively, the image I1b may be formed by performing thermal transfer recording using a thermal head and thermal transfer recording using a hot stamp or a heat roll in order.

The images I1a and I1b include facial images of the same person. The facial image included in the image I1a and the facial image included in the image I1b may be the same or may be different. The facial image included in the image I1a and the facial image included in the image I1b may be of the same size or may be of different sizes. Alternatively, each of the images I1a and I1b may include other biometric information instead of the facial image, and may further include biometric information other than the facial image in addition to the facial image.

The image I1b may include non-biometric personal information instead of the biometric information, and may further include non-biometric personal information in addition to the biometric information. The image I1b may include non-personal information in addition to the personal information.

The image I2 includes non-biometric personal information and non-personal information. The image I2 constitutes, for example, one or more of characters, symbols, signs, and marks.

Figure 3:
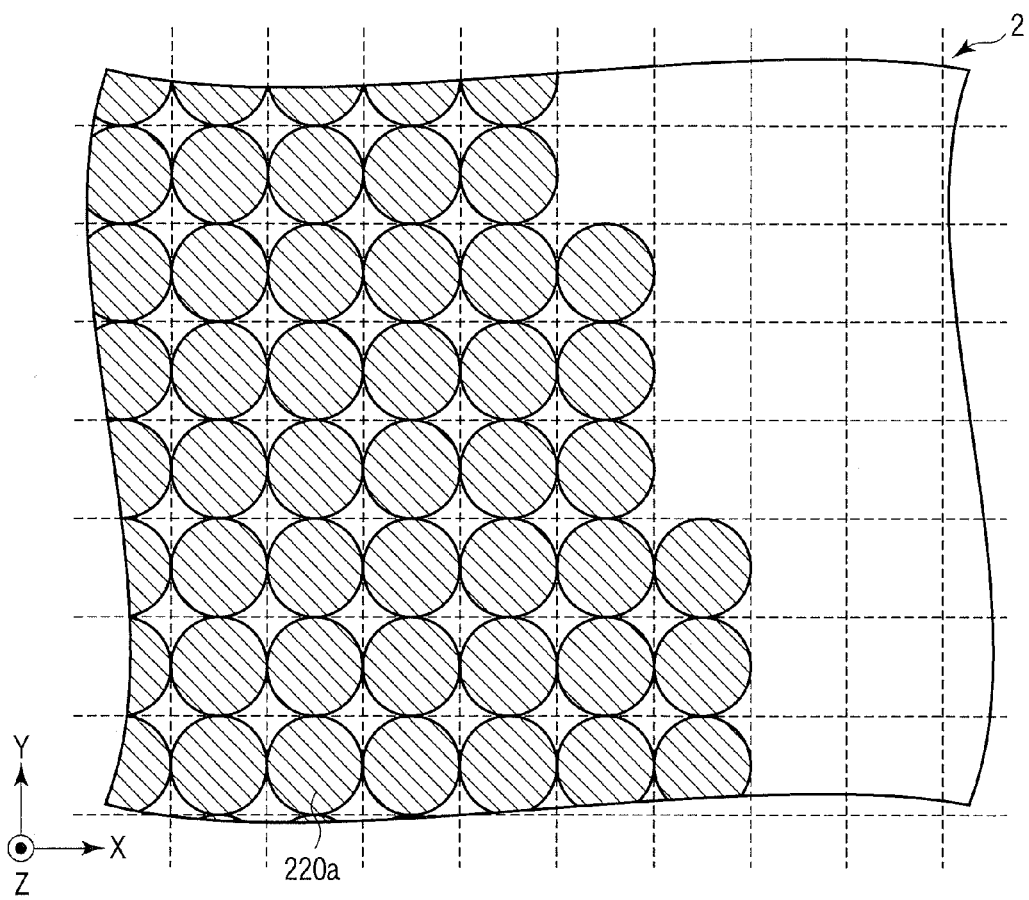
FIG. 3 is an enlarged plan view showing a part of the labeled article shown in FIG. 1.

Subsequently, the structure of the cover sheet 2 will be described with reference to FIGS. 2 to 4.

FIG. 2 is a cross sectional view schematically showing an example of a structure that can be employed is the labeled article shown in FIG. 1. FIG. 3 is an enlarged plan view showing a part of the labeled article shown in FIG. 1. FIG. 4 is an enlarged plan view showing another part of the labeled article shown in FIG. 1.

As shown in FIG. 2, the cover sheet 2 includes a cover sheet main body 21 and an image display 22.

The cover sheet main body 21 is a substrate of the individual authentication medium 100. The cover sheet main body 21 is folded in two so as to sandwich the cahier 1 when the labeled article 100 is closed.

Typically, the cover sheet main body 21 is a paper slip. The cover sheet main body 21 may have a single-layer structure, or may have a multilayer structure. The cover sheet main body 21 may be, for example, plain paper, coated paper, or synthetic paper. The synthetic paper may be, for example, a composite material made by bonding paper and a film made of resin such as polypropylene and polystyrene.

The color of the cover sheet main body 21 may be a single color, or a combination of a plurality of colors. In the latter case, the cover sheet main body 21 preferably includes white pigments such as titanium white, magnesium carbonate, zinc oxide, barium sulfate, silica, talc, clay, or calcium carbonate, so that the image display 22 can display an image with excellent visibility.

The thickness of the cover sheet main body 21 is usually within a range of 20 μm to 1000 μm, and preferably within a range of 50 μm to 800 μm.

The image display 22 is a layer having a multilayer structure. The image display 22 is adhered to one of the main surfaces of the cover sheet main body 21 that faces the cahier 1 when the labeled article 100 is closed.

The image display 22 includes image display layers 220a and 220b, an adhesive layer 225, and a protective layer 227.

The image display layer 220a is a first image-displaying portion that displays first information about a certain object as the first image I1a of object color. In this case, the image display layer 220a has a patterned shape corresponding to image I1a shown in FIGS. 2 and 3. This image display layer 220a may be made with at least one of dye and pigment and optionally resin. This image display layer 220a can be obtained by, for example, thermal transfer recording method using a thermal head, ink jet recording method, electrophotographic method, or a combination of two or more of them. The image display layer 220a formed by thermal transfer recording method using a thermal head is made of, for example, a plurality of dot-shaped portions arranged in a two-dimensional manner shown in FIG. 3.

The image display layer 220b is a second image-displaying portion that displays second information about the above object as the second image I1b of structural color provided by the relief structure. Here, the image display layer 220b includes hologram and/or diffraction grating as a relief structure, and has the patterned shape corresponding to the image I1b shown in FIGS. 2 and 4. In this case, as an example, the image display layer 220b is assumed to include a diffraction grating as a relief structure.

The image display layer 220b can be formed by, for example, thermal transfer recording method using a thermal head. The image display layer 220b formed by thermal transfer recording method using a thermal head is made of, for example, a plurality of dot-shaped portions arranged in a two-dimensional manner shown in FIG. 4. In this case, in a typical case, each of these dot-shaped portions plays a role of a pixel or a sub-pixel.

The pixel or sub-pixel may have various shapes. The shape of the pixel or sub-pixel seen from the Z direction is, for example, a circular shape, an elliptical shape, or a polygonal shape such as a triangular shape and a rectangular shape. In one or more pixels or sub-pixels, at least a part of the relief structure may be destroyed or deformed. In other words, the size of area in which structural color is displayed may be different among the pixels or the sub-pixels.

The surface of the pixels or the sub-pixels on the observer's side may be flat, or may include protruding portions or recessed portions. The protruding or recessed portion may have a cylindrical or square pillar shape. Alternatively, the protruding or recessed portion may have a conical shape or a pyramid shape such as a triangular pyramid, a square pyramid, a pentagonal pyramid, and a six-sided pyramid. Alternatively, the protruding or recessed portion may have a shape of a combination of cylindrical and conical shapes, or a shape of combination of a square pillar and a pyramid. Alternatively, the protruding or recessed portion may have a hemispherical shape, a semi-elliptical shape, or a bell shape. The entire surface of the pixels or sub-pixels on the observer's side may be a protruding surface or a recessed surface, or only a part of the surface of the pixels or sub-pixels on the observer's side may be a protruding surface or a recessed surface. The surface of the pixels or the sub-pixels on the observer's side may include only one of the protruding portion or the recessed portion, or may include a plurality of protruding portions or a plurality of recessed portions.

The distance between the pixels or the sub-pixels is, for example, 300 μm or less. When this distance is long, it is difficult to display the image I1b with excellent visibility. The lower limit value of this distance is zero. However, when the distance between the pixels or the sub-pixels is too short, display unevenness may occur.

The thickness of the image display layer 220b is, for example, within a range of 0.1 μm to 2.0 μm. The image display layer 220b may have uniform thickness, or the thickness may be different among the pixels or sub-pixels.

Typically, the image display layer 220b has a multilayer structure. The detailed structure of the image display layer 220b will be described later.

The size of the image display layer 220a is preferably 1 to 30 times the size of the image display layer 220b. This will be described below.

For example, when the image I1a is a color facial image, the facial image is generally represented using dots with 175 dots/inch. In other words, in this case, the size of the dot constituting the image I1a is generally 145 μm. This is because, in general, when the density of the dots is higher than 175 dots/inch, improvement of resolution cannot be perceived by observation with unaided eyes even if the density of dots is further increased.

Each dot-shaped portion constituting the image display layer 220b needs to have a size of, for example, 5 μm or more. This is because when the size of the dot-shaped portion is excessively reduced, the function of the diffraction grating may be lost.

Therefore, when it is assumed that the number of pixels of the image I1a and the number of pixels of the image I1b are the same, the size of the image display layer 220b is preferably 1/30 or more than 1/30 of the size of the image display layer 220a. In other words, the size of the image display layer 220a is preferably equal to or less than 30 times the size of the image display layer 220b.

Since the image I1b is displayed with the diffraction grating, the image I1b is preferably observed at a relatively small viewing angle. When the image I1b is excessively large, it is difficult to observe the image I1b at a relatively small viewing angle. Therefore, the size of the image display layer 220b is preferably 10 times or less than 10 times the size of the image display layer 220a. In other words, the size of the image display layer 220a is preferably equal to or less than 0.1 times the size of the image display layer 220b.

The protective layer 227 faces the cover sheet main body 21 with the image display layers 220a and 220b interposed therebetween. The release protective layer 227 has a light-transmitting property, and is transparent in a typical case. The protective layer 227 may be omitted.

The protective layer 227 is made of, for example, a resin such as thermoplastic resins, thermosetting resins, and ultraviolet or electron curable resin. When a transfer foil is used to adhere the image display 22 to the cover sheet main body 21, it is preferable to use a thermoplastic resin in view of flexibility and foil cutting property.

Thermoplastic resin may be, for example, polyacrylic ester resin, chlorinated rubber resin, vinyl chloride-vinyl acetate copolymer resin, cellulose resin, chlorinated polypropylene resin, epoxy resin, polyester resin, nitrocellulose resin, styrene acrylate resin, polyether resin, polycarbonate resin, or a mixture thereof. In view of foil cutting property and wear resistant property, this resin may be added with one or more of slip additives such as wax including petroleum wax and plant-based wax, higher fatty acid such as stearic acid, metal salt or ester thereof, and silicone oil; an organic filler made of an organic material such as polytetrafluoroethylene, polyethylene, silicone resin, and polyacrylonitrile; and an inorganic filler made of an inorganic material such as silica.

The thickness of the protective layer 227 is, for example, within a range of 1 μm to 20 μm. In the case where the protective layer 227 is thin, when the protective layer 227 is partially removed in order to tamper with information, there is a possibility that this may be noticed by observing the image display 22 with unaided eyes. On the other hand, in the case where the protective layer 227 is thick, when the commercially available film is attached to the removed portion, it may be impossible to notice the fact by observing the image display 22 with unaided eyes that the protective layer 227 is partially replaced with the commercially available film.

The protective layer 227 may have in-plane uniformity of optical property. Alternatively, the protective layer 227 may have in-plane unevenness of optical property.

The protective layer 227 may include one or more items selected from the group consisting of hologram, diffraction grating, infrared absorbing layer, fluorescence layer, and print pattern providing object color. When the protective layer 227 is partially removed, this can be readily noticed. It should be noted that the infrared absorbing layer and the fluorescence layer may be a continuous film, or may be patterned in a grid shape, an island shape, or a stripe shape. In the latter case, the protective layer 227 employs, for example, a multilayer structure including a patterned infrared absorbing layer or fluorescence layer and a light-transmitting layer supporting this.

The adhesive layer 225 is interposed between the cover sheet main body 21 and each of the image display layers 220a and 220b and between the cover sheet main body 21 and the protective layer 227. The adhesive layer 225 may be transparent or opaque.

The adhesive layer 225 is made of, for example, thermoplastic resin. The materials of the adhesive layer 225 may be, for example, urethane resin, butyral resin, polyester resin, vinyl chloride resin such as polyvinyl chloride and vinyl chloride-vinyl acetate copolymer, polyurethane resin, epoxy resin, chlorinated polypropylene, acrylic resin, polystyrene, polyvinyl benzene, styrene-butadiene copolymer resin, vinyl resin such as polyvinyl resin obtained from styrene and alkyl methacrylates (the number of carbons of the alkyl group is 2 to 6), rubber-based material, or a mixture containing two or more of them.

The adhesive layer 225 may be added with one or more of wax, higher fatty acid such as stearic acid, metal salt and ester thereof, plasticizer, an organic filler made of an organic material such as polytetrafluoroethylene, polyethylene, silicone resin, and polyacrylonitrile, and an inorganic filler made of an inorganic material such as silica.

The adhesive layer 225 may be a constituent element of the image display 22, or may not be a constituent element of the image display 22. The adhesive layer 225 may be omitted.

A part of the cover sheet 2 corresponding to the image I2 may employ, for example, substantially the same structure as that described for the portion corresponding to the image I1a except that the displayed image is different. Parts of the cover sheet 2 corresponding to the images I1a and I2 may have the same layered structure, or may have different layered structures.

Subsequently, the structure of the image display layer 220b will be described with reference to FIG. 5.

FIG. 5 is a cross sectional view schematically showing an example of a structure that can be employed in a second image-displaying portion included in the labeled article shown in FIG. 1.

As shown in FIG. 5, the image display layer 220b includes a relief structure formation layer 223b, a reflection layer 224b, and an adhesive layer 225b.

The relief structure formation layer 223b is a layer having a main surface on which a relief structure is provided. This relief structure includes, for example, at least one of diffraction grating and hologram as a diffraction structure. This relief structure displays the second image I1b of structural color described above.

The relief structure formation layer 223b includes, for example, first to third portions producing different colors when they are illuminated with white light in a particular illumination direction and observed in a particular observation direction. The first to third portions are different from each other in at least one of the grating constant and the lengthwise direction of the grooves of the diffraction grating. Under a particular observation condition, the first to third portions produce, for example, blue, green, and red colors, respectively.

The relief structure formation layer 223b may have a light-transmitting property or may not have a light-transmitting property. Typically, the relief structure formation layer 223b has a light-transmitting property.

The material of the relief structure formation layer 223b is, for example, a resin such as photo-curable resin, thermosetting resin, and thermoplastic resin. The photo-curable resin is, for example, polycarbonate resin, acrylic resin, fluorine resin, silicone acrylic resin, epoxy acrylate resin, polystyrene resin, cycloolefin polymer, methylstyrene resin, fluorene resin, polyethylene terephthalate resin, or polypropylene resin. Thermosetting resin is, for example, styrene-acrylonitrile copolymer resin, phenol resin, melamine resin, urea resin, or alkyd resin. Thermoplastic resin is, for example, polypropylene resin, polyethylene terephthalate resin, or polyacetal resin. The hardened materials of these resins have a light-transmitting property, and the refractive indices thereof are generally about 1.5.

The reflection layer 224b is formed on the relief structure formation layer 223b. The reflection layer 224b covers at least a part of the surface of the relief structure formation layer 223b on which the relief structure is provided. Although the reflection layer 224b may be omitted, the visibility of the image produced by the diffraction structure improves when the reflection layer 224b is provided.

The reflection layer 224b may be, for example, a transparent reflection layer or an opaque metal reflection layer. The reflection layer 224b can be formed by, for example, vacuum deposition method such as vacuum evaporation and sputtering. When the reflection layer 224b includes resin, the reflection layer 224b may be formed using application or printing.

When a transparent reflection layer is used as the reflection layer 224b, patterns of pictures, characters, and the like can be seen from the front side of the image display 22 even if they are arranged on the back side of the reflection layer 224b.

The transparent reflection layer may be, for example, a layer made of a transparent material whose refractive index is different from that of the relief structure formation layer 223b. The transparent reflection layer made of a transparent material may have a single-layer structure or a multilayer structure. In the latter case, the transparent reflection layer may be designed to cause multiple-beam interference. In other words, the transparent reflection layer may be a multilayer film including a low refractive index layer and a high refractive index layer.

Transparent materials that can be used for the transparent reflection layer include, for example, metal oxide, intermetallic compound, resin, metal oxide, and intermetallic compound. More specifically, the transparent material may be, for example, $Sb_2S_3$, $Fe_2O_3$, $TiO_2$, CdS, $CeO_2$, ZnS, $PbCl_2$, CdO, $Sb_2O_3$, $WO_3$, $SiO_2$, $Si_2O_3$, $In_2O_3$, PbO, $Ta_2O_3$, ZnO, $ZrO_2$, $Cd_2O_3$, $Al_2O_3$, and Ge.

Typically, the transparent reflection layer of the single-layer structure made of the transparent dielectric has a higher refractive index with respect to the light of the wavelength described above as compared with the relief structure formation layer 223b. The difference between these refractive indices is, for example, 0.2 or more. When the single-layer structure is employed as the transparent reflection layer, the thickness thereof is within a range of, for example, 10 nm to 1,000 nm.

Alternatively, the transparent reflection layer may be a metal layer, e.g., a metal layer whose thickness is less than 20 nm. The material of the metal layer is, for example, an elemental metal such as chromium, nickel, cobalt, aluminum, iron, tin, titanium, silver, gold, and copper, or an alloy of the above metals. Although the metal layer has light shielding property when it is thick, the metal layer becomes, for example, transparent when the thickness of the metal layer is decreased. For example, when an aluminum layer whose thickness is within a range of 20 to 40 nm is used, metallic luster can be observed under a certain observation condition, but when the observation angle is changed, the background can be seen through.

A thicker metal layer can also be used as the transparent reflection layer. For example, a relatively thick metal layer is formed, and many apertures having diameters or widths that can be hardly noticed with unaided eyes are formed in the relatively thick metal layer. Alternatively, this metal layer is patterned into, for example, a pattern of dots or lines. As a result, the transparent reflection layer made of the metal material can be obtained.

As the material of the opaque metal reflection layer, for example, the materials described for the metal layer that serves as the transparent reflection layer can be used. Typically, the opaque metal reflection layer is not provided with apertures having diameters or widths that can be hardly noticed with unaided eyes, and has a thickness sufficient for shielding the light.

A layer including a transparent resin and particles dispersed within the resin may be used as the transparent reflection layer or the opaque reflection layer. For example, particles made of metal material such as elemental metal and alloy or particles made of transparent dielectric such as transparent metal oxide and transparent resin can be used as the particles. Typically, the particles are made of a material having a high refractive index such as titanium dioxide. In the transparent resin, flakes may be dispersed instead of dispersing the particles.

The adhesive layer 225b is formed on the reflection layer 224b. The adhesive layer 225b adheres the laminated body including the relief structure formation layer 223b and the reflection layer 224b to the protective layer 227 shown in FIG. 2. The adhesive layer 225b is made of, for example, thermoplastic resin.

The material of the adhesive layer 225b may be, for example, urethane resin, butyral resin, polyester resin, vinyl chloride resin such as polyvinyl chloride and vinyl chloride-vinyl acetate copolymer, polyurethane resin, epoxy resin, chlorinated polypropylene, acrylic resin, polystyrene, polyvinyl benzene, styrene-butadiene copolymer resin, vinyl resin such as polyvinyl resin obtained from styrene and alkyl methacrylates (the number of carbons of the alkyl group is 2 to 6), rubber-based material, or a mixture containing two or more of them.

The adhesive layer 225b may be added with one or more of wax, higher fatty acid such as stearic acid, metal salt and ester thereof, plasticizer, organic filler made of an organic material such as polytetrafluoroethylene, polyethylene, silicone resin, and polyacrylonitrile, and inorganic filler made of an inorganic material such as silica.

The adhesive layer 225b may be a constituent element of the image display 22, or may not be a constituent element of the image display 22. In this labeled article 100, the adhesive layer 225b may be omitted.

This image display 22 displays a part of personal information using hologram and/or diffraction grating. It is extremely difficult to tamper with the personal information, in particular, biometric information, displayed by the hologram and/or the diffraction grating. In the case where the diffraction structure is used, a higher-resolution image can be displayed as compared with the case of using pearl pigments. In other words, this image display 22 can display an image with an excellent quality, and it is difficult to tamper with the information.

This labeled article 100 can be manufactured by the following method, for example.

First, a booklet main body is prepared. The booklet main body includes the cahier 1 and the cover sheet main body 21. The booklet main body has substantially the same structure as the labeled article 100 except that the image display 22 is omitted. A part of the image I2 shown in FIG. 1 that corresponds to the non-personal information may be printed on the booklet main body.

Subsequently, personal information such as name, address, and date of birth is printed on the cover sheet main body 21. This print process uses, for example, intaglio printing or offset printing. At this occasion, at least one of line screen, colored pattern, and micro-letters may be further printed. When they are printed, ordinary printing ink may be used, or special inks such as optically variable ink and fluorescent ink may be used.

Subsequently, the adhesive layer 225 shown in FIG. 2 is formed on the cover sheet main body 21. For example, liquid adhesive including vinyl chloride-vinyl acetate copolymer is applied to the cover sheet main body 21 according to print process such as roll-coating and screen printing. Alternatively, a film having a surface coated with adhesive is adhered to the cover sheet main body 21.

In addition, in order to form the image display layers 220a and 220b, the facial image of a person is taken with a camera. Using image data obtained by this, a first transfer foil for the image display layer 220a and a second transfer foil for the image display layer 220b are manufactured. It should be noted that the first transfer foil includes a first transfer material layer and a first support body releasably supporting the first transfer material layer. On the other hand, the second transfer foil includes a second transfer material layer and a second support body releasably supporting the second transfer material layer.

The first transfer material layer includes a pattern corresponding to the image I1a displayed by the image display layer 220a. This pattern can be formed by various kinds of methods such as printing method such as inkjet printing, silver halide photographic method, dye sublimation method, hot melt transfer process, resin type pigment transfer method, and electrophotographic method. The image display layer 220a may be formed on the adhesive layer 225 by print process instead of forming it using a transfer foil.

Like the first transfer material layer, the second transfer material layer also includes a pattern corresponding to the image I1b displayed by the image display layer 220b. This pattern may be formed using, for example, electron beam lithography apparatus. For example, the diffraction grating pattern is drawn on the photosensitive resin layer formed on the polyethylene terephthalate (PET) substrate with electron beam based on the above image data. As the photosensitive resin, for example, a resin containing thiazine sensitizing dye, hexavalent chromium compound, and water-soluble polymer is preferably used. When this resin is used, the following effects can be obtained: the dissolved state of the sensitizing dye can be kept without drying in an ammonia atmosphere, and the transmittance can be improved. When the electron beam drawing process is finished, non-drawn portions of the photosensitive resin is removed by developing process, and subsequently, washing and drying processes are performed. As a result, the relief structure formation layer 223b shown in FIG. 5 is obtained. Thereafter, the reflection layer 224b is formed on the relief structure formation layer 223b by vacuum evaporation method, for example. As described above, the second transfer material layer including the relief structure formation layer 223b and the reflection layer 224b is obtained.

Thereafter, at least a part of the first transfer material layer is transferred from the first support body to the cover sheet main body 21. In addition, at least a part of the second transfer material layer is transferred from the second support body to the cover sheet main body 21. For example, the hot stamp method is used to transfer them. In this manner, the image display layers 220a and 220b are obtained.

Further, for example, coating liquid containing acrylic resin is applied to the image display layers 220a and 220b and the adhesive layer 225, so that the protective layer 227 shown in FIG. 2 is formed. When the coating liquid is applied, for example, roll coating method or screen printing method is used. Instead of applying the coating liquid, a film serving as the protective layer 227 may be attached to the image display layers 220a and 220b and the adhesive layer 225.

The labeled article 100 described above can be modified in various forms. Although an example where the relief structure includes the diffraction structure has been described here, the relief structure may include a light-scattering structure having anisotropic light-scattering property. Alternatively, the labeled article 100 may employ the following configuration.

Figure 6:
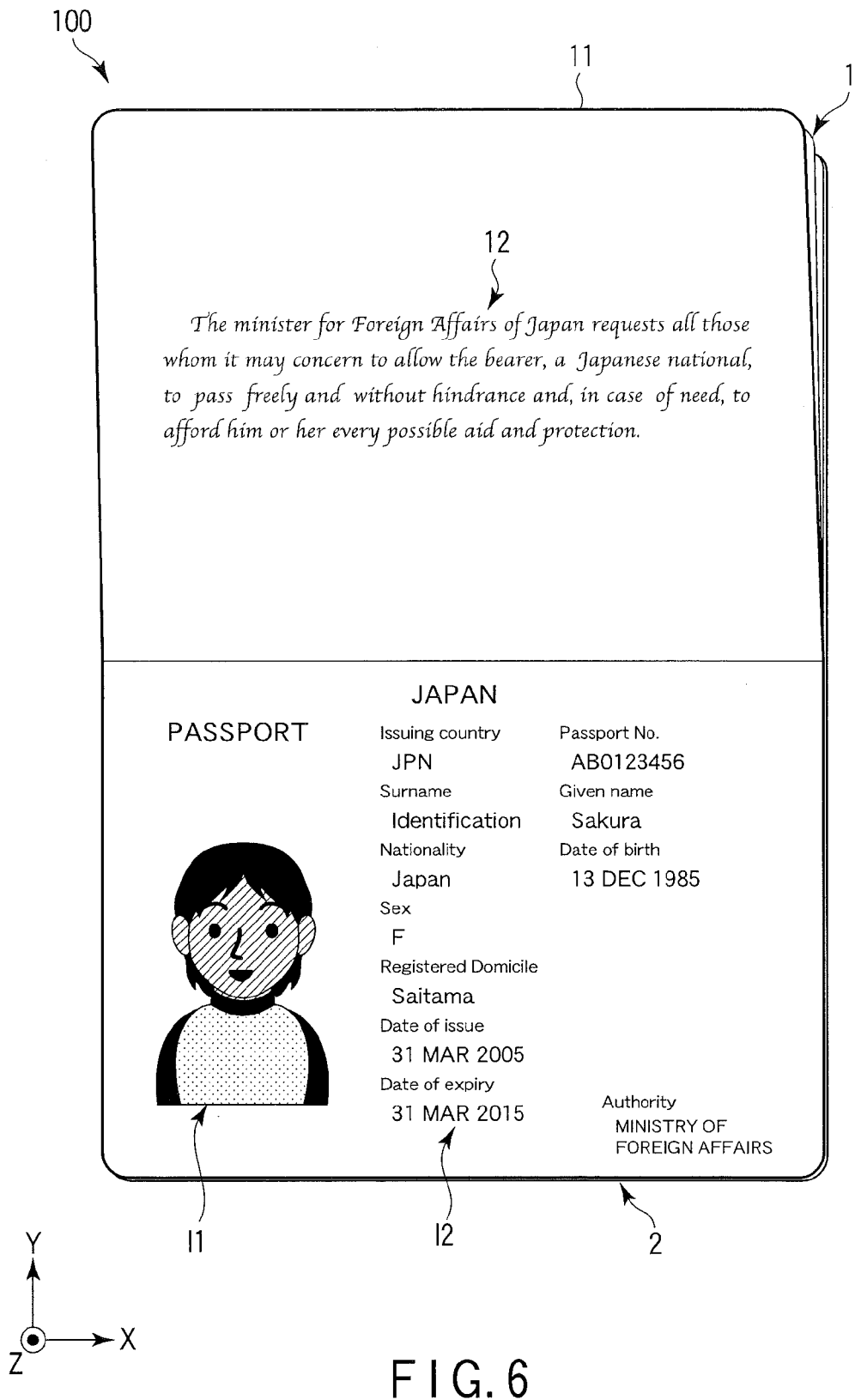
FIG. 6 is a plan view schematically showing a modification of the labeled article shown in FIG. 1.
Figure 7:
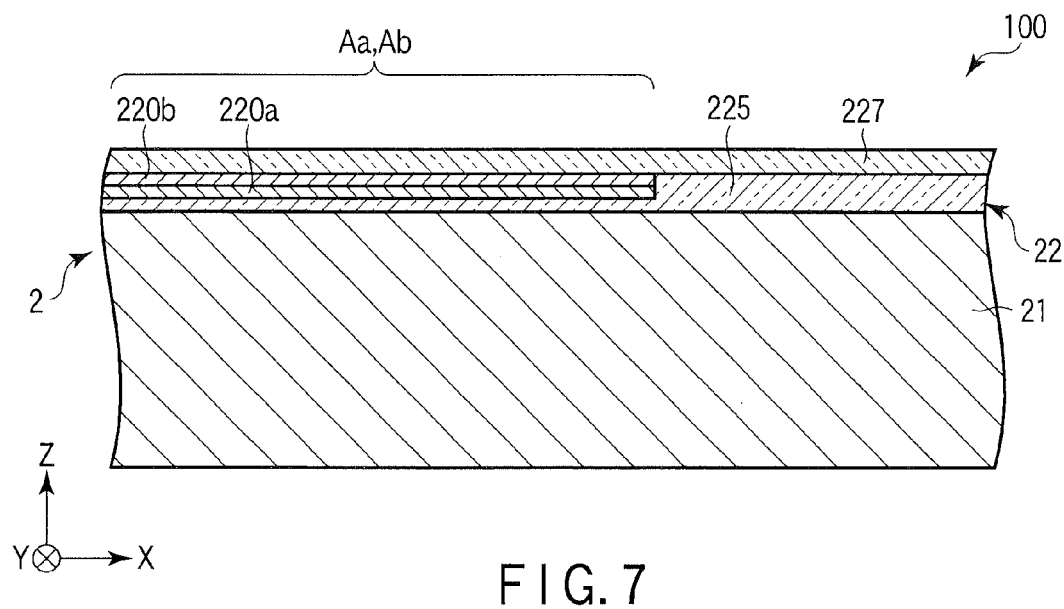
FIG. 7 is a cross sectional view schematically showing an example of a structure that can be employed in the labeled article shown in FIG. 6.

FIG. 6 is a plan view schematically showing a modification of the labeled article shown in FIG. 1. FIG. 7 is a cross sectional view schematically showing an example of a structure that can be employed in the labeled article shown in FIG. 6.

The labeled article 100 shown in FIG. 6 displays an image I1 instead of the images I1a and I1b.

As shown in FIG. 7, in a labeled article 100, image display layers 220a and 220b completely overlap each other when seen in a direction perpendicular to the display surface. The image display layer 220b has a light-transmitting property, and is interposed between the image display layer 220a and an observer.

Therefore, when the intensity of the diffracted light or the scattered light emitted by the relief structure is low, the observer sees only the first image I1a described with reference to FIG. 1 as the image I1 shown in FIG. 6. On the other hand, when the intensity of the diffracted light or the scattered light emitted by the relief structure is high, the observer sees only the second image I1b described with reference to FIG. 1 as the image I1 shown in FIG. 6, or sees the superposition of the first image I1a and the second image I1b.

Therefore, for example, when the images I1a and I1b are of the same pattern, and at least one of the illumination direction and the observation direction is changed, the image I1 displayed by this image display 22 can change the color between object color and structural color without changing the pattern.

Figure 8:
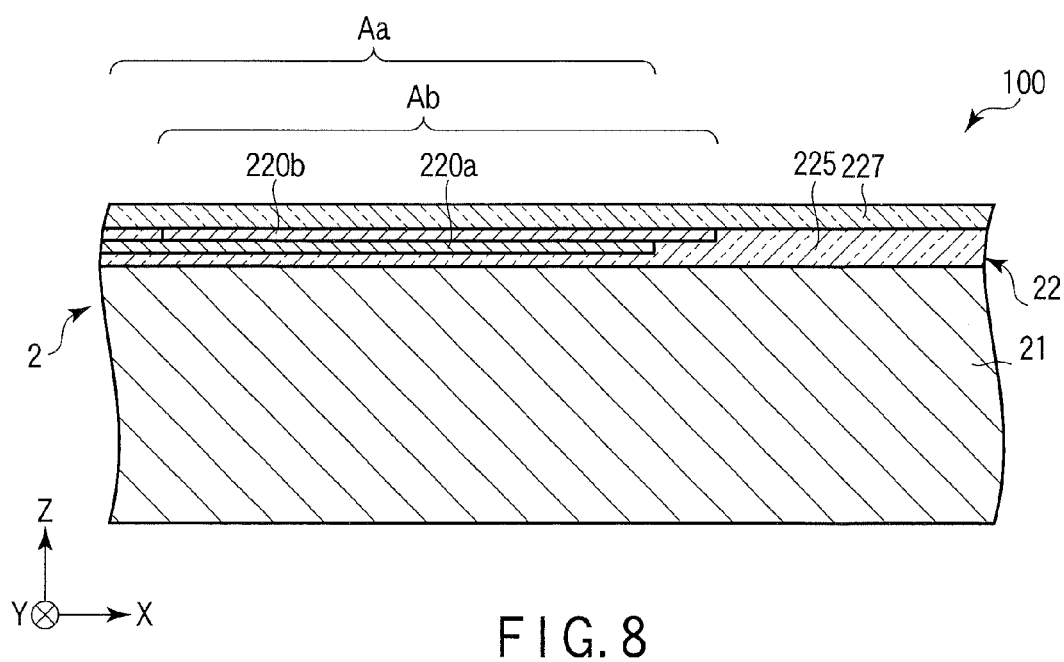
FIG. 8 is a cross sectional view schematically showing another example of a structure that can be employed in the labeled article shown in FIG. 6.

FIG. 8 is a cross sectional view schematically showing another example of a structure that can be employed in the labeled article shown in FIG. 6.

The structure shown in FIG. 8 is different from the structure described with reference to FIGS. 6 and 7 in that the image display layers 220a and 220b partially overlap each other when seen in a direction perpendicular to the display surface. Therefore, when overlapping portions of the images I1a and I1b include the same pattern, and at least one of the illumination direction and the observation direction is changed, a part of the image I1 displayed by the image display 22 can change the color between object color and structural color without changing the pattern. Alternatively, when the images I1a and I1b respectively include first and second patterns which are different from each other, and at least one of the illumination direction and the observation direction is changed, both of the pattern and the color can be changed in the image I1 displayed by this image display 22.

A configuration may be employed in which a three-dimensional image can be displayed as the image I1b.

FIG. 9 is a plan view schematically showing an example of a structure that can be used to display a three-dimensional image.

In FIG. 9, reference symbols $CO_R$ and $CO_L$ denote right eye pixel and left eye pixel, respectively. Reference symbol G denotes a groove of a diffraction grating.

An image display layer 220b shown in FIG. 9 includes sub-pixels $CO_R$ and $CO_L$. Pixels each including the sub-pixels $CO_R$ and $CO_L$ are arranged in the X and Y directions.

Each of the sub-pixels $CO_R$ and $CO_L$ includes the diffraction grating as a relief structure. The sub-pixels $CO_R$ and $CO_L$ have the same structure except that the directions of the grooves G of the diffraction grating are different.

In each of the sub-pixels $CO_R$ and $CO_L$, the grooves G have the same shape, and the grooves G are arranged parallel to each other with a certain pitch. In the sub-pixels $CO_R$ and the sub-pixels $CO_L$, the shapes and the pitches of the groove G are the same. In the example shown in FIG. 9, each groove G is curved in the form of a segment of a circle. Alternatively, these grooves G may not be curved.

In each of the sub-pixels $CO_R$ and $CO_L$, the lengthwise direction of the groove G is inclined with respect to the X and Y directions. In the sub-pixels $CO_R$ and the sub-pixels $CO_L$, the inclination angles that the lengthwise directions of the grooves G forms with the X or Y direction are the same, but the lengthwise directions are inversely inclined with respect to the X or Y direction.

Under particular diffuse illumination conditions, the diffraction grating emits the diffracted light with the highest intensity in the direction perpendicular to the lengthwise direction of the groove G. Therefore, when the above structure is employed, the direction in which the sub-pixel $CO_R$ for the right eye emits the diffracted light with the highest intensity and the direction in which the sub-pixel $CO_L$ for the left eye emits the diffracted light with the highest intensity can be made different from each other.

When the image display layer 220b employs the structure of FIG. 9, it is possible by utilizing the above that a pixel group including the sub-pixels $CO_R$ displays an image for the right eye and a pixel group including the sub-pixels $CO_L$ displays an image for the left eye. For example, the image for the right eye can be displayed by setting the intensity of the diffracted light emitted by some of the sub-pixels $CO_R$ at a level lower than the intensity of the diffracted light emitted by the other sub-pixels $CO_R$. On the other hand, the image for the left eye can be displayed by setting the intensity of the diffracted light emitted by some of the sub-pixels $CO_L$ at a level lower than the intensity of the diffracted light emitted by the other sub-pixels $CO_L$. By doing so, the three-dimensional image can be displayed.

In FIG. 9, the diffraction grating array having the simple structure is depicted for the sake of simplicity of explanation. Other configurations may also be employed in the diffraction grating array in order to display the three-dimensional image. For example, the diffraction grating array may include not only the two kinds of sub-pixels $CO_R$ and $CO_L$ whose lengthwise directions of the grooves G have the same inclination angle and are inversely inclined but also sub-pixels whose inclination angles in the lengthwise directions of the grooves G are different. The diffraction grating array for displaying the three-dimensional image may employ the configuration capable of displaying a color image.

The diffraction grating array for displaying the three-dimensional image can be designed using, for example, the following method.

FIG. 10 is a view schematically showing an example of a method of shooting a three-dimensional image.

For shooting a three-dimensional image, for example, a plurality of cameras $C_R$, $C_C$, and $C_L$ are arranged on the same horizontal plane as shown in FIG. 10, and a subject S is shot at the same time with these cameras $C_R$, $C_C$, and $C_L$. Alternatively, it is possible that one camera moves on the horizontal plane, and the subject S is shot at a plurality of positions.

Subsequently, image data obtained by this shooting are processed. In the structure shown in FIG. 9, the diffraction grating array is constituted by the two kinds of sub-pixels $CO_R$ and $CO_L$, and therefore, only the image data obtained at two shooting positions are used. For example, the subject S is shot with the cameras $C_R$ and $C_L$ shown in FIG. 10, and the image data obtained therefrom are processed.

More specifically, regions corresponding to the sub-pixels $CO_R$ of the structure shown in FIG. 9 are selected from the image shot with the camera $C_R$ to obtain an element image for the right eye. On the other hand, regions corresponding to the sub-pixels $CO_L$ of the structure shown in FIG. 9 are selected from the image shot with the camera $C_L$ to obtain an element image for the left eye. Then, these element images are superposed on each other so as to produce a composite image (not shown).

Subsequently, the grayscale level that is to be displayed by each of the sub-pixels $CO_R$ and $CO_L$ is determined from the composite image. For example, the size of area of the diffraction grating is determined in each of the sub-pixels $CO_R$ and $CO_L$. Thus, the structure of the diffraction grating array that is to be formed is obtained.

The above-described labeled article 100 may also be modified to other forms.

Figure 11:
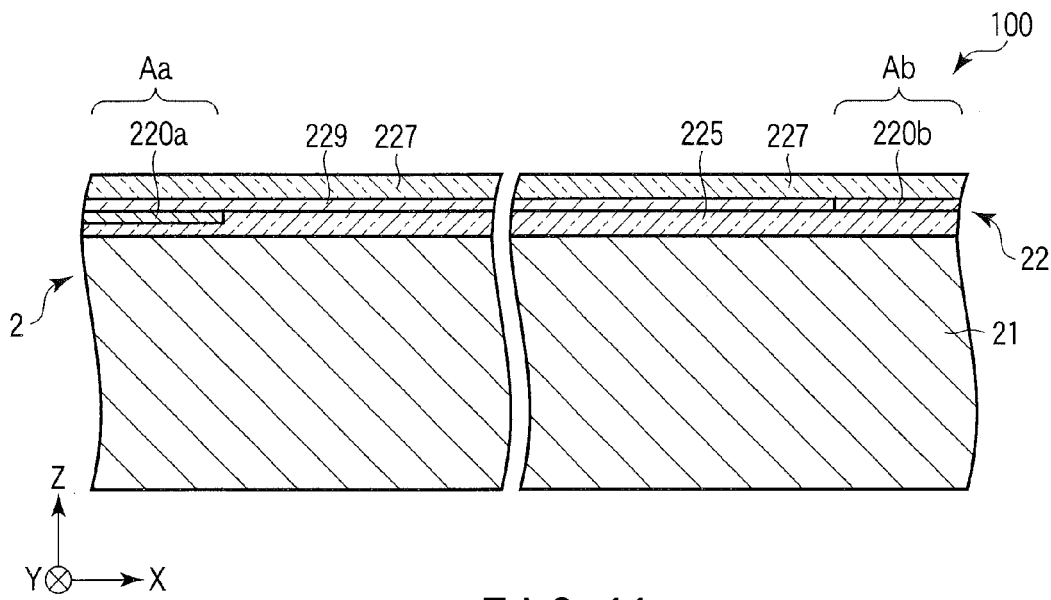
FIG. 11 is a cross sectional view schematically showing another example of a structure that can be employed in the labeled article shown in FIG. 1.
Figure 12:
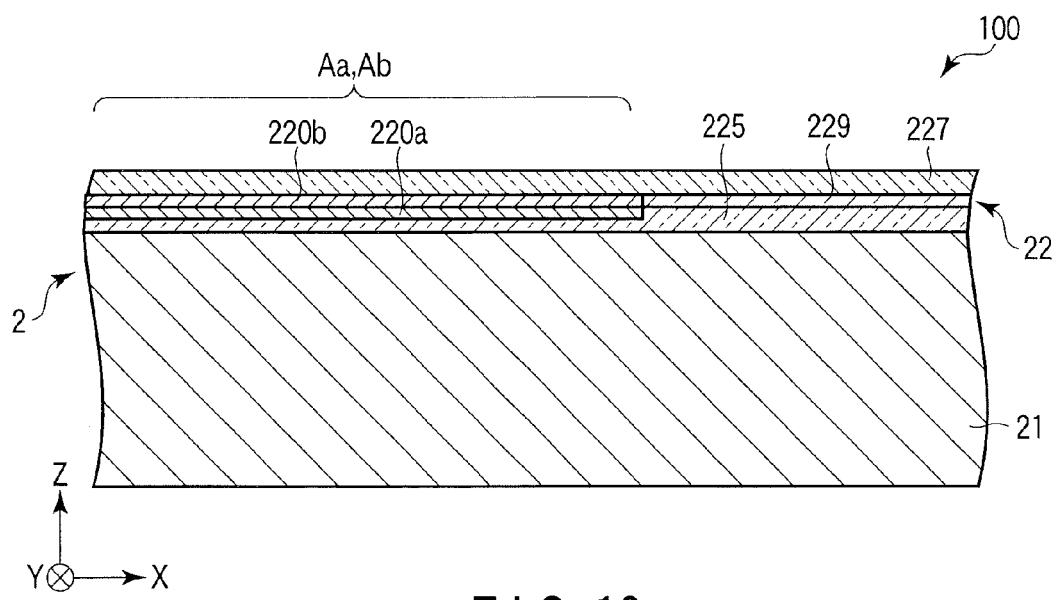
FIG. 12 is a cross sectional view schematically showing still another example of a structure that can be employed in the labeled article shown in FIG. 6.
Figure 13:
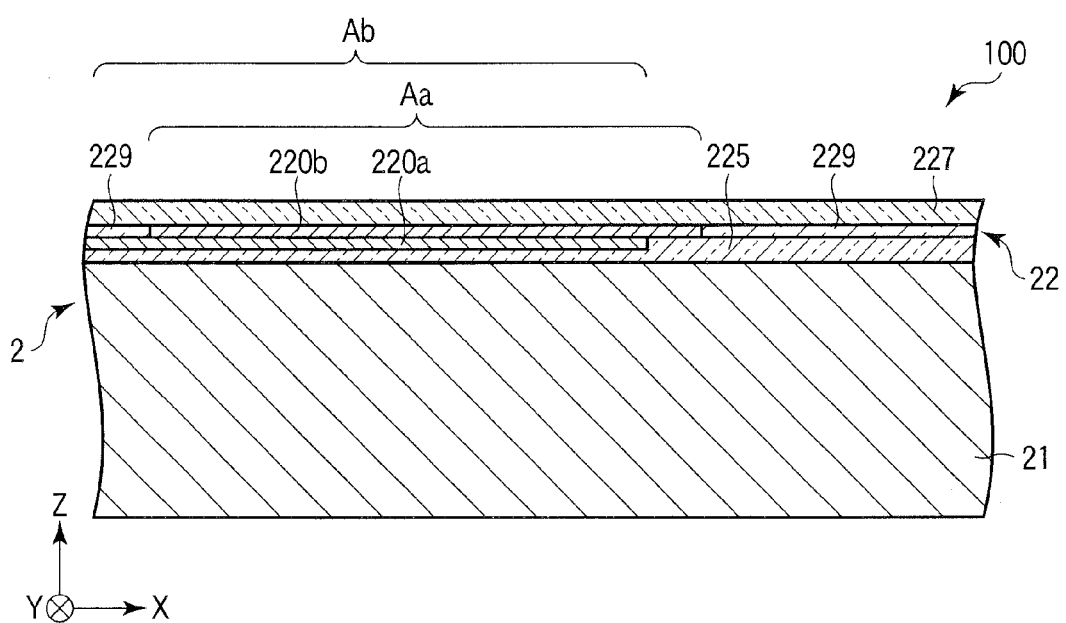
FIG. 13 is a cross sectional view schematically showing still another example of a structure that can be employed in the labeled article shown in FIG. 6.

FIG. 11 is a cross sectional view schematically showing another example of a structure that can be employed in the labeled article shown in FIG. 1. FIG. 12 is a cross sectional view schematically showing still another example of a structure that can be employed in the labeled article shown in FIG. 6. FIG. 13 is a cross sectional view schematically showing still another example of a structure that can be employed in the labeled article shown in FIG. 6.

The labeled article 100 shown in FIG. 11 is the same as the labeled article 100 described with reference to FIGS. 1 to 5 except that the labeled article 100 shown in FIG. 11 further includes an optical variable layer 229. The labeled article 100 shown in FIG. 12 is the same as the labeled article 100 described with reference to FIGS. 6 to 7 except that the labeled article 100 shown in FIG. 12 further includes the optical variable layer 229. The labeled article 100 shown in FIG. 13 is the same as the labeled article 100 described with reference to FIG. 8 except that the labeled article 100 shown in FIG. 13 further includes the optical variable layer 229.

The optical variable layer 229 is interposed between the image display layer 220a and the protective layer 227 and between the adhesive layer 225 and the protective layer 227. The optical variable layer 229 does not overlap the image display layer 220b.

The optical variable layer 229 is a diffraction/scattering layer that diffracts or scatters light. The optical variable layer 229 has, for example, a light-transmitting property. The hue or brightness of the display color of the optical variable layer 229 is changed when changing at least one of illumination direction and observation direction. The optical variable layer 229 displays an image that can be distinguished from an image I1b displayed by the image display layer 220b.

The optical variable layer 229 is, for example, a light-transmitting layer provided with a relief structure on a main surface thereof. This relief structure includes, for example, at least one structure selected from the group consisting of diffraction grating, hologram, and light-scattering structure having anisotropic light-scattering property. Alternatively, the optical variable layer 229 is a multilayer film obtained by stacking a plurality of layers having different refractive indices so as to cause multiple-beam interference.

When the optical variable layer 229 is provided, the image display 22 can display more complicated image. Therefore, it is more difficult to tamper with the information. Instead of arranging the optical variable layer 229, the protective layer 227 may play a role as the optical variable layer 229.

Second Embodiment

The second embodiment is related to, for example, the following techniques.
(1) An image display comprising a light-transmitting intermediate layer having first and second main surfaces, a first image-displaying portion that is provided on the first main surface and displays first information about a certain object as a first image of object color, and a second image-displaying portion that is provided on the second main surface and displays second information about the object as a second image of structural color provided by a relief structure.
(2) The image display according to the item (1), wherein the object is a living body, and each piece of the first and second information is biometric information.
(3) The image display according to the item (2), wherein the first image-displaying portion displays a facial image as the first image, and the second image-displaying portion displays a facial image as the second image.
(4) The image display according to item (2) or (3), wherein the living body is a person, and the image display is used for an individual authentication.
(5) The image display according to any one of the items (1) to (4), further comprising a third image-displaying portion that faces the second image-displaying portion with the intermediate layer interposed therebetween and displays an image of self-luminous color when illuminated with excitation light.
(6) The image display according to any one of the items (1) to (4), further comprising a third image-displaying portion that is provided on the first main surface, and is open in a shape corresponding to the second image-displaying portion at a position corresponding to the second image-displaying portion, wherein the third image-displaying portion displays a background of the second image as an image of object color or displays the background of the second image as an image of self-luminous color when illuminated with excitation light.
(7) The image display according to any one of the items (1) to (6), further comprising a fourth image-displaying portion that is provided on the second main surface, and is open in a shape corresponding to the first image-displaying portion at a position corresponding to the first image-displaying portion, wherein the fourth image-displaying portion displays a background of the first image as an image of structural color.
(8) The image display according to any one of the items (1) to (7), wherein the second image-displaying portion comprises a relief structure that emits a diffracted light, and the diffracted light displays the second image.
(9) The image display according to any one of the items (1) to (7), wherein the second image-displaying portion includes a relief structure emitting a scattered light, and the scattered light displays the second image.
(10) The image display according to any one of the items (1) to (9), wherein the intermediate layer includes one or more items selected from the group consisting of hologram, diffraction grating, infrared absorbing layer, fluorescence layer, and print pattern displaying object color.
(11) The image display according to any one of the items (1) to (10), further comprising a light-transmitting protective layer that faces the intermediate layer with the first or second image-displaying portion interposed therebetween, wherein the protective layer includes one or more items selected from the group consisting of hologram, diffraction grating, infrared absorbing layer, fluorescence layer, and print pattern displaying object color.
(12) A labeled article comprising the image display according to any one of the items (1) to (11), and a substrate supporting the image display.
(13) The labeled article according to the item (12), wherein the substrate is a card substrate or a booklet.
(14) A labeled article according to the item (12) or (13) used for individual authentication.

The effects of the techniques according to the items (1) to (14) will be individually described.

The image display according to the item (1) includes the first image-displaying portion. The first image-displaying portion displays the first information about the certain object as the first image of object color. The first image of object color can be perceived under normal illumination conditions with excellent visibility.

This image display includes not only the first image-displaying portion but also the second image-displaying portion. This second image-displaying portion displays the second image of structural color provided by the relief structure. When the relief structure is used, the image can be displayed with a higher precision as compared with the case where pearl pigments are used. It is difficult to falsify or tamper with the second image-displaying portion itself.

In addition, on this image display, the first and second image-displaying portions display the information about the same object. For this reason, in order to rewrite the information about this object with the information about another object, each of the first and second image-displaying portions has to be at least partially removed.

Further, in this image display, the intermediate layer is interposed between the first and second image-displaying portions. Therefore, for example, in order to at least partially remove each of the first and second image-displaying portions from the front side or from the back side, the intermediate layer has to be at least partially removed. That is, when each pieces of the first and second information about the above object recorded in this image display is rewritten with information about another object, it is necessary to, for example, remove one of the first and second image-displaying portions, subsequently, at least partially remove the intermediate layer to expose the other of the first and second image-displaying portions, and thereafter remove this portion. This kind of process is impossible or extremely difficult. Moreover, the image display body subjected to such process can be distinguished relatively easily from the image display that is not subjected to such process by observation with unaided eyes.

Therefore, the image display according to the item (1) displays a high-resolution image and is hard to tamper with the recorded image.

In the image display according to the item (2), each piece of the first and second information is biometric information. The biometric information is unique to the individual body. Therefore, in order to fraudulently use this image display for another individual body, both pieces of the first and second information have to be rewritten. Therefore, in this case, it is more difficult to fraudulently use the image display as compared with the case where at least one piece of the first and second information is non-biometric information.

In the image display according to the item (3), the first and second image-displaying portions display the facial image. The facial image is one of the images most suitable for individual authentication with visual check.

In the image display according to the item (4), the above living body is a person, and the image display is used for an individual authentication. This kind of use is one of most useful applications of the image display.

The image display according to the item (5) further comprises a third image-displaying portion that faces the second image-displaying portion with the intermediate layer interposed therebetween and displays an image of self-luminous color when irradiated with excitation light. Under the illumination conditions of irradiating with the excitation light, this image display displays an image that is different in at least one of the color and the shape from the image obtained under normal illumination conditions such as sunlight and indoor illumination light. That is, this image display gives more complicated visual effects. Since the intermediate layer is interposed between the second and third image-displaying portions, in order to rewrite the image displayed by the second and third patterns, not only the second and third patterns but also the intermediate layer needs to be removed at least partially. In other words, it is more difficult to tamper with the information on this image display, and therefore, it is more difficult to fraudulently use the image display.

The image display according to the item (6) further comprises a third image-displaying portion provided on the first main surface. The third image-displaying portion is open in a shape corresponding to the second image-displaying portion at a position corresponding to the second image-displaying portion, and the third image-displaying portion displays a background of the second image as an image of object color, or displays the background of the second image as an image of self-luminous color when irradiated with excitation light. In the case of employing this configuration, when only the second image displayed by the second image-displaying portion is counterfeited, the outline of the counterfeit second image and the opening in the third image-displaying portion are likely to become inconsistent in terms of the shape or the position. Therefore, the counterfeit information can be checked by using this.

The image display according to the item (7) further comprises a fourth image-displaying portion provided on the second main surface. The fourth image-displaying portion is open in a shape corresponding to the first image-displaying portion at a position corresponding to the first image-displaying portion, and the fourth image-displaying portion displays a background of the first image as an image of structural color. In the case of employing this configuration, when only the first image displayed by the first image-displaying portion is counterfeited, the outline of the counterfeit first image and the openings arranged in the fourth image-displaying portion are likely to become inconsistent in terms of the shape or the position. Therefore, the counterfeit information can be checked by using this.

In the image display according to the item (8), the second image-displaying portion includes a relief structure that emits a diffracted light, and the diffracted light displays the second image. Therefore, the color of the second image changes according to the illumination direction, the observation direction, and the like. In other words, when this configuration is employed, complicated visual effects can be achieved.

In the image display according to the item (9), the second image-displaying portion includes a relief structure emitting a scattered light, and the scattered light displays the second image. Since the second image-displaying portion displays the second image with the scattered light, even when this image display is adhered to, for example, an uneven surface, the effect of this uneven surface on the image quality of the second image is relatively small.

In the image display according to the item (10), the intermediate layer includes one or more items selected from the group consisting of hologram, diffraction grating, infrared absorbing layer, fluorescence layer, and print pattern displaying object color. Such an image display provides more complicated visual effects, and in addition, is hard to counterfeit or tamper with the information.

The image display according to the item (11) further comprises a light-transmitting protective layer that faces the intermediate layer with the first or second image-displaying portion interposed therebetween. In such an image display, the first and second image-displaying portions and the like are less prone to be damaged. In addition, this protective layer includes one or more items selected from the group consisting of hologram, diffraction grating, infrared absorbing layer, fluorescence layer, and print pattern displaying object color. This image display provides more complicated visual effects and is hard to counterfeit or tamper with the information.

The labeled article according to the item (12) includes the image display according to any one of the items (1) to (11).

Therefore, this labeled article displays a high-resolution image and is hard to tamper with the image recorded thereon.

In the labeled article according to the item (13), the substrate is a card substrate or a booklet. Typically, the above-described labeled article is used in such forms.

The labeled article according to the item (14) is used for individual authentication. This kind of use is one of most useful applications of the labeled article.

Subsequently, the second embodiment will be described with reference to drawings.

Figure 14:
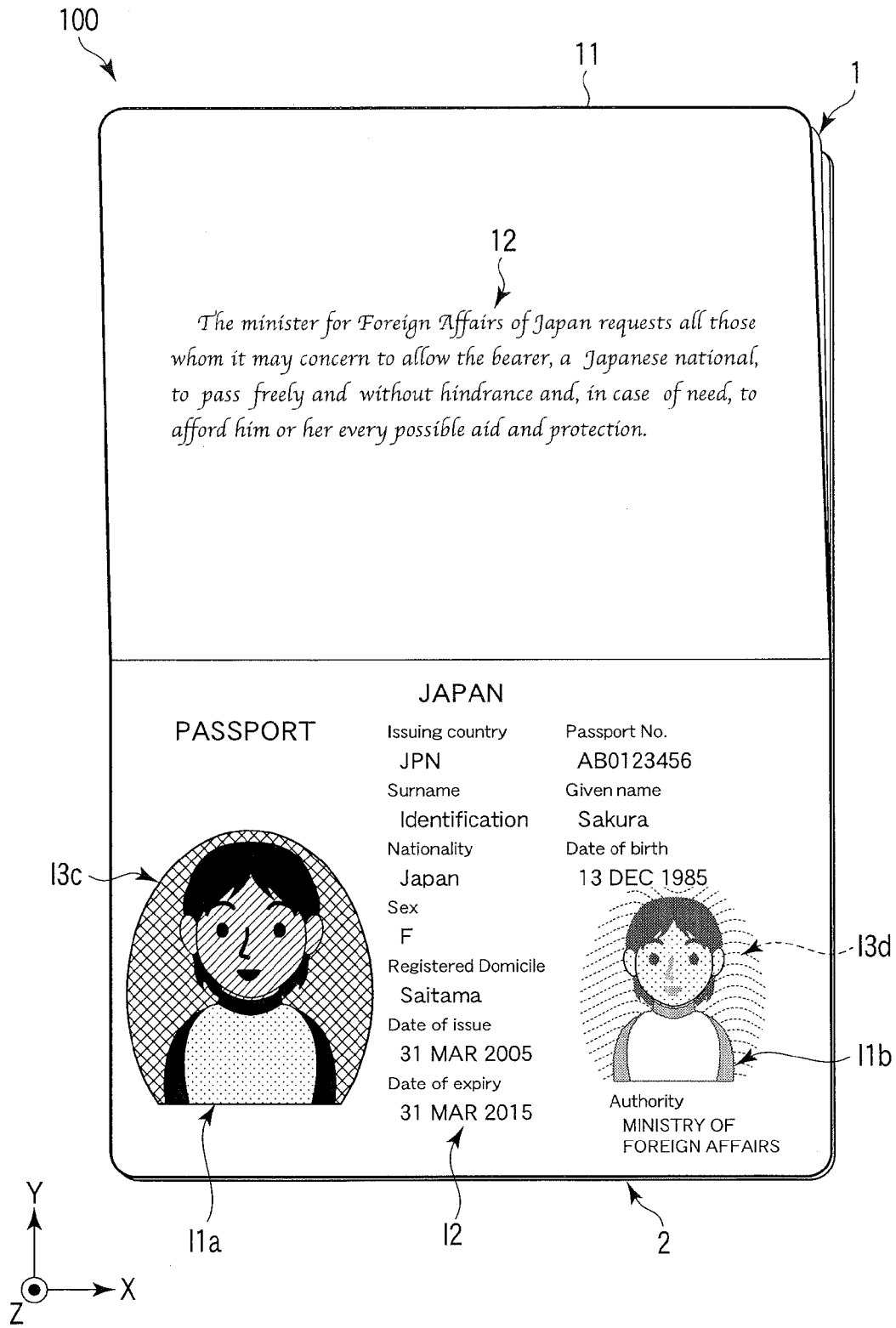
FIG. 14 is a plan view schematically showing a labeled article according to the second embodiment of the present invention.

FIG. 14 is a plan view schematically showing a labeled article according to the second embodiment of the present invention.

The labeled article 100 shown in FIG. 14 is the same as the labeled article 100 described with reference to FIGS. 1 to 5 except that the following features are different.

That is, in this labeled article 100, the cover sheet 2 displays not only images I1a, I1b, and I2 but also images I3c and I3d.

At least a part of the image I3c constitutes a background of the image I1a. The image I3c is, for example, an image of object color or an image of structural color. Here, as an example, the image I3c is supposed to be an image of structural color.

At least a part of the image I3d constitutes a background of the image I1b. The image I3d is, for example, an image of object color or an image of structural color. Here, as an example, the image I3d is assumed to be an image of object color.

Figure 15:
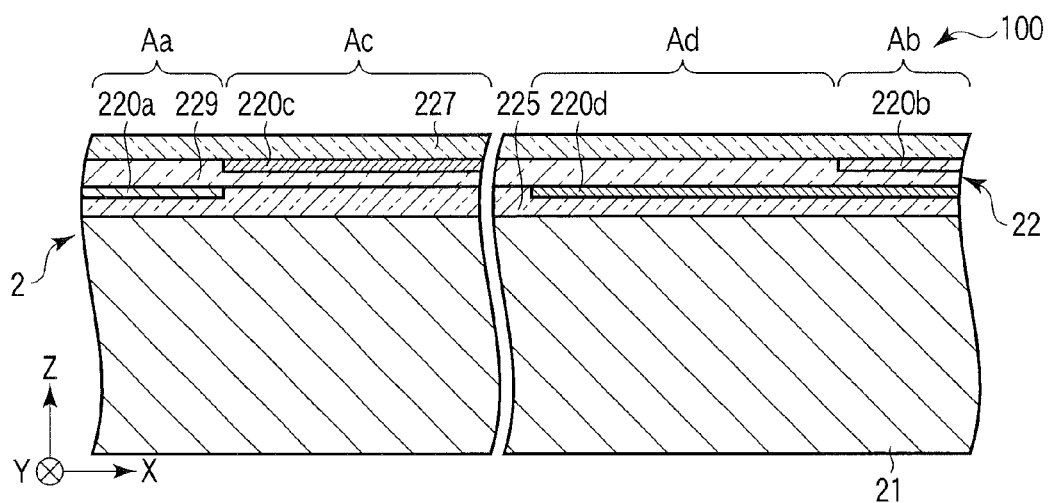
FIG. 15 is a cross sectional view schematically showing an example of a structure that can be employed in the labeled article shown in FIG. 14.
Figure 16:
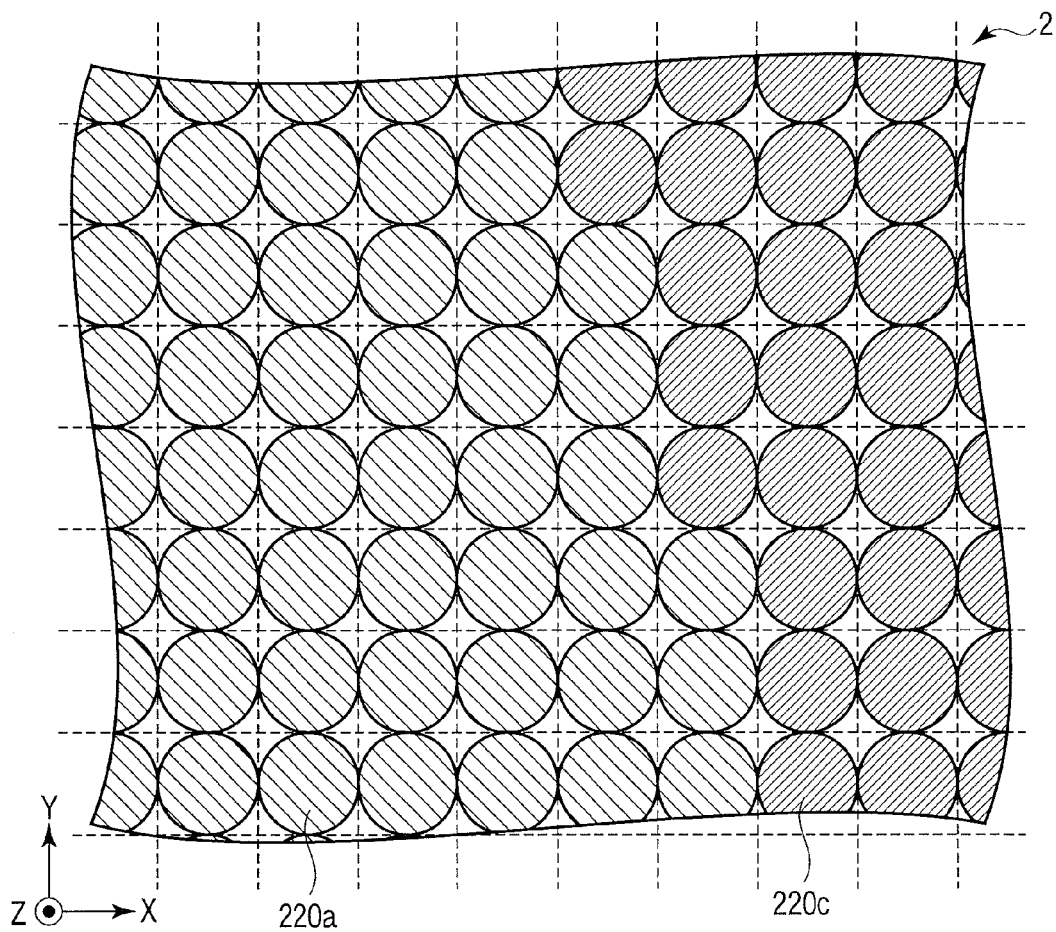
FIG. 16 is an enlarged plan view of a part of the labeled article shown in FIG. 14.

FIG. 15 is a cross sectional view schematically showing an example of a structure that can be employed in the labeled article shown in FIG. 14. FIG. 16 is an enlarged plan view of a part of the labeled article shown in FIG. 14. FIG. 17 is an enlarged plan view of another part of the labeled article shown in FIG. 14. FIG. 18 is an enlarged cross sectional view of a part of the labeled article shown in FIG. 14. FIG. 19 is an enlarged cross sectional view of another part of the labeled article shown in FIG. 14.

It should be noted that FIG. 16 depicts a structure of a part of the cover sheet 2 that corresponds to the images I1a and I3c. It should also be noted that FIG. 17 depicts a structure of a part of the cover sheet 2 that corresponds to the images I1b and I3d. FIGS. 18 and 19 depict a structure included in a part of the cover sheet 2 that displays the image I1b and a structure included in a part of the cover sheet 2 that displays the image I3c, respectively.

The structure shown in FIGS. 15 to 19 is the same as the structure described with reference to FIGS. 2 to 5 except that the following features are different.

That is, in this structure, the image display 22 includes not only the image display layers 220a and 220b but also image display layers 220c and 220d. The image display layers 220c and 220d display the images I3c and I3d shown in FIG. 14, respectively. The image display 22 may further include an image-displaying portion (not shown) displaying the image I2 shown in FIG. 1.

As shown in FIG. 15, the image display layer 220c is provided in a region Ac that is juxtapose to regions Aa and Ab and adjacent to the region Aa. The image display layer 220c is open at a position corresponding to the image display layer 220a in a shape corresponding to the image display layer 220a. The image display layer 220c displays a background of an image displayed by the image display layer 220a as an image of structural color, e.g., an image of structural color provided by the relief structure. Here, the image display layer 220c displays the image I3c shown in FIG. 14.

The image display layer 220c is a layer including, for example, a relief structure formation layer 223c, a reflection layer 224c, and an adhesive layer 225c as shown in FIG. 19. The reflection layer 224c is interposed between the relief structure formation layer 223c and the adhesive layer 225c. The image display layer 220c is provided such that, for example, the relief structure formation layer 223c and the reflection layer 224c are interposed between the adhesive layer 225c and the cover sheet main body 21.

The relief structure formation layer 223c is a layer provided with a relief structure on a main surface thereof. This relief structure includes, for example, at least one of diffraction grating and hologram as a diffraction structure. This relief structure displays the third image I3c of structural color described above.

The relief structure formation layer 223c includes, for example, first to third portions producing different colors when they are illuminated with white light in a particular illumination direction and observed in a particular observation direction. The first to third portions are different from each other in at least one of the grating constant and the lengthwise direction of the grooves of the diffraction grating. Under a particular observation condition, the first to third portions produce, for example, blue, green, and red colors, respectively.

The material of the relief structure formation layer 223c may be, for example, that mentioned for the relief structure formation layer 223b. Typically, the relief structure formation layer 223c obtained using such transparent resin has a refractive index within a range of 1.3 to 1.7 with respect to light having a wavelength of 550 nm.

The reflection layer 224c is formed on the relief structure formation layer 223c. The reflection layer 224c covers at least a part of the surface of the relief structure formation layer 223c on which the relief structure is provided. Although the reflection layer 224c can be omitted, the visibility of the image displayed by the diffraction structure can be improved when the reflection layer 224c is provided.

The reflection layer 224c may be, for example, that mentioned for the reflection layer 224b. The reflection layer 224c can be formed by, for example, the method described for the reflection layer 224b.

The adhesive layer 225c is provided on the reflection layer 224c. The adhesive layer 225c is made of, for example, thermoplastic resin. The material of the adhesive layer 225c may be, for example, that mentioned for the adhesive layer 225b.

The image display layer 220c can be obtained by, for example, thermal transfer recording method using a thermal head. In this case, the image display layer 220c includes, for example, a plurality of dots arranged two-dimensionally as shown in FIG. 16.

As shown in FIG. 15, the image display layer 220d is provided in the region Ab and a region Ad that is juxtapose to the regions Aa to Ac and adjacent to the region Ab. A part of the image display layer 220d is interposed between the image display layer 220b and the cover sheet main body 21. In the region Ad, the image display layer 220d displays the background of the image displayed by the image display layer 220b such as fine pattern as an image of object color. Here, the image display layer 220d displays the image I3d shown in FIG. 14. In the region Ab, the image display layer 220d displays, for example, the same image as that displayed by the image display layer 220b. Alternatively, in the region Ab, the image display layer 220d displays the image different from the image displayed by the image display layer 220b such as fine pattern.

The image display layer 220d is, for example, a layer that contains at least one of dye and pigment and optionally a resin. The image display layer 220d can be obtained by, for example, thermal transfer recording method using a thermal head, ink jet recording method, electrophotographic method, or a combination of two or more of them. In this case, the image display layer 220d includes, for example, a plurality of dots arranged two-dimensionally as shown in FIG. 17.

The thicknesses of the image display layers 220a to 220d are within a range of, for example, 0.1 μm to 2.0 μm. The image display layers 220a to 220d may have the same thickness or different thicknesses. Each of the image display layers 220a to 220d may have uniform thickness or may have uneven thickness.

In each of the image display layers 220a to 220d, the dots juxtaposed to each other may be away from each other, or may be in contact with each other. In the latter case, the juxtaposed dots may partially overlap each other. In this case, as shown in FIGS. 16 and 17, there may be a gap enclosed by a plurality of dots, or such gap may not exist.

The image display layer 220a may not be patterned. In other words, the image display layer 220a may be a continuous film. In this case, the image display layer 220a can be formed by forming a layer including a heat-sensitive color-producing agent and drawing on this layer with laser beam.

As shown in FIG. 15, the image display 22 further includes an intermediate layer 229.

The intermediate layer 229 has first and second main surfaces. Here, the first main surface is a front surface, and the second main surface is a back surface facing the cover sheet main body 21. The image formation layers 220b and 220c are located on the front side of the intermediate layer 229. On the other hand, the image formation layers 220a and 220d are located on the backside of the intermediate layer 229.

The intermediate layer 229 has a light-transmitting property. For example, the intermediate layer 229 is a layer all of which is transparent or a portion thereof is transparent.

The intermediate layer 229 is made of, for example, a transparent resin. The material of the intermediate layer 229 may be, for example, a single resin or a combination of resins such as polyacrylic ester thermoplastic resin, chlorinated rubber resin, vinyl chloride-vinyl acetate copolymer resin, cellulose resin, chlorinated polypropylene resin, epoxy resin, polyester resins, nitrocellulose resin, styrene acrylate resin, polyether resin, and polycarbonate resin. The intermediate layer 229 may have a single-layer structure or a multilayer structure.

The thickness of the intermediate layer 229 is, for example, within a range of 1 μm to 20 μm. In the case where the intermediate layer 229 is thin, when the protective layer 227 is partially removed to tamper with information, it may be impossible to notice this by observing the image display 22 with unaided eyes. On the other hand, in the case where the intermediate layer 229 is thick, when the commercially available film is attached to the removed portion, it may be impossible to notice, by observing the image display 22 with unaided eyes, that the intermediate layer 229 is partially replaced with the commercially available film.

The intermediate layer 229 may have in-plane uniformity of optical property. Alternatively, the intermediate layer 229 may have in-plane unevenness of optical property.

The intermediate layer 229 may include one or more items selected from the group consisting of hologram, diffraction grating, infrared absorbing layer, fluorescence layer, and print pattern providing object color. When the intermediate layer 229 is partially removed, this can be readily noticed. It should be noted that the infrared absorbing layer and the fluorescence layer may be a continuous film, or may be patterned in a grid shape, an island shape, or a stripe shape. In the latter case, the intermediate layer 229 employs, for example, a multilayer structure including a patterned infrared absorbing layer or fluorescence layer and a light-transmitting layer supporting this. Here, as an example, it is supposed that a relief-type hologram is provided on the entire surface of the intermediate layer 229.

The image display 22 includes the image display layer 220a. The image display layer 220a displays a facial image of a certain person as an image of object color. The facial image of object color can be observed under normal illumination conditions with excellent visibility.

This image display 22 includes not only the image display layer 220a but also the image display layer 220b. The image display layer 220b displays an image of structural color provided by the relief-type diffraction grating. When the relief structure is used, the image can be displayed with a higher precision as compared with the case where pearl pigments are used.

In this image display 22, the image display layers 220a and 220b display the facial images of the same person. It is difficult to falsify or tamper with the image display layer 220b itself. Therefore, when the labeled article 100 as a genuine article includes the image display layers 220a and 220b that display the facial images of the same person, more particularly, display the same facial image, genuineness of an article whose genuineness is unknown can be checked by, for example, comparing two facial images displayed thereon.

The color of the image I1b displayed by the image display layer 220b changes according to the illumination direction, the observation direction, and the like. The image display layer 220b can display, as the image I1b, a single color two-dimensional image, a multi-color two-dimensional image, a single color three-dimensional image, a multi-color three-dimensional image, or a combination of two or more of them. In other words, when this configuration is employed, complicated visual effects can be achieved.

In addition, in this image display 22, the image display layer 220a displays the image I1a of object color, and the image display layer 220c displays the image I3c of structural color as the background of the image I1a. Further, in this image display 22, the image display layer 220b displays the image I1b of structural color, and the image display layer 220d displays the image I3d of object color as the background of the image I1b. As described above, when one of the image of object color and the image of structural color is adopted as the background of the other, more special visual effects can be achieved as compared with the case where the image of object color is adopted as the background of the image of object color or the case where the image of structural color is adopted as the background of the image of structural color. For example, when the image display layer 220c displays a stereoscopic image as the image I3c, a quasi three-dimensional image can be displayed with the combination of the images I1a and I3c.

In this image display 22, the image display layer 220d is provided not only in the region Ad but also in the region Ab. In other words, a part of the image display layer 220d faces the image display layer 220b. Therefore, when the image display layer 220*b* has a light-transmitting property, the image displayed by the image display layer 220*d* in the region Ab can be seen through the image display layer 220*b*. In other words, this image display 22 displays the image of object color and the image of structural color at the same time in the region Ab. That is, when this configuration is employed, more complicated visual effects can be achieved.

The biometric information such as the facial image is unique to the individual body. Therefore, in order to fraudulently use this image display 22 for another individual body, both of the images displayed by the image display layers 220*a* and 220*b* have to be rewritten. That is, each of the image display layers 220*a* and 220*b* has to be at least partially removed. Therefore, in this case, it is more difficult to fraudulently use the image display 22 as compared with the case where at least one of these images is non-biometric information.

Further, in this image display 22, the intermediate layer 229 is interposed between the image display layers 220*a* and 220*b*. In the labeled article 100 including the image display 22, the image display 22 is supported by the cover sheet main body 21 such that the image display layer 220*a* is interposed between the intermediate layer 229 and the cover sheet main body 21. Therefore, for example, in order to at least partially remove each of the image display layers 220*a* and 220*b* from the front side or the backside, the intermediate layer 229 has to be at least partially removed. In other words, in order to write the facial image recorded on the image display 22 with the facial image of another person, for example, the following process is necessary. The image display 22 is released from the cover sheet main body 21, the image display layer 220*a* is removed from the backside of the image display 22, and subsequently, a part of the intermediate layer 229 is removed to expose the image display layer 220*b*, and thereafter, this is removed. Alternatively, the following process is necessary. The image display layer 220*b* is removed from the front side of the image display 22, and subsequently, a part of the intermediate layer 229 is removed to expose the image display layer 220*a*, and thereafter, this is removed. This kind of process is impossible or extremely difficult. Moreover, in particular, when at least one of the protective layer 227 and the intermediate layer 229 includes one or more item selected from the group consisting of hologram, diffraction grating, infrared absorbing layer, fluorescence layer, and print pattern producing object color, the image display 22 subjected to such process can be distinguished relatively easily from an image display 22 that is not subjected to such process.

In this image display 22, the image display layer 220*c* is open at a position corresponding to the image display layer 220*a* in a shape corresponding to the image display layer 220*a*, and displays the background of the image I1*a* as the image I3*c* of structural color. In the case of employing this configuration, when only the image I1*a* displayed by the image display layer 220*a* is counterfeited, the outline of the counterfeit image I1*a* and the opening in the image display layer 220*c* are likely to become inconsistent in terms of the shape or the position. Therefore, the counterfeit information can be checked by using this.

Therefore, it is difficult to tamper with the image recorded on the image display 22. Thus, the labeled article 100 including the image display 22 is less likely to be fraudulently used.

The labeled article 100 can be modified in various forms.

FIG. 20 is a cross sectional view schematically showing another example of a structure that can be employed in the labeled article shown in FIG. 14.

The labeled article 100 shown in FIG. 20 is the same as the labeled article 100 described with reference to FIGS. 14 to 19 except for the following features.

The image display 22 of the labeled article 100 does not include the image display layers 220*c* and 220*d*. The image display layer 220*a* is provided not only in the region Aa but also in the region Ac. The image display layer 220*b* is provided not only in the region Ab but also in a region Ad. In other words, the image display layer 220*a* displays images I1*a* and I3*c* shown in FIG. 14 as images of object color. The image display layer 220*b* displays images I1*b* and I3*d* shown in FIG. 14 as images of structural color.

When this configuration is employed, the same effects as those obtained from the configuration described with reference to FIGS. 14 to 19 can be obtained except that the effects associated with the image display layers 220*c* and 220*d* cannot be obtained.

Although the image display layer 220*a* is provided not only in the region Aa but also in the region Ac, the image display layer 220*a* may not be provided in the region Ac. In other words, the image I3*c* shown in FIG. 14 may be omitted. Although the image display layer 220*b* is provided not only in the region Ab but also in the region Ad, the image display layer 220*b* may not be provided in the region Ad. In other words, the image I3*d* shown in FIG. 14 may be omitted.

FIG. 21 is a cross sectional view schematically showing still another example of a structure that can be employed in the labeled article shown in FIG. 14.

The labeled article 100 shown in FIG. 21 is the same as the labeled article 100 described with reference to FIGS. 14 to 19 except for the following features.

The image display 22 of the labeled article 100 does not include the image display layer 220*c*. The image display layer 220*a* is provided not only in the region Aa but also in the region Ac. In other words, the image display layer 220*a* displays images I1*a* and I3*c* shown in FIG. 14 as images of object color.

When this configuration is employed, the same effects as those obtained from the configuration described with reference to FIGS. 14 to 19 can be obtained except that the effects associated with the image display layer 220*c* cannot be obtained.

Figure 22:
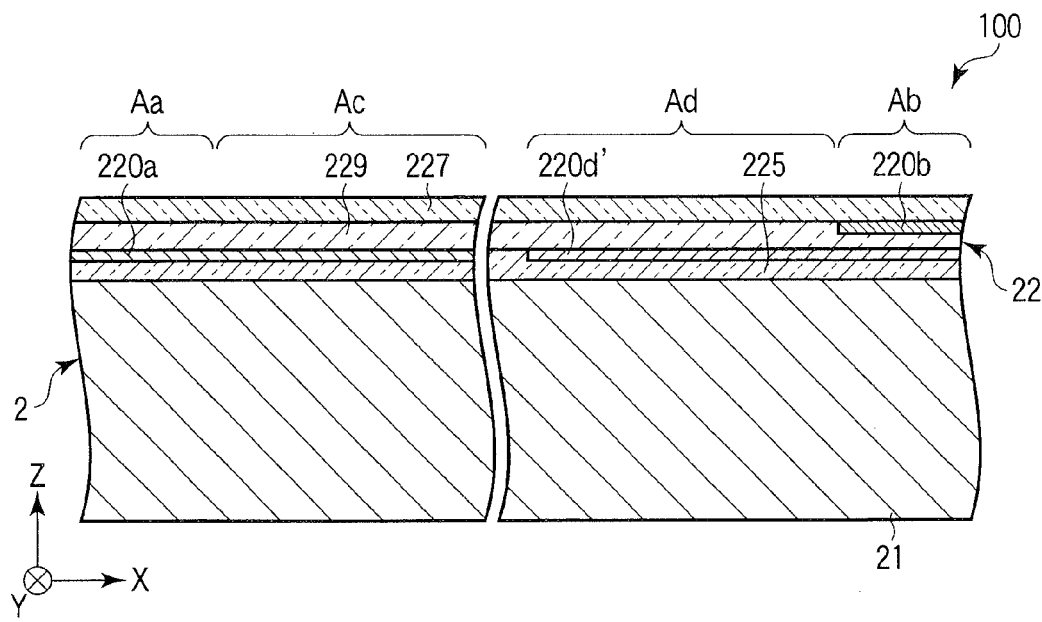
FIG. 22 is a cross sectional view schematically showing still another example of a structure that can be employed in the labeled article shown in FIG. 14.

FIG. 22 is a cross sectional view schematically showing still another example of a structure that can be employed in the labeled article shown in FIG. 14.

The labeled article 100 shown in FIG. 22 is the same as the labeled article 100 described with reference to FIGS. 14 to 19 except for the following features.

The image display 22 of the labeled article 100 does not include the image display layer 220*c*. The image display layer 220*a* is provided not only in the region Aa but also in the region Ac. In other words, the image display layer 220*a* displays images I1*a* and I3*c* shown in FIG. 14 as images of object color. The image display 22 of the labeled article shown in FIG. 22 includes an image display layer 220*d'* producing self-luminous color instead of the image display layer 220*d* producing object color. The image display layer 220*d'* is a third image-displaying portion. The image display layer 220*d'* is made of, for example, fluorescent material or a mixture including fluorescent material and transparent resin.

When this configuration is employed, the effects associated with the image display layer 220*c* cannot be obtained. When the image display layer 220*d'* is colorless and transparent, the effects associated with the image display layer 220*d* cannot be obtained. However, the image display layer

220*d'* displays the image in self-luminous color when irradiated with excitation light such as ultraviolet light. When the image display layer 220*d'* is, for example, colorless and transparent, the image display layer 220*d'* can be used as a latent image.

In other words, when the image display layer 220*d'* is colorless and transparent, the same effects as those obtained from the configuration described with reference to FIGS. 14 to 19 can be obtained except that the effects associated with the image display layers 220*c* and 220*d* cannot be obtained. In addition, in this case, the latent image visualized by irradiating with excitation light can be recorded using the image display layer 220*d'*. Therefore, when this labeled article 100 is a genuine article, genuineness of an article whose genuineness is unknown can be checked by, for example, irradiating with the excitation light and observing the image produced by this article.

When the image display layer 220*d'* is colored and transparent, colorless and opaque, or colored and opaque, the same effects as those obtained from the configuration described with reference to FIGS. 14 to 19 can be obtained except that the effects associated with the image display layer 220*c* cannot be obtained. In addition, in this case, the image display layer 220*d'* produces different colors when it is illuminated with natural light and excitation light. In other words, complicated visual effects are provided.

Figure 23:
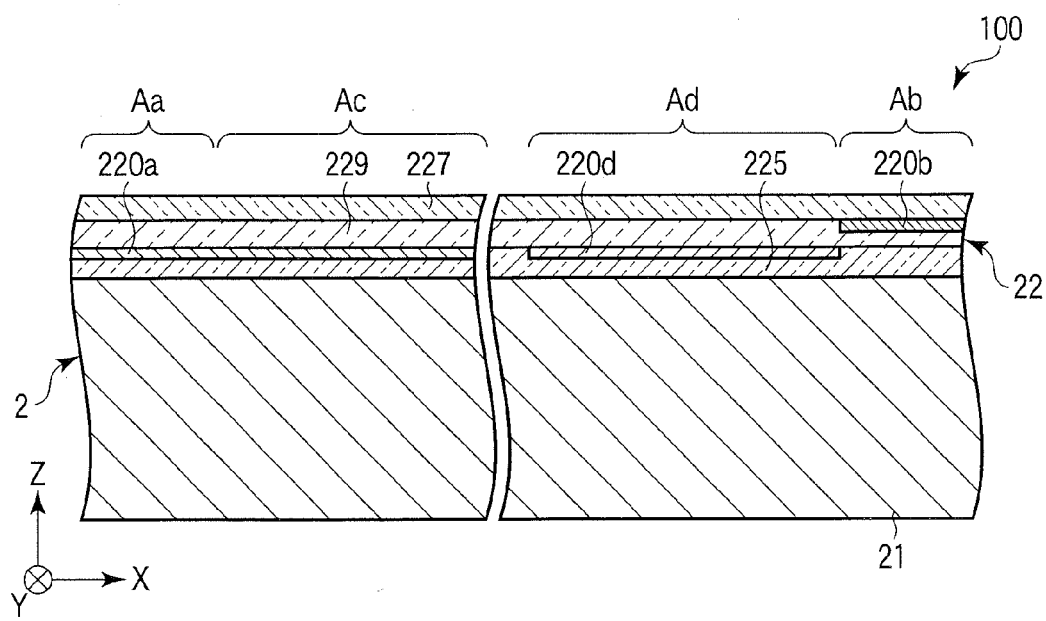
FIG. 23 is a cross sectional view schematically showing still another example of a structure that can be employed in the labeled article shown in FIG. 14.

FIG. 23 is a cross sectional view schematically showing still another example of a structure that can be employed in the labeled article shown in FIG. 14.

The labeled article 100 shown in FIG. 23 is the same as the labeled article 100 described with reference to FIGS. 14 to 19 except for the following features.

The image display 22 of the labeled article 100 does not include the image display layer 220*c*. The image display layer 220*a* is provided not only in the region Aa but also in the region Ac. In other words, the image display layer 220*a* displays images I1*a* and I3*c* shown in FIG. 14 as images of object color. The image display layer 220*d* is not provided in the region Ab, but is provided only in the region Ad.

When this configuration is employed, the same effects as those obtained from the configuration described with reference to FIGS. 14 to 19 can be obtained except for the following features. That is, when this configuration is employed, the effects associated with the image display layer 220*c* cannot be obtained. Even if the image display layer 220*b* has a light-transmitting property, the image display layer 220*d* cannot be seen through the image display layer 220*b*. However, in the case of employing this configuration, when the image I1*b* displayed by the image display layer 220*b* is counterfeited, the outline of the counterfeit image I1*b* and the openings arranged in the image display layer 220*d* are likely to become inconsistent in terms of the shape or the position. Therefore, the counterfeit information can be checked by using this.

FIG. 24 is a cross sectional view schematically showing still another example of a structure that can be employed in the labeled article shown in FIG. 14.

The labeled article 100 shown in FIG. 24 is the same as the labeled article 100 described with reference to FIGS. 14 to 19 except for the following features.

The image display 22 of the labeled article 100 does not include the image display layer 220*d*. The image display layer 220*b* is provided not only in the region Ab but also in the region Ad. In other words, the image display layer 220*b* displays images I1*b* and I3*d* shown in FIG. 14 as images of structural color. The image display layer 220*c* is provided not only in the region Ac but also in the region Aa. This image display layer 220*c* has a light-transmitting property at least in the region Aa. As shown in FIG. 14, the image display layer 220*c* displays the image I3*c* as the background of the image I1*a* in the region Ab. In the region Aa, the image display layer 220*c* displays, for example, the same image as the image displayed by the image display layer 220*a*. Alternatively, in the region Aa, the image display layer 220*c* displays an image different from the image displayed by the image display layer 220*a* such as fine pattern.

When this configuration is employed, the same effects as those obtained from the configuration described with reference to FIGS. 14 to 19 can be obtained except for the following features. In other words, when this configuration is employed, the effects associated with the image display layer 220*d* cannot be obtained. However, since a part of the image display layer 220*c* faces the image display layer 220*a*, the image displayed by the image display layer 220*a* in the region Aa can be seen through the image display layer 220*c*. In other words, this image display 22 displays the image of object color and the image of structural color at the same time in the region Aa. Therefore, when this configuration is employed, more complicated visual effects can be achieved.

FIG. 25 is a cross sectional view schematically showing still another example of a structure that can be employed in the labeled article shown in FIG. 14.

The labeled article 100 shown in FIG. 25 is the same as the labeled article 100 described with reference to FIGS. 14 to 19 except for the following features.

The image display 22 of the labeled article 100 does not include the image display layer 220*d*. The image display layer 220*b* is provided not only in the region Ab but also in the region Ad. In other words, the image display layer 220*b* displays images I1*b* and I3*d* shown in FIG. 14 as images of structural color.

When this configuration is employed, the same effects as those obtained from the configuration described with reference to FIGS. 14 to 19 can be obtained except that the effects associated with the image display layer 220 cannot be obtained.

According to the above configuration, the image display layers 220*a* and 220*b* are arranged on the back and front sides of the intermediate layer 229, respectively. As described below, the image display layers 220*a* and 220*b* can be arranged on the front and back sides of the intermediate layer 229, respectively.

Figure 26:
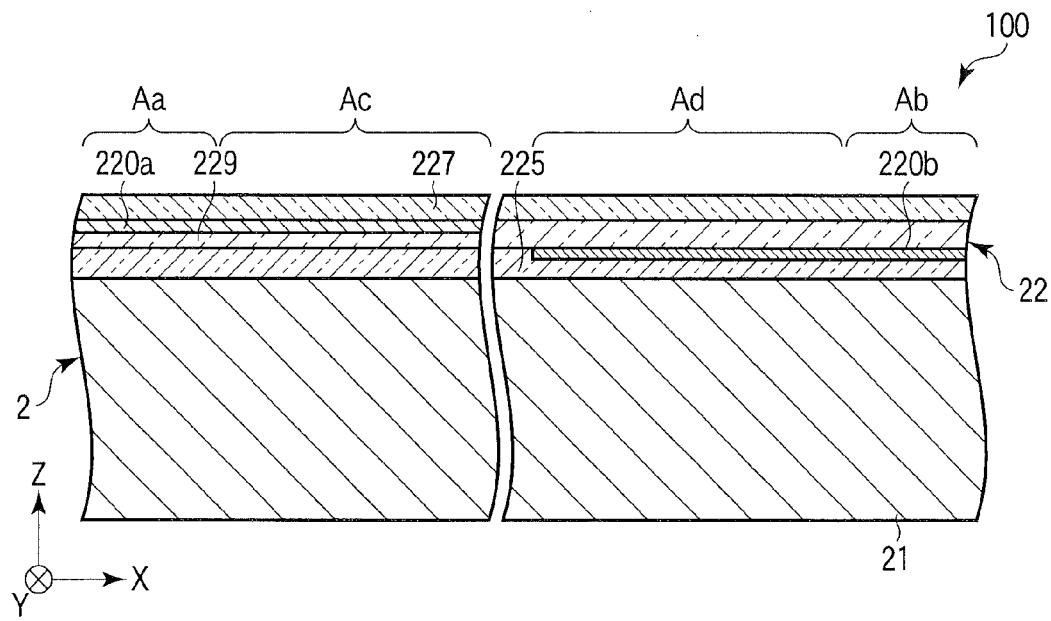
FIG. 26 is a cross sectional view schematically showing still another example of a structure that can be employed in the labeled article shown in FIG. 14.

FIG. 26 is a cross sectional view schematically showing still another example of a structure that can be employed in the labeled article shown in FIG. 14.

The labeled article 100 shown in FIG. 26 is the same as the labeled article 100 described with reference to FIGS. 14 to 19 except for the following features.

The image display 22 of the labeled article 100 does not include the image display layers 220*c* and 220*d*. The image display layer 220*a* is interposed between the intermediate layer 229 and the protective layer 227, and is provided not only in the region Aa but also in the region Ac. The image display layer 220*b* is interposed between the intermediate layer 229 and the adhesive layer 225, and is provided not only in the region Ab but also in the region Ad. In other words, the image display layer 220*a* displays images I1*a* and I3*c* shown in FIG. 14 as images of object color. The image display layer 220*b* displays images I1*b* and I3*d* shown in FIG. 14 as images of structural color.

When this configuration is employed, the same effects as those obtained from the configuration described with reference to FIGS. 14 to 19 can be obtained except that the effects associated with the image display layers 220c and 220d cannot be obtained.

Figure 27:
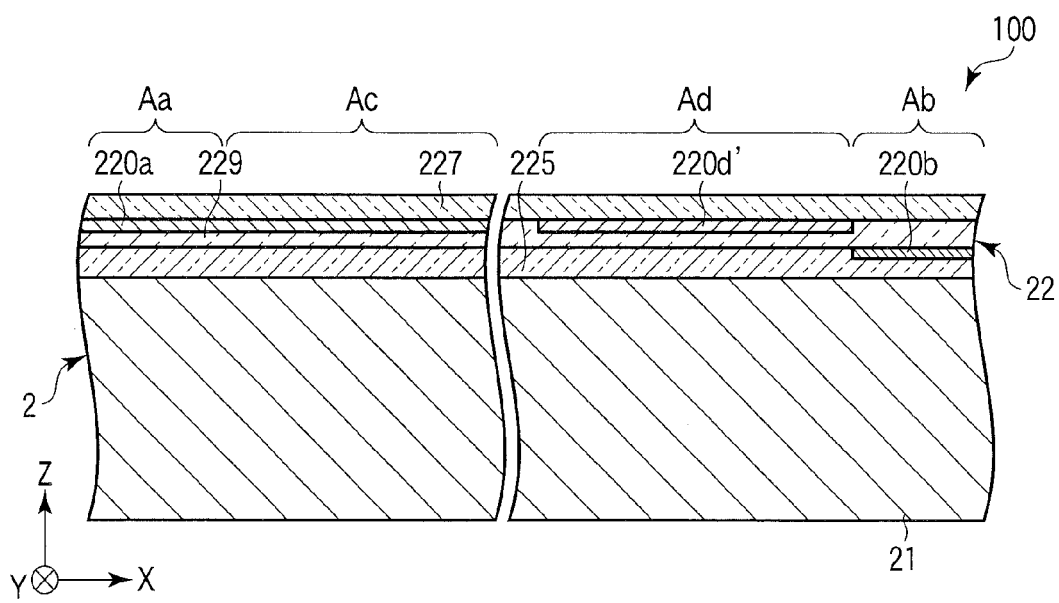
FIG. 27 is a cross sectional view schematically showing still another example of a structure that can be employed in the labeled article shown in FIG. 14.

FIG. 27 is a cross sectional view schematically showing still another example of a structure that can be employed in the labeled article shown in FIG. 14.

The labeled article 100 shown in FIG. 27 is the same as the labeled article 100 described with reference to FIGS. 14 to 19 except for the following features.

The image display 22 of the labeled article 100 does not include the image display layer 220c. The image display layer 220a is interposed between the intermediate layer 229 and the protective layer 227, and is provided not only in the region Aa but also in the region Ac. In other words, the image display layer 220a displays images I1a and I3c shown in FIG. 14 as images of object color. In addition, the image display 22 includes the image display layer 220d' described with reference to FIG. 22 instead of the image display layer 220d. The image display layer 220d' is interposed between the intermediate layer 229 and the protective layer 227. Further, in this image display 22, the image display layer 220d is interposed between the intermediate layer 229 and the adhesive layer 225. The image display layer 220d is not provided in the region Ab, but is provided only in the region Ad.

When this configuration is employed, the effects associated with the image display layers 220c and 220d cannot be obtained. However, the image display layer 220d' displays the image in self-luminous color when irradiated with excitation light such as ultraviolet light. When the image display layer 220d' is, for example, colorless and transparent, the image display layer 220d' can be used as a latent image.

In other words, when the image display layer 220d' is colorless and transparent, the same effects as those obtained from the configuration described with reference to FIGS. 14 to 19 can be obtained except that the effects associated with the image display layers 220c and 220d cannot be obtained. In addition, in this case, the latent image visualized by irradiating with excitation light can be recorded using the image display layer 220d'. Therefore, when this labeled article 100 is a genuine article, genuineness of an article whose genuineness is unknown can be checked by, for example, irradiating it with the excitation light and observing the image produced by this article.

When the image display layer 220d' is colored and transparent, colorless and opaque, or colored and opaque, the same effects as those obtained from the configuration described with reference to FIGS. 14 to 19 can be obtained except for the following features. That is, when this configuration is employed, the effects associated with the image display layer 220c cannot be obtained. Even if the image display layer 220b' has a light-transmitting property, the image display layer 220d' cannot be seen through the image display layer 220b. However, in the case of employing this configuration, when the image I1b displayed by the image display layer 220b is counterfeited, the outline of the counterfeit image I1b and the openings arranged in the image display layer 220d' are likely to become inconsistent in terms of the shape or the position. Therefore, the counterfeit information can be checked by using this.

Figure 28:
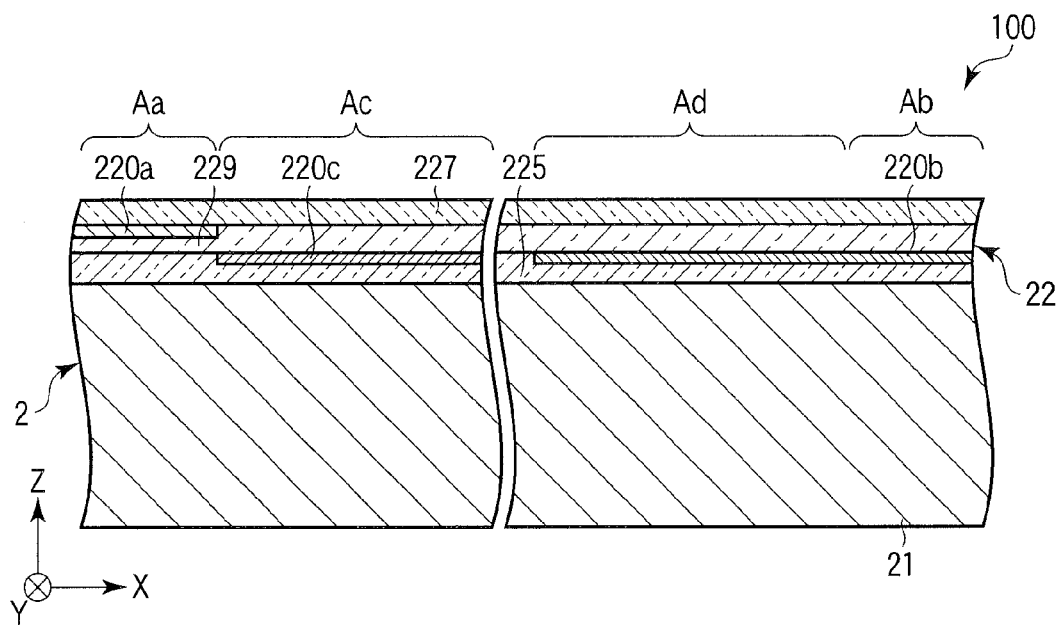
FIG. 28 is a cross sectional view schematically showing still another example of a structure that can be employed in the labeled article shown in FIG. 14.

FIG. 28 is a cross sectional view schematically showing still another example of a structure that can be employed in the labeled article shown in FIG. 14.

The labeled article 100 shown in FIG. 28 is the same as the labeled article 100 described with reference to FIGS. 14 to 19 except for the following features.

In the image display 22 of the labeled article 100, the image display layer 220a is interposed between the intermediate layer 229 and the protective layer 227, and the image display layers 220b and 220c are interposed between the intermediate layer 229 and the adhesive layer 225. This image display 22 does not include the image display layer 220d. The image display layer 220b is provided not only in the region Ab but also in the region Ad. In other words, the image display layer 220b displays images I1b and I3d shown in FIG. 14 as an image of structural color.

When this configuration is employed, the same effects as those obtained from the configuration described with reference to FIGS. 14 to 19 can be obtained except that the effects associated with the image display layer 220 cannot be obtained.

Figure 29:
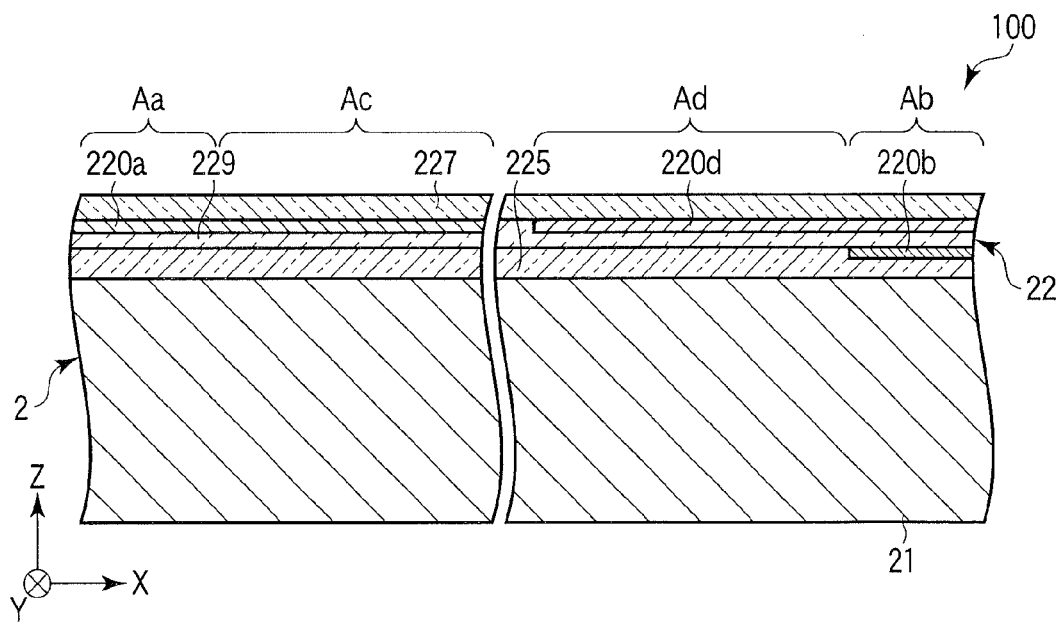
FIG. 29 is a cross sectional view schematically showing still another example of a structure that can be employed in the labeled article shown in FIG. 14.

FIG. 29 is a cross sectional view schematically showing still another example of a structure that can be employed in the labeled article shown in FIG. 14.

The labeled article 100 shown in FIG. 29 is the same as the labeled article 100 described with reference to FIGS. 14 to 19 except for the following features.

In the image display 22 of the labeled article 100, the image display layers 220a and 220d are interposed between the intermediate layer 229 and the protective layer 227, and the image display layer 220b is interposed between the intermediate layer 229 and the adhesive layer 225. The image display 22 does not include the image display layer 220c. The image display layer 220a is provided not only in the region Aa but also in the region Ac. In other words, the image display layer 220a displays images I1a and I3c shown in FIG. 14 as images of object color. Further, the image display layer 220d has a light-transmitting property, for example, at least in the region Ab. Alternatively, at least in the region Ab, the image display layer 220d is formed into a pattern of a grid, island, or stripe shape.

When this configuration is employed, the same effects as those obtained from the configuration described with reference to FIGS. 14 to 19 can be obtained except for the following features. That is, when this configuration is employed, the effects associated with the image display layer 220c cannot be obtained. However, since a part of the image display layer 220d faces the image display layer 220b, the image displayed by the image display layer 220b in the region Ab can be seen through the image display layer 220d. In other words, this image display 22 displays the image of object color and the image of structural color at the same time in the region Ab. Therefore, when this configuration is employed, more complicated visual effects can be achieved.

In the above configuration, each of the image display layers 220b and 220c includes a relief-type diffraction grating. At least one of the image display layers 220b and 220c may include relief-type hologram instead of relief-type diffraction grating. Alternatively, at least one of the image display layers 220b and 220c may include not only the relief-type diffraction grating but also the relief-type hologram. Alternatively, at least one of the image display layers 220b and 220c may include, instead of or in addition to the relief-type diffraction grating, a relief-type light-scattering structure described below or a combination of this light-scattering structure and relief-type hologram.

Figure 32:
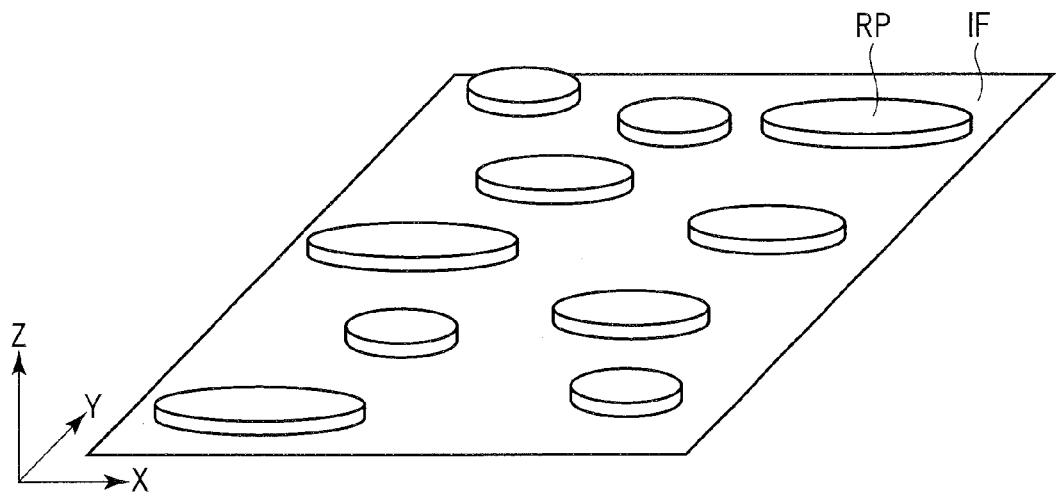
FIG. 32 is a perspective view schematically showing still another example of a structure that can be employed in an image-displaying portion producing structural color using light scattering.

FIG. 30 is a plan view schematically showing an example of a structure that can be employed in an image-displaying portion producing structural color using light scattering. FIG. 31 is a perspective view schematically showing another example of a structure that can be employed in an image-displaying portion producing structural color using light scattering. FIG. 32 is a perspective view schematically showing still another example of a structure that can be employed in an image-displaying portion producing structural color using light scattering.

In the structure shown in FIG. 30, a plurality of recessed portions and/or protruding portions RP are provided on an interface IF perpendicular to the Z direction. Each of the recessed portions and/or protruding portions RP has a shape extending in the X direction, and the recessed portions and/or protruding portions RP are arranged in the Y direction. The recessed portions and/or protruding portions RP have uneven lengths in the X direction, and the positions thereof in the X direction and the Y direction are also irregular.

When this structure is illuminated with, for example, white light, the structure exhibits higher light-scattering performance within a plane perpendicular to the X direction, and exhibits lower light-scattering performance within a plane perpendicular to the Y direction. Therefore, this structure is suitable for a case where it is desired to limit the emission direction of the scattered light, i.e., a case where anisotropic light-scattering property is desired.

In this structure, the anisotropic light-scattering property is changed by changing the arrangement of the recessed portions and/or protruding portions RP. For example, when the density of the recessed portions and/or protruding portions RP is increased in the Y direction, the anisotropic light-scattering property increases. On the other hand, when the length of the recessed portions and/or protruding portions RP is reduced or the uniformity in the lengthwise direction is reduced, the anisotropic light-scattering property decreases.

In FIG. 30, the lengthwise directions of the recessed portions and/or protruding portions RP are parallel to the X direction. The lengthwise directions of the recessed portions and/or protruding portions RP may cross the X direction. In FIG. 30, the lengthwise directions of the recessed portions and/or protruding portions RP are aligned in one direction. As long as the above anisotropic light-scattering property is obtained, the lengthwise directions of the recessed portions and/or protruding portions RP may not be aligned in one direction.

In the structure shown in FIG. 31, the recessed portions and/or protruding portions RP are in a rectangular solid shape. Each of the recessed portions and/or protruding portions RP has a shape extending in the X direction, and the recessed portions and/or protruding portions RP are arranged in the Y direction. The positions of the recessed portions and/or protruding portions RP in the X direction and the Y direction are irregular, and the sizes thereof in the X direction and the Y direction are also irregular. In this manner, the anisotropic light-scattering property can also be changed by changing the sizes of the recessed portions and/or protruding portions RP.

In the structure shown in FIG. 31, the recessed portions and/or protruding portions RP are in an elliptic cylinder shape. Each of the recessed portions and/or protruding portions RP has a shape extending in the X direction, and the recessed portions and/or protruding portions RP are arranged in the Y direction. The positions of the recessed portions and/or protruding portions RP in the X direction and the Y direction are irregular, and the sizes thereof in the X direction and the Y direction are also irregular. In this manner, the anisotropic light-scattering property can also be changed by changing the shapes of the recessed portions and/or protruding portions RP.

The light-scattering structure having the anisotropic light-scattering property can be used for displaying, for example, a three-dimensional image. That is, pixels each including a right eye sub-pixel and a left eye sub-pixel are arranged in a matrix form. Some of the right eye sub-pixels are provided with light-scattering structures for right eye in order to display a parallax image for right eye. On the other hand, some of the left eye sub-pixel are provided with light-scattering structures for left eye in order to display a parallax image for left eye. The light-scattering structure for right eye and the light-scattering structure for left eye are different in the lengthwise directions of the recessed portions and/or protruding portions RP. When this kind of configuration is employed, a three-dimensional image using diffuse light can be displayed under typical indoor diffuse light illumination conditions.

At least one of the image display layers 220b and 220c may include the relief structure described below.

Figure 33:
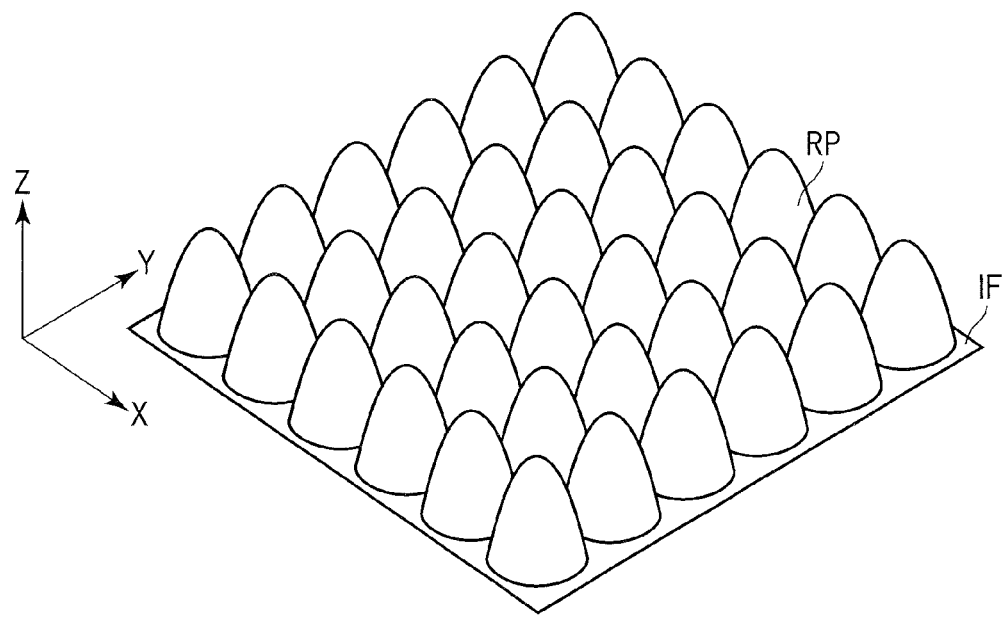
FIG. 33 is a perspective view schematically showing an example of a structure that can be employed in an image-displaying portion displaying dark color as structural color.

FIG. 33 is a perspective view schematically showing an example of a structure that can be employed in an image-displaying portion displaying dark color as structural color.

In the structure shown in FIG. 33, an interface IF is provided with a plurality of recessed portions and/or protruding portion RP arranged two-dimensionally. In this example, the recessed portions and/or protruding portions RP are arranged in the X direction and the Y direction to form a lattice. The recessed portions and/or protruding portions RP may be arranged in two directions crossing diagonally to form a lattice.

Each of the recessed portions and/or protruding portions RP has a tapered shape. The tapered shape is, for example, a half-spindle shape, a cone or pyramidal shape such as circular cone and pyramid, or a truncated cone or pyramidal shape such as truncated circular cone and truncated pyramid. The side surface of the protruding portion PR may be formed with only an inclined surface, or may be in a staircase pattern. The tapered shape is useful for reducing the optical reflectance of the relief structure shown in FIG. 33. The recessed portions and/or protruding portions RP may not have a tapered shape.

The recessed portions and/or protruding portions RP forms diffraction grating. The center-to-center distance of the recessed portions and/or protruding portions RP is shorter than that of a grating constant of an ordinary diffraction grating. The center-to-center distance of the recessed portions and/or protruding portions RP is, for example, 400 nm or less.

A ratio of the height or the depth of the recessed portions and/or protruding portions RP with respect to the center-to-center distance thereof is, for example, ½ or more, and in a typical case, one or more. The larger this ratio is, the smaller the reflectance of the relief structure is.

Since this relief structure has low reflectance, the relief structure appears to be dark gray to black. In this relief structure, the center-to-center distance of the recessed portions and/or protruding portions RP is small. Thus, the diffracted light with excellent visibility is not emitted in the front direction, but is emitted only within a limited angular range. In other words, this relief structure appears to be dark gray to black printed layer. Moreover, it is difficult to notice that this relief structure can emit diffracted light.

In the structure shown in FIG. 33, the recessed portions and/or protruding portions RP are regularly arranged, but the recessed portions and/or protruding portions RP may be arranged irregularly. Such relief structure does not emit any diffracted light, but appears to be dark gray to black printed layer.

Subsequently, a method of manufacturing the above labeled article 100 will be described.

FIG. 34 is a view schematically showing an example of a manufacturing apparatus that can be used to manufacture the labeled article shown in FIG. 14.

The manufacturing apparatus 500 shown in FIG. 34 can be used to manufacture, for example, the labeled article 100 that employs the structure described with reference to FIG. 15.

When the labeled article 100 is manufactured, for example, first, an image pickup device is used to shoot a face of a person. Alternatively, a facial image is read from a photoprint. Thus, the image information is obtained as electronic information. This facial image is processed as necessary.

Subsequently, using the manufacturing apparatus 500 shown in FIG. 34, the image display 22 shown in FIG. 15 is formed on an article 100'. It should be noted that the article 100' is the labeled article 100 from which the image display 22 is omitted. Here, it is a booklet main body.

When the image display 22 is formed using the manufacturing apparatus 500 shown in FIG. 34, thermal transfer ribbons 520ac, 520bc, 527, and 529 are prepared.

The thermal transfer ribbon 520ad is wound into a roll 540b. The thermal transfer ribbon 520ad includes a belt-shaped first support body and a first transfer material layer formed thereon. The first transfer material layer is releasably supported by the first support body. A part of the first transfer material layer is used as the image formation layer 220a, and another part of the first transfer material layer is used as the image formation layer 220d.

The thermal transfer ribbon 520bc is wound into a roll 540d. The thermal transfer ribbon 520bc includes a belt-shaped second support body and a second transfer material layer formed thereon. The second transfer material layer is releasably supported by the second support body. A part of the second transfer material layer is used as the image formation layer 220b, and another part of the second transfer material layer is used as the image formation layer 220c.

The thermal transfer ribbon 527 is wound into a roll 540c. The thermal transfer ribbon 527 includes a belt-shaped third support body and a third transfer material layer formed thereon. The third transfer material layer is releasably supported by the third support body. A part of the third transfer material layer is used as the protective layer 227.

The thermal transfer ribbon 529 is wound into a roll 540a. The thermal transfer ribbon 529 includes a belt-shaped fourth support body and a fourth transfer material layer formed thereon. The fourth transfer material layer is releasably supported by the fourth support body. A part of the fourth transfer material layer is used as the intermediate layer 229.

After the above thermal transfer ribbons 520ac, 520bc, 527, and 529 are prepared, the thermal transfer ribbons 529 and 520ad are fed from the rolls 540a and 540b, respectively, and these are conveyed to a thermal transfer printing device 550a such that transfer material layers thereof face each other. In the thermal transfer printing device 550a, parts of the first transfer material layer of the thermal transfer ribbon 520ad are thermally transferred as the image display layers 220a and 220d from the first support body onto the fourth transfer material layer of the thermal transfer ribbon 529.

The thermal transfer ribbon 520ad used for this thermal transfer is wound into the roll 570a. On the other hand, the thermal transfer ribbon 529 having the image display layers 220a and 220d formed thereon is guided by a guide roller 580a and is conveyed to a thermal transfer device 560a together with the article 100'.

In the thermal transfer device 560a, a part of the fourth transfer material layer of the thermal transfer ribbon 529 is thermally transferred together with the image display layers 220a and 220d from the fourth support body onto the cover sheet main body 12 of the article 100'. As a result, the image display layers 220a and 220d and the intermediate layer 229 are formed on the cover sheet main body 21.

It should be noted that this thermal transfer may be performed with the adhesive layer 225 interposed between thermal transfer ribbon 529 and the cover sheet main body 12. For example, it is possible that the adhesive layer 225 is formed on at least one of the thermal transfer ribbon 529 and the cover sheet main body 21, and thereafter, thermal transfer is performed.

The thermal transfer ribbon 529 used for this thermal transfer is guided by guide rollers 580b and 580c, and then wound into the roll 570a. On the other hand, the article 100' having been subjected to this thermal transfer process is conveyed to a thermal transfer device 560b.

In parallel to the above operation, the thermal transfer ribbons 527 and 520bc are respectively fed from rolls 540c and 540d, and these are conveyed to a thermal transfer printing device 550b such that transfer material layers thereof face each other. In the thermal transfer printing device 550b, parts of the second transfer material layer of the thermal transfer ribbon 520bc are thermally transferred as the image display layers 220b and 220c from the second support body onto the third transfer material layer of the thermal transfer ribbon 527.

The thermal transfer ribbon 520bc used for this thermal transfer is wound into the roll 570c. On the other hand, the thermal transfer ribbon 527 having the image display layers 220b and 220c formed thereon is guided by a guide roller 580d, and is conveyed to a thermal transfer device 560b together with the article 100' fed from a thermal transfer device 560.

In the thermal transfer device 560b, a part of the third transfer material layer of the thermal transfer ribbon 527 is transferred together with the image display layers 220b and 220c from the third support body onto the intermediate layer 229 provided on the cover sheet main body 12 of the article 100'. As a result, the image display layers 220b and 220c and the protective layer 227 are formed on the intermediate layer 229.

It should be noted that this thermal transfer may be performed with the adhesive layer interposed between the thermal transfer ribbon 527 and the intermediate layer 229. For example, it is possible that the adhesive layer is formed on at least one of the thermal transfer ribbon 527 and the intermediate layer 229, and thereafter, thermal transfer is performed.

The thermal transfer ribbon 527 used for this thermal transfer is guided by a guide roller 580f, and is wound into the roll 570b. Then, the article 100' having been subjected to this thermal transfer process is discharged from a thermal transfer device 560b as the labeled article 100.

Thus, the labeled article 100 is completed.

It should be noted that the labeled article 100 described with reference to FIGS. 20, 21, 23 to 25 can be manufactured according to the above method from which formation of one or both of the image display layers 220c and 220d is omitted. The labeled article 100 described with reference to FIG. 22 can be manufactured according to the above method from which formation of the image display layers 220c and 220d is omitted and to which a step of forming the image display layer 220d' is added. The labeled article 100 described with reference to FIGS. 26, 28 and 29 can be manufactured according to the above method in which thermal transfer ribbons 520*ad* and 520*cd* are respectively wound into the rolls 540*d* and 540*b* and from which formation of one or both of the image display layers 220*c* and 220*d* is omitted. The labeled article 100 described with reference to FIG. 27 can be manufactured according to the above method in which the thermal transfer ribbons 520*ad* and 520*cd* are respectively wound into the rolls 540*d* and 540*b*, from which formation of the image display layers 220*c* and 220*d* is omitted, and to which a step of forming the image display layer 220*d'* is added.

In the above method, thermal transfer is used to form the image display layers 220*b* and 220*c*, but the image display layers 220*b* and 220*c* may be formed by other methods. For example, a light-transmitting layer having a main surface provided with a relief structure causing diffraction or scattering is formed in advance on the protective layer 227. Subsequently, the diffraction performance or scattering performance of this relief structure is partially eliminated or partially reduced. For example, a part of the relief structure is destroyed by irradiating an energy beam such as a laser beam. Alternatively, a material having substantially the same refractive index as the light-transmitting layer such as colorless resin (in a typical case, colorless and transparent resin) is supplied by print process such as ink jet printing onto a part of the relief structure, so that a pattern having a smooth surface is formed. Alternatively, a solvent is supplied by print process such as ink jet printing onto a part of the relief structure, so that the surface of the light-transmitting layer is melted in this portion. Thereafter, as necessary, the reflection layer is formed on the relief structure. For example, the reflection layer is formed by dry coating such as vacuum evaporation and sputtering. Alternatively, the reflection layer is formed by applying light reflective material such as a mixture of metal particles and transparent resin to the relief structure. As described above, the image display layers 220*b* and 220*c* are obtained.

The image display layers 220*b* and 220*c* may be formed according to the following method. That is, a light-transmitting layer having a main surface provided with a relief structure causing diffraction or scattering is formed in advance on the protective layer 227. Then, a light reflective material is supplied by print process such as ink jet printing onto a part of the relief structure. As a result, a light reflection pattern is obtained as the reflection layer. Portions corresponding to the light reflection pattern have higher diffraction performance or scattering performance than portions corresponding to openings of the light reflection pattern. Therefore, the image display layers 220*b* and 220*c* can also be obtained by such method.

In the above method, thermal transfer is used to form the image display layers 220*a* and 220*d*, but the image display layers 220*a* and 220*d* may be formed by other methods. For example, the image display layers 220*a* and 220*d* may be formed by print process such as ink jet printing.

In the method described with reference to FIG. 34, thermal transfer to the article 100' is performed twice. However, the labeled article 100 can be manufactured by performing thermal transfer to the article 100' only once.

FIG. 35 is a view schematically showing an example of a transfer foil that can be used for manufacturing the labeled article shown in FIG. 14.

The transfer foil 203 shown in FIG. 35 includes a transfer material layer 22' and a support body 226 releasably supporting the transfer material layer 22'.

The support body 226 is, for example, a resin film or sheet. The support body 226 is made of, for example, a heat-resistant material such as polyethylene terephthalate (PET). A main surface of the support body 226 supporting the transfer material layer 22' may be provided with, for example, a release layer containing fluorine resin or silicone resin.

The transfer material layer 22' includes the protective layer 227, the intermediate layer 229, the adhesive layer 225, and the image formation layers 220*a* to 220*d*. The protective layer 227, the intermediate layer 229, and the adhesive layer 225 are stacked in this order from the side of the support body 226. The image formation layers 220*a* and 220*d* are interposed between the intermediate layer 229 and the adhesive layer 225. The image formation layers 220*b* and 220*c* are interposed between the intermediate layer 229 and the protective layer 227.

The transfer material layer 22' is entirely or partially used for manufacturing the labeled article 100. The transfer material layer 22' or a part thereof is the same as the image display 22 shown in FIG. 15.

When the labeled article 100 is manufactured, for example, first, an image pickup device is used to shoot a face of a person. Alternatively, a facial image is read from a photoprint. Thus, the image information is obtained as electronic information. This facial image is processed as necessary. Using this image information, the transfer material layer 22' is formed on the support body 226. Subsequently, at least a part of the transfer material layer 22' is thermally transferred from the support body 226 to the article 100'. As described above, the labeled article 100 is obtained.

Third Embodiment

The third embodiment is related to, for example, the following techniques.

(1) An image display transferred from a support body to a substrate, comprising an underlayer releasably supported by the support body and having a light-transmitting property, a first image-displaying portion facing the underlayer and displaying first information about a certain object as a first image of object color, and a second image-displaying portion transferred onto the underlayer by thermal transfer using a thermal head, wherein the second image-displaying portion displays second information about the object as a second image of structural color provided by a relief structure when observed with unaided eyes and displays a microscopic image when observed under magnification, the microscopic image being impossible or difficult to visually recognize when observed with unaided eyes.

(2) The image display according to the item (1), wherein the second image-displaying portion displays a plurality of microscopic images when observed under magnification, the second image-displaying portion includes dot-shaped portions, the center of each of the dot-shaped portions is located on a lattice point of a virtual planar lattice, and the microscopic images are displayed with a pitch of an integral multiple of the pitch of the arrangement of the dot-shaped portions such that each of the microscopic images is located within a region enclosed by an outline of the dot-shaped portion.

(3) The image display according to the item (1) or (2), wherein the microscopic image includes at least one of character and symbol.

(4) The image display according to any one of the items (1) to (3), wherein the size of the character or the symbol is within a range of 1 μm to 300 μm.

(5) The image display according to any one of the items (1) to (4), wherein the object is a person.
(6) The image display according to any one of the items (1) to (5), wherein the first and second images includes the same facial image.
(7) An image display transferred from a support body to a substrate, comprising an underlayer releasably supported by the support body and having a light-transmitting property, a first image-displaying portion facing the underlayer and displaying first information about a certain object as a first image of object color, and a second image-displaying portion transferred onto the underlayer by thermal transfer using a thermal head and including first and second relief structures, wherein the first relief structure displays a first sub-image of structural color when observed in a first direction under particular illumination conditions, and when observed in a second direction different from the first direction under the illumination conditions, the first relief structure does not display the first sub-image or displays the first sub-image darker as compared with the case where observed in the first direction, wherein the second relief structure displays a second sub-image of structural color when observed in the second direction under the illumination conditions, and when observed in the first direction under the illumination conditions, the second relief structure does not display the second sub-image or displays the second sub-image darker as compared with the case where observed in the second direction, and wherein the first sub-image includes a facial image, and the second sub-image includes at least one of character and symbol.
(8) The image display according to the item (7), wherein the second image-displaying portion includes dot-shaped portions, and the center of each of the dot-shaped portions is located on a lattice point of a virtual planar lattice.
(9) The image display according to the item (7) or (8), wherein the first image and the first sub-image include the same facial image.
(10) The image display according to any one of the items (1) to (9), further comprising an adhesive layer that faces the underlayer with the first image display layer interposed therebetween.
(11) A labeled article comprising the image display according to any one of the items (1) to (10), and a substrate onto which the image display is transferred from the support body.
(12) A primary transfer foil used for manufacturing the image display according to the item (1), comprising a first support body, and a first transfer material layer releasably supported by the first support body, wherein the first transfer material layer includes a relief structure displaying an image of structural color and a plurality of patterns each displaying a microscopic image, the microscopic image cannot be visually recognized or is difficult to be visually recognized when observed with unaided eyes but can be visually recognized when observed under magnification.

The effects of the techniques according to the items (1) to (12) will be individually described.

The image display according to the item (1) is an image display transferred from a support body to a substrate, comprising an underlayer releasably supported by the support body, and a second image-displaying portion transferred onto the underlayer by thermal transfer using a thermal head. When the second image-displaying portion is directly formed on the substrate of the labeled article by thermal transfer using a thermal head, it is difficult to achieve high image quality due to roughness of the surface of the substrate. In contrast, in this image display, the second image display layer is not formed on the substrate of the labeled article, but is formed on the underlayer. This second image-displaying portion is transferred onto the substrate of the labeled article together with the underlayer. Thus, the image quality is not greatly affected by the surface roughness of the substrate and the like. Therefore, when this image display is used, the labeled article displaying high quality image can be obtained.

This image display further comprises a first image-displaying portion facing the underlayer and displaying first information about a certain object as a first image of object color. The first image provides better visibility than the second image. Therefore, when the first and second image-displaying portions are used together, the image display can display the image with excellent visibility and the image having special visual effects.

The second image-displaying portion of the image display displays a microscopic image when observed under magnification that cannot be visually recognized or is difficult to be visually recognized when observed with unaided eyes. This process for recording the microscopic images requires high accuracy. Therefore, it is difficult to tamper with the information on this image display. The second image-displaying portion of this image display displays second information about the object as a second image of structural color provided by a relief structure when observed with unaided eyes. It is extremely difficult to tamper with the information displayed as the image of structural color. Further, this image display is adhered to the substrate of the labeled article by thermal transfer. The image display thus adhered to the substrate is easily destroyed when it is released from the substrate. Therefore, when this image display is used, the labeled article that is difficult to be tampered with can be obtained.

In the image display according to the item (2), a plurality of microscopic images are displayed by the second image-displaying portion when the second image-displaying portion is observed under magnification. The second image-displaying portion includes a plurality of dot-shaped portions. The center of each of these dot-shaped portions is located on a lattice point of a virtual planar lattice. These microscopic images are displayed with a pitch of an integral multiple of the pitch of the arrangement of the dot-shaped portions such that each of the microscopic images is located within a region enclosed by an outline of the dot-shaped portion. This configuration is suitable for the process for recording an image by thermal transfer using a thermal head.

In the image display according to the item (3), the microscopic image includes at least one of character and symbol. For example, in the case where the labeled article is a passport, when the microscopic image includes a character string or symbol that indicates an issuing country, an authenticity check can be made on a passport whose authenticity is unknown by confirming this microscopic image. In the case where the labeled article is an ID card, when the microscopic image includes a character string or symbol indicating an affiliation, an authenticity check can be made on an ID card whose authenticity is unknown by confirming this microscopic image.

In the image display according to the item (4), the size of the character or the symbol is within a range of 1 µm to 300 µm. In general, when the size of the characters or symbols is 300 µm or less, it is impossible to discriminate the characters or symbols with unaided eyes. In general, when the size of the characters or symbols is 1 µm or more, the characters or symbols can be discriminated by observing the characters or symbols under magnification using, for example, a magnifying glass or an optical microscope. In particular, in order to manufacture the structure displaying the characters or symbols whose size is within the range of 1 μm to 50 μm with high precision, a high level of technology is required. Therefore, it is difficult to counterfeit the image display, and it is difficult to tamper with information.

In the image display according to the item (5), the object is a person. In other words, the first and second information include personal information of the same person. In this case, it is more difficult to counterfeit the image display, and in addition, the image display can be used for individual authentication.

In the image display according to the item (6), the first and second images include the same facial image. The facial image is suitable for individual authentication. Further, the image display can be verified by, for example, comparing the first and second images.

Like the image display according to the item (1), the image display according to the item (7) comprises an underlayer releasably supported by the support body and a second image-displaying portion transferred onto the underlayer by thermal transfer using a thermal head. Therefore, when this image display is used, the labeled article displaying a high quality image can be obtained.

Like the image display according to the item (1), this image display further comprises a first image-displaying portion. Therefore, this image display can display the image with excellent visibility and the image having special visual effects.

Further, the second image-displaying portion includes first and second relief structures. The first relief structure displays a first sub-image of structural color when observed in a first direction under particular illumination conditions, and when observed in a second direction different from the first direction under the illumination conditions, the first relief structure does not display the first sub-image or displays the first sub-image darker as compared with the case where observed in the first direction. On the other hand, the second relief structure displays a second sub-image of structural color when observed in the second direction under the illumination conditions, and when observed in the first direction under the illumination conditions, the second relief structure does not display the second sub-image or displays the second sub-image darker as compared with the case where observed in the second direction. Therefore, when the observation direction is changed, the image displayed by the second image-displaying portion changes between the first and second sub-images. That is, this image display provides more complicated visual effects.

The process for recording the image causing the above change requires a high level of technology, and it is extremely difficult to tamper with such image. Further, this image display is easily destroyed when it is released from the substrate, like the image display according to the item (1). Therefore, when this image display is used, the labeled article that is difficult to be tampered with can be obtained.

In addition, in this image display, the first sub-image includes a facial image, and the second sub-image includes at least one of character and symbol. The facial image is suitable for individual authentication. In the case where the labeled article is, for example, a passport, when the second sub-image includes a character string or symbol that indicates the issuing country, an authenticity check can be made on a passport whose authenticity is unknown by confirming the second sub-image. In the case where the labeled article is an ID card, when the second-image includes a character string or symbol indicating an affiliation, an authenticity check can be made on an ID card whose authenticity is unknown by confirming the microscopic image.

In the image display according to the item (8), the second image-displaying portion includes a plurality of dot-shaped portions, and each of the centers of these dot-shaped portions is located on a lattice point of a virtual planar lattice. This configuration is suitable for the process for recording an image by thermal transfer using a thermal head.

In the image display according to the item (9), the first image and the first sub-image include the same facial image. The facial image is suitable for individual authentication. Further, the image display can be verified by, for example, comparing the first image and the first sub-image.

The image display according to the item (10) further comprises an adhesive layer that faces the underlayer with the first image display layer interposed therebetween. When the image display is transferred from the support body to the labeled article, the adhesive layer strongly bonds the image display with the substrate. In addition, the adhesive layer makes it difficult to replicate the relief structure.

The labeled article according to the item (11) includes the image display according to any one of the items (1) to (10) and a substrate onto which the image display is transferred from the support body. Therefore, in the labeled article, a high quality image is displayed by the image display, and in addition, it is difficult to tamper with the information recorded on the image display.

The primary transfer foil according to the item (12) is used to manufacture the image display according to the item (1). In this primary transfer foil, the first transfer material layer includes a relief structure displaying an image of structural color and a plurality of patterns each displaying a microscopic image. The microscopic image cannot be visually recognized or is difficult to be visually recognized when observed with unaided eyes but can be visually recognized when observed under magnification. When this primary transfer foil is used, for example, an image formation body can be manufactured according to the following method.

First, a structure including the second support body and the underlayer releasably supported thereby and having a light-transmitting property is prepared. Subsequently, the first and second image-displaying portions are formed on the underlayer. The first image-displaying portion is formed by, for example, printing or transferring process. On the other hand, the second image-displaying portion is formed by thermally transferring a part of the first transfer material layer from the first support body onto the underlayer using a thermal head. In this manner, the second transfer material layer is formed on the underlayer. Thereafter, as necessary, the adhesive layer is formed on the second transfer material layer. As described above, the image display according to the item (1) is obtained.

Subsequently, the third embodiment will be described with reference to drawings.

FIG. 36 is a plan view schematically showing an individual authentication medium according to the third embodiment of the present invention.

The labeled article 100 shown in FIG. 36 is the same as the labeled article 100 described with reference to FIGS. 1 to 5 except that the following features are different.

In other words, in this labeled article 100, a cover sheet 2 displays not only images I1*a*, I1*b* and I2 but also an image I3.

The image I3 is ground tints. The image I3 is an image of object color. For example, combining the image I3 with at least one of the images I1*a* and I1*b* makes it more difficult to tamper with information recorded on the labeled article 100. The image I3 may be omitted.

The image I3 is constituted by, for example, dye or pigments. In this case, the image I3 is formed by thermal transfer recording method using a thermal head, ink jet recording method, electrophotographic method, or a combination of two or more of them. Alternatively, the image I3 can be formed by forming a layer including a heat-sensitive color-producing agent and drawing on this layer with laser beam. Alternatively, a combination of these methods may be used. At least a part of the image I3 may be formed by thermal transfer recording method using a hot stamp, may be formed by printing method, or may be formed using a combination of them.

FIG. 37 is an enlarged plan view showing a part of the image display included in the labeled article of FIG. 36. FIG. 38 is a cross sectional view taken along the line XXXVIII-XXXVIII of the image display shown in FIG. 37. FIG. 39 is an enlarged plan view showing another part of the image display included in the labeled article shown in FIG. 36. FIG. 40 is a cross sectional view taken along the line LX-LX of the image display shown in FIG. 39.

The structure shown in FIGS. 37 and 38 is a part of the cover sheet 2 corresponding to the image I1*a*. On the other hand, the structure shown in FIGS. 39 and 40 is a part of the cover sheet 2 corresponding to the image I1*b*. In FIGS. 38 and 40, the adhesive layer 225 described with reference to FIG. 2 is omitted.

The structure shown in FIGS. 37 to 40 is the same as the structure described with reference to FIGS. 2 to 5 except that the following features are different.

That is, as shown in FIG. 39, in this structure, the dot-shaped portions of the image display layer 220*b* that constitute the pixels or sub-pixels of the image Ib display microscopic images I4. The microscopic image I4 is impossible or difficult to visually recognize when observed with unaided eyes and can be visually recognized when observed under magnification.

Typically, the microscopic image I4 includes at least one of character and symbol. Here, the microscopic image I4 is the character string "TOP".

In the case where the labeled article 100 is a passport, the microscopic image I4 may include a character string or symbol indicating an issuing country. In this case, an authenticity check can be made on a passport whose authenticity is unknown by confirming the microscopic image I4. In the case where the labeled article is an ID card, the microscopic image may include a character string or symbol indicating an affiliation. In this case, an authenticity check can be made on an ID card whose authenticity is unknown by confirming the microscopic image I4.

The size of the character or symbol is within a range of, for example, 1 μm to 300 μm. In general, when the size of the characters or symbols is 300 μm or less, it is not impossible to discriminate the characters or symbols with unaided eyes. In general, when the size of the characters or symbols is 1 μm or more, the characters or symbols can be discriminated by observing the characters or symbols under magnification using, for example, a magnifying glass or an optical microscope. In particular, in order to manufacture the structure displaying the characters or symbols whose size is within the range of 1 μm to 50 μm with high precision, a high level of technology is required. Therefore, it is difficult to counterfeit the image display, and it is difficult to tamper with information.

The microscopic images I4 are arranged with a pitch of an integral multiple of the pitch of the arrangement of the dot-shaped portions constituting the image display layer 220*b*. In this case, the microscopic images I4 are arranged with the same pitch as the pitch of the arrangement of the dot-shaped portions. The pitch of the arrangement of the microscopic images I4 may not be an integral multiple of the pitch of the arrangement of the dot-shaped portions constituting the image display layer 220*b*.

It should be noted that the image display layer 220*a* shown in FIGS. 37 and 38 are patterned. However, the image display layer 220*a* may not be patterned. In other words, the image display layer 220*a* may be a continuous film. In this case, the image display layer 220*a* can be formed by forming a layer including a heat-sensitive color-producing agent and drawing on this layer with laser beam.

Subsequently, a manufacturing method for manufacturing the labeled article and the structure of the image display layer 220*b* according to the third embodiment will be described with reference to FIGS. 41 to 44.

Figure 41:
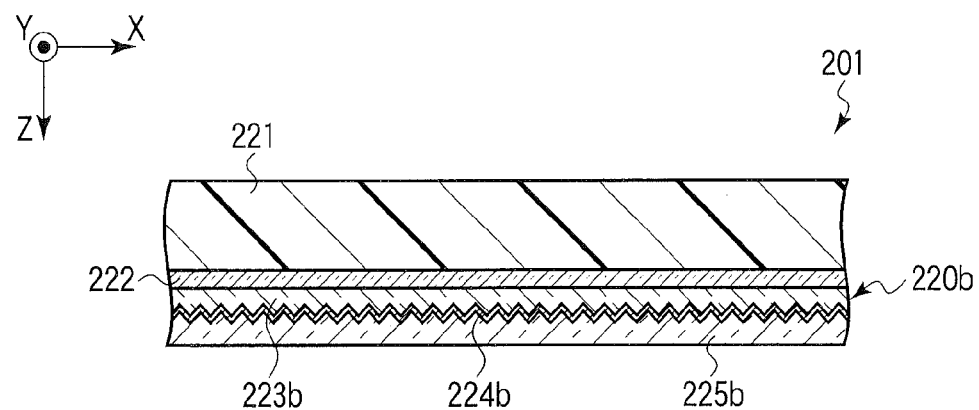
FIG. 41 is a cross sectional view schematically showing an example of a primary transfer foil that can be used for manufacturing the labeled article shown in FIGS. 36 to 40.
Figure 42:
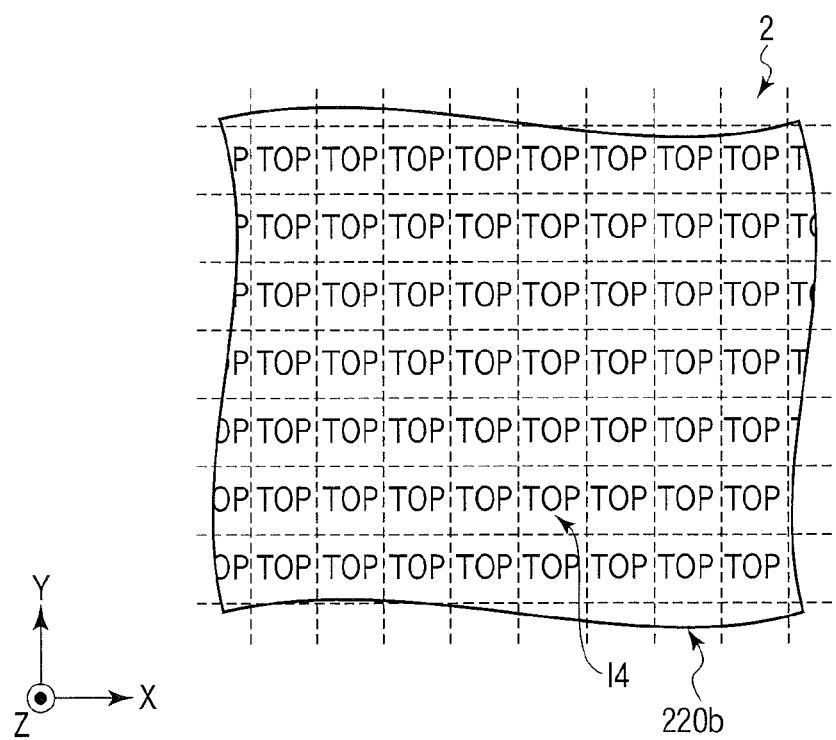
FIG. 42 is a plan view schematically showing an example of a structure that can be employed in the primary transfer foil shown in FIG. 41.
Figure 43:
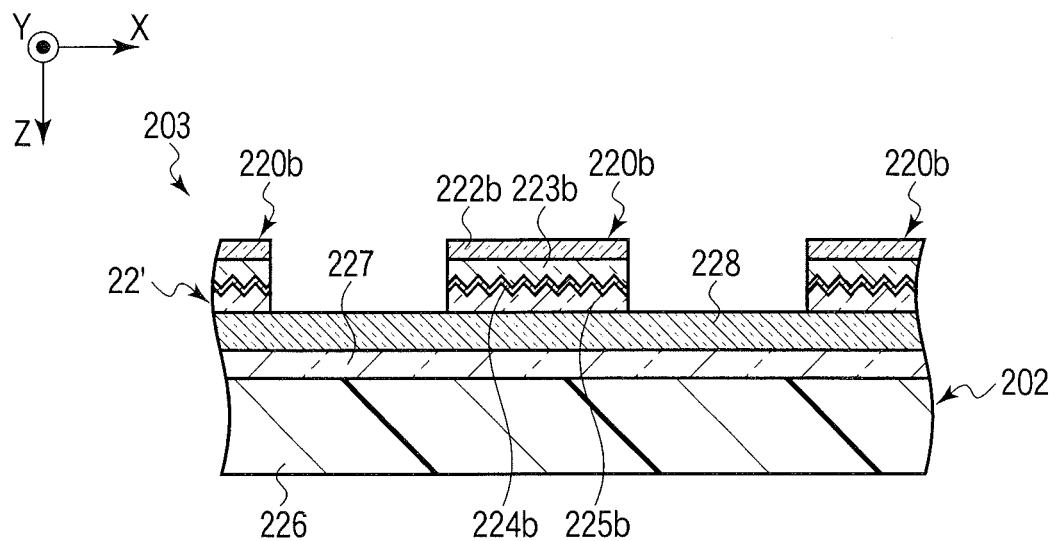
FIG. 43 is a cross sectional view schematically showing an example of a secondary transfer foil that can be manufactured using the primary transfer foil shown in FIG. 41.
Figure 44:
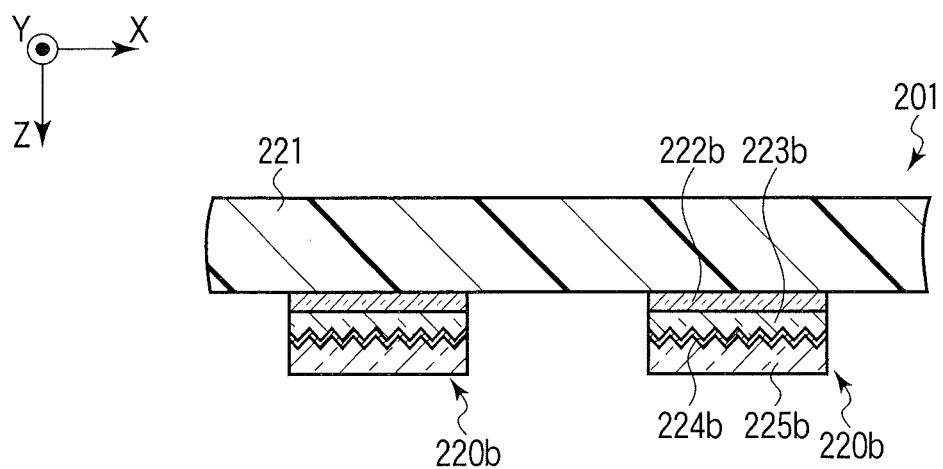
FIG. 44 is a cross sectional view schematically showing an example of a used primary transfer foil.

FIG. 41 is a cross sectional view schematically showing an example of a primary transfer foil that can be used for manufacturing the labeled article shown in FIGS. 36 to 40. FIG. 42 is a plan view schematically showing an example of a structure that can be employed in the primary transfer foil shown in FIG. 41. FIG. 43 is a cross sectional view schematically showing an example of a secondary transfer foil that can be manufactured using the primary transfer foil shown in FIG. 41. FIG. 44 is a cross sectional view schematically showing an example of a used primary transfer foil.

The primary transfer foil 201 shown in FIGS. 41 and 42 is, for example, a transfer ribbon. As shown in FIG. 41, the transfer foil 201 includes a support body 221 and a transfer material layer 220*b* releasably supported by the support body 221.

The support body 221 is, for example, a resin film or sheet. The support body 221 is made of, for example, a material having heat-resistant property such as polyethylene terephthalate. A main surface of the support body 221 supporting the transfer material layer 220*b* may be provided with, for example, a release layer containing fluorine resin or silicone resin.

The transfer material layer 220*b* includes a release layer 222*b*, a relief structure formation layer 223*b*, a reflection layer 224*b*, and an adhesive layer 225*b*. A part of the transfer material layer 220*b* is used as the image display layer 220*b* shown in FIGS. 39 and 40.

The release layer 222*b* is formed on the support body 221. The release layer 222*b* plays a role of stabilizing the release of the transfer material layer 220*b* from the support body 221 as well as a role of promoting the adhesion of the image display layer 220*b* to the cover sheet main body 21. The release layer 222*b* has a light-transmitting property, and is transparent in a typical case. The release layer 222*b* is made of, for example, thermoplastic resin. The release layer 222*b* may be omitted.

The relief structure formation layer 223*b*, the reflection layer 224*b*, and the adhesive layer 225*b* are formed in this order on the release layer 222*b*. The relief structure formation layer 223*b*, the reflection layer 224*b*, and the adhesive layer 225*b* are the same as those described with reference to FIG. 5. Here, as an example, the relief structure formation layer 223*b* is assumed to be a transparent layer having a relief structure arranged on the surface thereof as a diffraction structure.

The microscopic images I4 shown in FIG. 42 is recorded on the transfer material layer 220*b*. When the diffraction structure is formed on the surface of the relief structure formation layer 223b, the microscopic images I4 can be recorded by, for example, forming different diffraction structures in the region corresponding to the microscopic image I4 and in the other region. For example, when the diffraction grating is formed, the microscopic images I4 can be recorded by changing one or more of lengthwise direction, pitch, and depth of the groove among these regions. Alternatively, the microscopic images I4 may be recorded by, for example, forming the diffraction structure in only one of the regions corresponding to the microscopic images I4 and the other regions. In this case, the region in which no diffraction structure is formed may be flat, or may be formed with light-scattering structure.

The microscopic image I4 may be recorded by forming a print pattern. This print pattern is provided, for example, between the reflection layer 223b and the adhesive layer 225b or on the adhesive layer 225b. Alternatively, when the reflection layer 223b has a light-transmitting property, this print pattern may be provided between the release layer 222b and the relief structure formation layer 223b or between the relief structure formation layer 223b and the reflection layer 224.

When the labeled article 100 is manufactured, for example, first, an image pickup device is used to shoot a face of a person. Alternatively, a facial image is read from a photoprint. Thus, the image information is obtained as electronic information. This facial image is processed as necessary.

Subsequently, the laminated body 202 shown in FIG. 43 is prepared. This laminated body 202 is a layer having a multilayer structure, and includes a support body 226 and also includes a release protective layer 227 and a resin layer 228 formed thereon in this order. The multilayer structure formed on the support body 226 constitutes an underlayer. The support body 226 releasably supports this underlayer.

The support body 226 may be, for example, those mentioned for the support body 221.

The release protective layer 227 plays a role of stabilizing the release of the transfer material layer 22', which includes the release protective layer 227, the resin layer 228, and the image display layer 220b, from the support body 226 and a role of protecting the image display layer 220b from being damaged. The release protective layer 227 may be, for example, those mentioned for the release layer 222b. When the resin layer 228 has a function of a release layer, the release protective layer 227 can be omitted.

The resin layer 228 has a light-transmitting property, and is transparent in a typical case. The resin layer 228 plays a role of giving sufficient strength to the above underlayer. The material of the resin layer 228 may be, for example, thermosetting resin, photo-curable resin, or thermoplastic resin. When a thermosetting resin is used, this resin layer 228 can be used as an adhesive layer for bonding the image display 22 to the cover sheet main body 21.

The resin layer 228 may include at least one of hologram and diffraction grating as a diffraction structure. For example, a relief structure may be provided as a diffraction structure on the surface of the resin layer 228. In this case, the image displayed by this diffraction structure and the image I1b displayed by the image display layer 220b are superposed on each other or arranged side by side.

The laminated body 202 may further include a patterned metal reflection layer such as an opaque metal reflection layer. For example, a patterned metal reflection layer may be provided on the resin layer 228 or between the release protective layer 227 and the resin layer 228, and dots, line screen, other figures, or a combination thereof may be displayed on this metal reflection layer. Such pattern can be used for, for example, the authenticity check of the image display 22 or the labeled article 100.

Subsequently, the image display layer 220b having the pattern corresponding to the above facial image is formed on the laminated body 202. More specifically, based on the above image information, a part of the transfer material layer 220b is thermally transferred from the support body 221 shown in FIG. 41 onto the resin layer 228 shown in FIG. 43 as the image display layer 220b. This thermal transfer is performed using a thermal head in such a manner that a part of the transfer material layer 220b thermally transferred onto the resin layer 228 has the pattern corresponding to the above facial image. As a result, the secondary transfer foil 203 including the support body 226, the release protective layer 227, the resin layer 228, and the image display layer 220b is obtained. The secondary transfer foil 203 is, for example, a transfer ribbon.

The image display layer 220b thus obtained is formed by thermal transfer using a thermal head, and therefore, in a typical case, it includes a plurality of dot-shaped portions shown in FIGS. 39 and 40. The center of each of these dot-shaped portions is located on a lattice point of a virtual planar lattice indicated by broken lines in FIG. 39.

In FIG. 39, the above planar lattice is a square lattice. However, the planar lattice may be other lattices such as a triangular lattice and a rectangular lattice. In FIG. 39, dot-shaped portions juxtaposed to each other are arranged such that the outlines thereof are in contact with each other at one point. In other words the diameter of each dot-shaped portion is equal to the minimum center-to-center distance of the dot-shaped portions. The adjacent dot-shaped portions may be placed away from each other. In other words, the diameter of each dot-shaped portion may be smaller than the minimum center-to-center distance of the dot-shaped portions. Alternatively, the adjacent dot-shaped portions may be arranged as if they partially overlap each other. In other words, the diameter of each dot-shaped portion may be larger than the minimum center-to-center distance of the dot-shaped portions.

The diameter of the dot-shaped portion or the minimum center-to-center distance of the dot-shaped portions is within a range of, for example, 0.085 to 0.508 mm (about 300 to about 50 dots per inch). When the facial image is displayed by the image display layer 220b, the diameter of the dot-shaped portion or the minimum center-to-center distance of the dot-shaped portions is within a range of, for example, 0.085 to 0.169 mm (about 300 to about 150 dots per inch). When this size is increased, it is difficult to display a high-resolution image on the image display layer 220a. When this size is reduced, the reproducibility of the patterned shape of the image display layer 220b decreases.

As shown in FIG. 8, in the used primary transfer foil 201, a part of the transfer material layer 220b remains as a negative pattern of the image display layer 220b shown in FIG. 43. This negative pattern can be used to check up the image display layer 220b.

In addition to forming the image display layer 220b on the release protective layer 227 using a part of the primary transfer foil 201, a pattern indicating the non-biometric personal information and history information such as date and time at which the image display layer 220b are formed may be thermally transferred onto a separately-prepared substrate using another part of the primary transfer foil 201. As a result, the used primary transfer foil 201 can be utilized not only for checkup of the image display layer 220b but also for checkup of other information.

Before the image display layer 220b is formed, another layer may be formed on the resin layer 228 or between the release protective layer 227 and the resin layer 228. For example, on the resin layer 228 or between the release protective layer 227 and the resin layer 228, a reflection layer, hologram and/or diffraction grating, or both of them may be formed.

This reflection layer may be a continuous film, or may be patterned. In the latter case, the pattern of the reflection layer may be dots, line screens, figures, or a combination thereof. This reflection layer may have a light-transmitting property, or may be opaque. Typically, this hologram and/or diffraction grating has optical characteristics different from those of the hologram and/or diffraction grating included in the diffraction structure formation layer 223.

The image display layer 220a shown in FIGS. 37 and 38 is further formed on the resin layer 228 or between the release protective layer 227 and the resin layer 228. When the image display layer 220a is formed on the resin layer 228, the image display layer 220a may be formed before the image display layer 220b is formed on the resin layer 228, or may be formed on the resin layer 228 after the image display layer 220b is formed on the resin layer 228.

When the image display layer 220a is formed by thermal transfer method, sublimation transfer method or hot-melt transfer method may be employed. Alternatively, both of them may be employed. The image displayed by the image display layer 220a may be a monochrome image or a color image. In the latter case, the image display layer 220a can be obtained by, for example, using one or more ink ribbons to form colored layers in four colors, i.e., yellow, magenta, cyan, and black, or form colored layers in three colors, i.e., red, green, and blue.

A layer (not shown) displaying the image I3 shown in FIG. 1 may be further formed on the resin layer 228 or between the release protective layer 227 and the resin layer 228. When the layer displaying the image 13 is formed on the resin layer 228, this layer may be formed before the image display layer 220b is formed on the resin layer 228, or may be formed after the image display layer 220b is formed on the resin layer 228. Alternatively, the layer displaying the image I3 may be formed on the cover sheet main body 21 instead of forming it on the resin layer 228 or between the release protective layer 227 and the resin layer 228. The layer displaying the image I3 may be formed by, for example, the same method as that described for the image display layer 220a.

Subsequently, a part of the transfer material layer formed on the support body 226 that is used as the image display 22 is thermally transferred from the support body 226 onto the cover sheet main body 21 shown in FIGS. 38 and 40. This thermal transfer uses, for example, hot stamp. Instead of thermal transfer using the hot stamp, thermal transfer may be performed using a heat roll or a thermal head. As described above, the image display 22 is adhered to the cover sheet main body 21.

The layer displaying the image I3 may be formed on the cover sheet main body 21 as described above. An adhesive anchor layer may be formed on the cover sheet main body 21 in order to enhance the adhesion strength.

When it is difficult to bond the image display 22 to the cover sheet main body 21 with high adhesion strength, and the image display layer 220a is formed after the image display layer 220b is formed, an ink ribbon additionally having a function of an adhesion ribbon may be used. In this case, it is not necessary to use an adhesion ribbon in addition to the ink ribbon.

As described above, after the image display 22 is thermally transferred onto the cover sheet main body 21, necessary steps are appropriately carried out. In this manner, the labeled article 100 described with reference to FIGS. 36 to 40 is obtained.

In this method, the image display layer 220b is formed by thermal transfer using a thermal head. The precision that can be achieved with use of a thermal head is higher than the precision that can be achieved by printing of pearl pigment.

When the image display layer 220b is directly formed on the cover sheet main body 21 by thermal transfer using a thermal head, it is difficult to achieve high image quality due to roughness of the surface of the cover sheet main body 21. In contrast, in the above method, the image display layer 220a is not directly formed on the cover sheet main body 21. In other words, in this method, first, the image display layer 220a is formed on the release protective layer 227, and thereafter, transferred onto the cover sheet main body 21 together with the release protective layer 227. Therefore, the image quality is not greatly affected by the surface roughness of the cover sheet main body 21 and the like.

Therefore, according to this method, high quality image can be displayed by the image display layer 220b.

This image display 22 displays a piece of personal information using the hologram and/or diffraction grating. It is extremely difficult to tamper with the personal information, in particular biometric information, displayed by the hologram and/or the diffraction grating.

In this method, the image display 22 is supported by the cover sheet main body 21 by thermal transfer. Such image display 22 is easily destroyed when it is released from the cover sheet main body 21. Therefore, it is difficult to tamper with information on this labeled article 100.

Subsequently, a modification of the labeled article 100 described with reference to FIGS. 36 to 39 will be described.

FIG. 45 is a plan view schematically showing an example of a diffraction structure that can be employed in the image display of the labeled article shown in FIGS. 36 to 39. FIG. 46 is a plan view schematically showing an example of a diffraction structure that can be used in combination with the diffraction structure shown in FIG. 45. FIG. 47 is a plan view schematically showing an example of an arrangement of the diffraction structure shown in FIGS. 45 and 46.

In A labeled article 100 according to the modification, an image display layer 220b includes sub-pixels $CO_R$ and $CO_L$. The sub-pixels $CO_R$ and $CO_L$ have the same structure as the structure described with reference to FIG. 9.

The pixel group including the sub-pixels $CO_R$ displays a first sub-image as a diffraction image when observed in a first direction under particular illumination conditions, and when observed in a second direction different from the first direction under the illumination conditions, the pixel group does not display the first sub-image as a diffraction image or displays the first sub-image as a diffraction image darker as compared with the case where observed in the first direction. Here, the pixel group including the sub-pixels $CO_R$ emits diffracted light in the right direction.

The pixel group including the sub-pixels $CO_L$ displays a second sub-image as a diffraction image when observed in a second direction under the above illumination conditions, and when observed in the first direction under the illumination conditions, the pixel group does not display the second sub-image as the diffraction image or displays the second sub-image as a diffraction image darker as compared with the case where observed in the second direction. Here, the pixel group including the sub-pixels $CO_L$ emits diffracted light in the left direction.

In this modification, different images are displayed by the pixel group including the sub-pixels $CO_L$ and the pixel group including the sub-pixels $CO_L$ as described later. For example, the facial image is displayed by one of the pixel groups, and an image other than the facial image such as characters and symbols is displayed by the other of the pixel groups. In this case, the observer perceives different images when observing in the first direction and when observing in the second direction.

It should be noted that the grooves G are curved in the sub-pixels $CO_R$ and $CO_L$ shown in FIGS. 45 and 46. The grooves G may be in straight shape. However, the grooves G in curved shape provide a viewing zone wider than that provided by the grooves G in straight shape. Therefore, in the former case, when observed in a particular direction, both of the first and second images can be seen.

In FIG. 47, a row including sub-pixels $CO_R$ and a row including sub-pixels $CO_L$ are arranged alternately. The arrangement of the sub-pixels $CO_R$ and $CO_L$ may be different from that shown in FIG. 47.

FIG. 48 is a plan view schematically showing another example of an arrangement of the diffraction structure shown in FIGS. 45 and 46.

In FIG. 48, the sub-pixels $CO_R$ and $CO_L$ are alternately arranged in each of the X direction and the Y direction. In other words, the arrangement of the sub-pixels $CO_R$ and $CO_L$ forms a checkered pattern.

As above, various arrangements can be employed for the sub-pixels $CO_R$ and $CO_L$.

FIG. 49 is a plan view schematically showing an example of an image display that employs the arrangement shown in FIG. 48. FIG. 50 is a plan view schematically showing an image displayed by the image display shown in FIG. 49. FIG. 51 is a plan view schematically showing another image displayed by the image display shown in FIG. 49.

In FIG. 49, the sub-pixels $CO_R$ are arranged in a circle, and the sub-pixels $CO_L$ are arranged in a cross shape. As shown in FIG. 50, when the image display 22 is observed in the right direction, the circular pattern displayed by the pixel group including the sub-pixels $CO_R$ can be seen as a diffraction image. On the other hand, as shown in FIG. 51, when the image display 22 is observed in the left direction, the cross-shaped pattern displayed by the pixel group including the sub-pixels $CO_L$ can be seen as a diffraction image. As shown in FIG. 49, when the image display 22 is observed in the front direction, both of the circular pattern and the cross-shaped pattern can be seen as a diffraction image.

FIG. 52 is a plan view schematically showing an example of an image that can be displayed by an image display employing the arrangement shown in FIG. 48. FIG. 53 is a plan view schematically showing another example of an image display that employing the arrangement shown in FIG. 48. FIG. 54 is a plan view schematically showing still another example of an image display that employing the arrangement shown in FIG. 48.

The image I1b1 shown in FIG. 52 is, for example, an image displayed by the pixel group including the sub-pixels $CO_R$. The image I1b2 shown in FIG. 53 is, for example, an image displayed by the pixel group including the sub-pixels $CO_L$. Here, the image I1b1 is a facial image, and the image I1b2 is a microscopic image constituted by a character string "JAPAN". The size of each character constituting the image I1b2 is, for example, 300 µm or more. That is, each character constituting the image I1b2 can be seen with unaided eyes.

In the case of employing this configuration, when the image display 22 is observed in the right direction, the facial image I1b1 shown in FIG. 52 can be seen. On the other hand, when the image display 22 is observed in the left direction, the character string 11b2 shown in FIG. 53 can be seen. When the image display 22 is observed in the front direction, the image I1b3 shown in FIG. 54 can be seen. In other words, the image I1b3 obtained by superposing the facial image I1b1 shown in FIG. 52 and the character string 11b2 shown in FIG. 53 on each other can be seen.

Therefore, in the case where the labeled article 100 is, for example, a passport and the microscopic image I1b2 includes a character string or symbol displaying an issuing country, authenticity check can be made on a passport whose authenticity is unknown by confirming this microscopic image I1b2. In the case where the labeled article 100 is an ID card and the microscopic image I1b2 includes a character string or symbol indicating an affiliation, an authenticity check can be made on an ID card whose authenticity is unknown by confirming this microscopic image I1b2.

Here, as an example, the relief structure is described as a diffraction grating. However, other relief structures such as hologram and light-scattering structure having anisotropic light-scattering property may be used instead of the diffraction grating. Even in such cases, the viewing zone for the image to be displayed can be limited. Therefore, the observer can perceives different images by changing the observation direction.

Fourth Embodiment

The fourth embodiment is related to, for example, the following techniques.

(1) An image display including pixel groups each including pixels, wherein each of the of pixels includes grooves having the same lengthwise directions and emitting at least one of a diffracted light and a scattered light having directivity when irradiated with illumination light, the lengthwise directions of the pixels being the same in each of the pixel groups, the pixel groups being different in the lengthwise directions, the pixel groups displaying respective sub-images, and the sub-images have different sizes and have the same shape.

(2) The image display according to the item (1), wherein the grooves are in curved shape.

(3) The image display according to the item (2), wherein the maximum value of the angles that tangents to the grooves in one of the pixel groups form with a reference direction parallel to the display surface is equal to the minimum value of the angles that tangents to the grooves in another of the pixel groups form with the reference direction.

(4) The image display according to any one of the items (1) to (3), wherein the center positions of the sub-images are the same.

(5) The image display according to any one of the items (1) to (3), wherein the center positions of the sub-images are different.

(6) The image display according to any one of the items (1) to (5), wherein three or more pixel groups are provided, and the sizes of the three or more pixel groups are in relationship of arithmetic progression.

(7) The image display according to any one of the items (1) to (6), wherein the sub-images are images including personal information.

(8) The image display according to the item (7), wherein the image including the personal information is a facial image.

(9) The image display according to any one of the items (1) to (8), comprising a first image-displaying portion that displays first information about a certain object as a first image of object color, and a second image-displaying portion that displays second information about the object as a second image of structural color provided by a relief structure, wherein the second image-displaying portion includes the pixel groups.

(10) A labeled article comprising the image display according to any one of the items (1) to (9), and a substrate supporting the image display.

(11) The labeled article according to the item (10), wherein the labeled article is an individual authentication medium.

The effects of the techniques according to the items (1) to (11) will be individually described.

In the image display according to the item (1), each pixel includes grooves whose lengthwise directions are the same and which emit at least one of a diffracted light and a scattered light having directivity when irradiated with illumination light. The color of the image displayed by the diffracted light changes according to the observation direction. On the other hand, the brightness of the image displayed by the scattered light having directivity changes according to the observation direction.

In each pixel group, the pixels have the same lengthwise direction of the grooves. The pixel groups are different from each other in the lengthwise directions of the grooves and display respective sub-images. These sub-images have different sizes and have the same shape. When this configuration is employed, a motion picture can be displayed using one original image. Specifically, when the observation direction is changed, the size of the image changes.

In this manner, this image display provides special visual effects. In addition, it is extremely difficult to tamper with the information displayed by the structure providing this visual effect.

In the image display according to the item (2), the grooves are in curved shape. The grooves in curved shape provide a viewing zone wider than that provided by grooves in straight shape. Therefore, in the former case, the image can change more smoothly than in the latter case.

In the image display according to the item (3), the maximum value of the angles that tangents to the grooves in one of the pixel groups form with a reference direction parallel to the display surface is equal to the minimum value of the angles that tangents to the grooves in another of the pixel groups form with the reference direction. When this configuration is employed, the image changes more smoothly.

In the image display according to the item (4), the center positions of the sub-images are the same. In the case of employing this configuration, when the observation direction is changed, the image appears to move in the forward or backward direction.

In the image display according to the item (5), the center positions of the sub-images are different. In the case of employing this configuration, when the observation direction is changed, the image appears to move in a diagonal direction with respect to the display surface.

The image display according to the item (6) has three or more pixel groups. The sizes of the pixel groups are in relationship of arithmetic progression. In this case, the image can change more smoothly than in a case where the number of pixel groups is two.

In the image display according to the item (7), sub-images are images including personal information. In this case, it is difficult to counterfeit the image display, and in addition, the image display can be used for individual authentication.

In the image display according to the item (8), the image including the personal information is a facial image. The facial image is suitable for individual authentication.

The image display according to the item (9) comprises a first image-displaying portion that displays first information about a certain object as a first image of object color, and a second image-displaying portion that displays second information about the object as a second image of structural color provided by a relief structure. The second image-displaying portion includes the pixel groups. The first image of object color has excellent visibility.

The labeled article according to the item (10) includes the image display according to any one of the items (1) to (9), and a substrate supporting the image display. Therefore, in the labeled article, high quality image is displayed by the image display, and in addition, it is difficult to tamper with the information recorded on the image display.

The labeled article according to the item (11) is an individual authentication medium. Since the individual authentication medium includes the above image display, the individual authentication medium achieves excellent anti-counterfeiting effects.

Subsequently, the fourth embodiment will be described with reference to drawings.

A labeled article according to the fourth embodiment is the same as the labeled article 100 according to the first embodiment except that the labeled article according to the fourth embodiment employs a configuration capable of displaying a moving image as an image I1*b*. First, a principle for displaying the moving image will be described.

Figure 57:
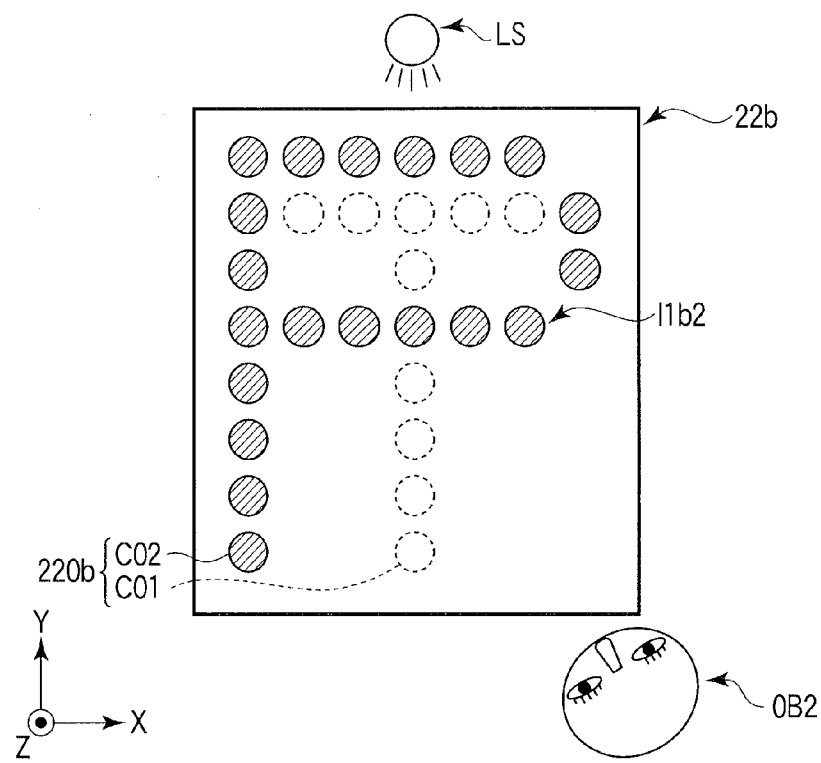
FIG. 57 is a plan view schematically showing another image displayed by the image display shown in FIG. 55.

FIG. 55 is a plan view schematically showing an example of an image display that employs a configuration similar to an image display according to the fourth embodiment of the present invention. FIG. 56 is a plan view schematically showing one of the images displayed by the image display shown in FIG. 55. FIG. 57 is a plan view schematically showing another image displayed by the image display shown in FIG. 55.

The image display 22*b* shown in FIG. 55 is the same as a part of the image display 22 described with reference to FIGS. 1 to 5 that corresponds to the image I1*b* except that it employs the following configuration. That is, in this image display 22*b*, the image display layer 220*b* includes the sub-pixels CO1 and CO2. Each of the sub-pixels CO1 and CO2 has the same structure as the dot-shaped portion described with reference to FIGS. 4 and 5. The region around the sub-pixels CO1 and CO2 have different visual effect from the sub-pixels CO1 and CO2. Here, as an example, each sub-pixels CO1 and CO2 is assumed to include diffraction grating.

The sub-pixels CO1 and CO2 are different in the lengthwise direction of the grooves of the diffraction grating. Here, as an example, the lengthwise direction of the grooves of the diffraction grating included in the sub-pixel CO1 is assumed to be parallel to the X direction. In addition, in this case, for example, the lengthwise direction of the groove of the diffraction grating included in the sub-pixel CO2 forms an angle of 30° in the counterclockwise direction with respect to the X direction. In FIG. 55, each of the sub-pixels CO1 and CO2 is depicted as a circle. However, the sub-pixels CO1 and CO2 may have other shapes such as a square or rectangular shape.

When this image display 22*b* is illuminated with the diffuse light emitted by the light source LS, the sub-pixel CO1 emits the diffracted light with the highest intensity in a direction perpendicular to the X direction. Also, in this case, the sub-pixel CO2 emits the diffracted light with the highest intensity in a direction perpendicular to an axis that forms an angle of 30° in the counterclockwise direction with respect to the X direction.

Therefore, as shown in FIG. 56, the observer OB1 who observes the image display 22b in a direction perpendicular to the X direction perceives the sub-image I1b1 displayed by the first pixel group including the sub-pixels CO1. In this case, the observer OB1 perceives a character "T".

On the other hand, as shown in FIG. 57, an observer OB2 who observes the image display 22b in a direction perpendicular to the axis that forms the angle of 30° in the counterclockwise direction with respect to the X direction perceives the sub-image I1b2 displayed by the second pixel group including the sub-pixels CO2. In this case, the observer OB2 perceives a character "P".

Figure 58:
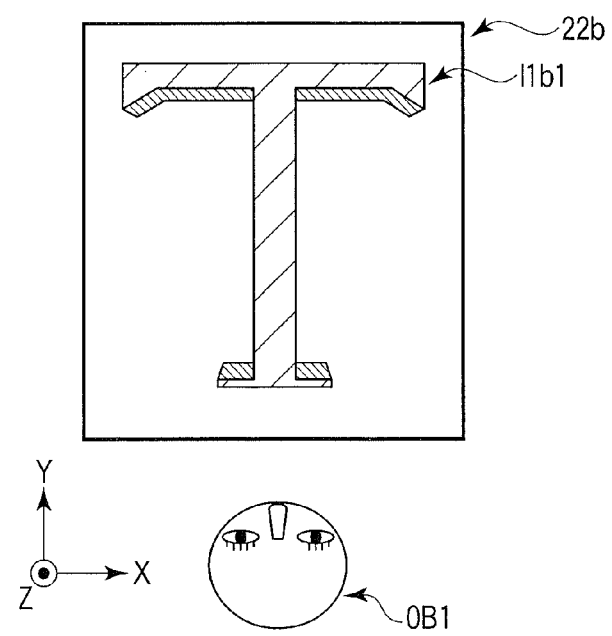
FIG. 58 is a plan view schematically showing one of the images that can be displayed when the image display shown in FIG. 55 employs more complicated structure.

FIG. 58 is a plan view schematically showing one of the images that can be displayed when the image display shown in FIG. 55 employs more complicated structure. FIG. 59 is a plan view schematically showing another image that can be displayed by the image display displaying the image shown in FIG. 58. FIG. 60 is a plan view schematically showing another image that can be further displayed by the image display displaying the image shown in FIG. 58.

FIGS. 58 to 60 show first to third sub-images displayed by the image display 22b in which the image display layer 220b includes first to third sub-pixels.

The first to third sub-pixels are different in the lengthwise direction of the grooves of the diffraction grating. Here, as an example, the lengthwise direction of the groove of the diffraction grating included in the first sub-pixels is assumed to be parallel to the X direction. In addition, in this case, for example, the lengthwise direction of the groove of the diffraction grating included in the second sub-pixels forms an angle of 30° in the counterclockwise direction with respect to the X direction. Further, in this case, for example, the lengthwise direction of the grooves of the diffraction grating included in the third sub-pixels forms an angle of 60° in the counterclockwise direction with respect to the X direction.

In this case, as shown in FIG. 58, the observer OB1 who observes the image display 22b in the direction perpendicular to the X direction perceives the first sub-image I1b1 displayed by the first pixel group including the first sub-pixels. In this case, as shown in FIG. 59, the observer OB2 who observes the image display 22b in the direction perpendicular to the axis that forms the angle of 30° in the counterclockwise direction with respect to the X direction perceives the second sub-image I1b2 displayed by the second pixel group including the second sub-pixels. Further, in this case, as shown in FIG. 60, an observer OB3 who observes the image display 22b in a direction perpendicular to an axis that forms an angle of 60° in the counterclockwise direction with respect to the X direction perceives the third sub-image I1b3 displayed by the third pixel group including the third sub-pixels.

FIG. 61 is a plan view schematically showing an example of an arrangement of a diffraction structure that can be employed in the image display displaying the image shown in FIGS. 58 to 60. FIG. 62 is a plan view schematically showing another example of an arrangement of a diffraction structure that can be employed in the image display displaying the image shown in FIGS. 58 to 60. FIG. 63 is a plan view schematically showing still another example of an arrangement of a diffraction structure that can be employed in the image display displaying the image shown in FIGS. 58 to 60.

In the arrangement shown in FIG. 61, the first sub-pixels CO1 form a plurality of rows each extending in the Y direction and arranged in the X direction. The second sub-pixels CO2 form a plurality of rows each extending in the Y direction and arranged in the X direction. The third sub-pixels CO3 form a plurality of rows each extending in the Y direction and arranged in the X direction. The row of the first sub-pixels CO1, the row of the second sub-pixels CO2, and the row of the third sub-pixels CO3 are arranged in this order in the X direction.

In the arrangement shown in FIG. 62, the first sub-pixels CO1 form a plurality of rows each extending in the X direction and arranged in the Y direction. The second sub-pixels CO2 form a plurality of rows each extending in the X direction and arranged in the Y direction. The third sub-pixels CO3 form a plurality of rows each extending in the X direction and arranged in the Y direction. The row of the first sub-pixels CO1, the row of the second sub-pixels CO2, and the row of the third sub-pixels CO3 are arranged in this order in the Y direction.

In the arrangement shown in FIG. 63, the first sub-pixels CO1 form a plurality of rows each extending in a diagonal direction inclined with respect to the X direction and arranged in the Y direction. The second sub-pixels CO2 form a plurality of rows each extending in the above diagonal direction and arranged in the Y direction. The third sub-pixels CO3 form a plurality of rows each extending in the above diagonal direction and arranged in the Y direction. The row of the first sub-pixels CO1, the row of the second sub-pixels CO2, and the row of the third sub-pixels CO3 are arranged in this order in the Y direction.

Figure 64:
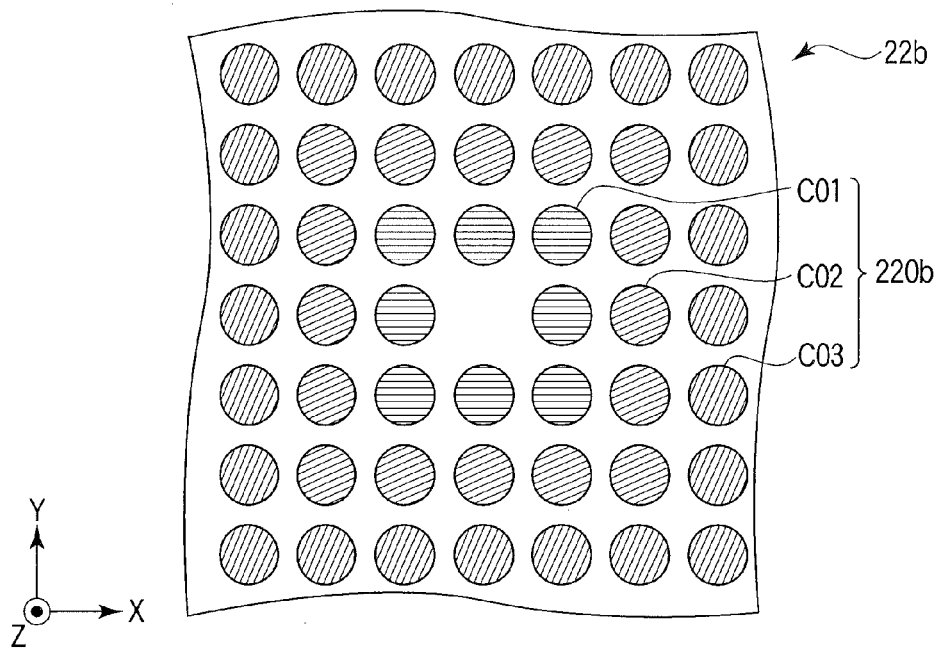
FIG. 64 is a plan view schematically showing an example of a structure that can be employed in the image display of the labeled article according to the fourth embodiment of the present invention.
Figure 65:
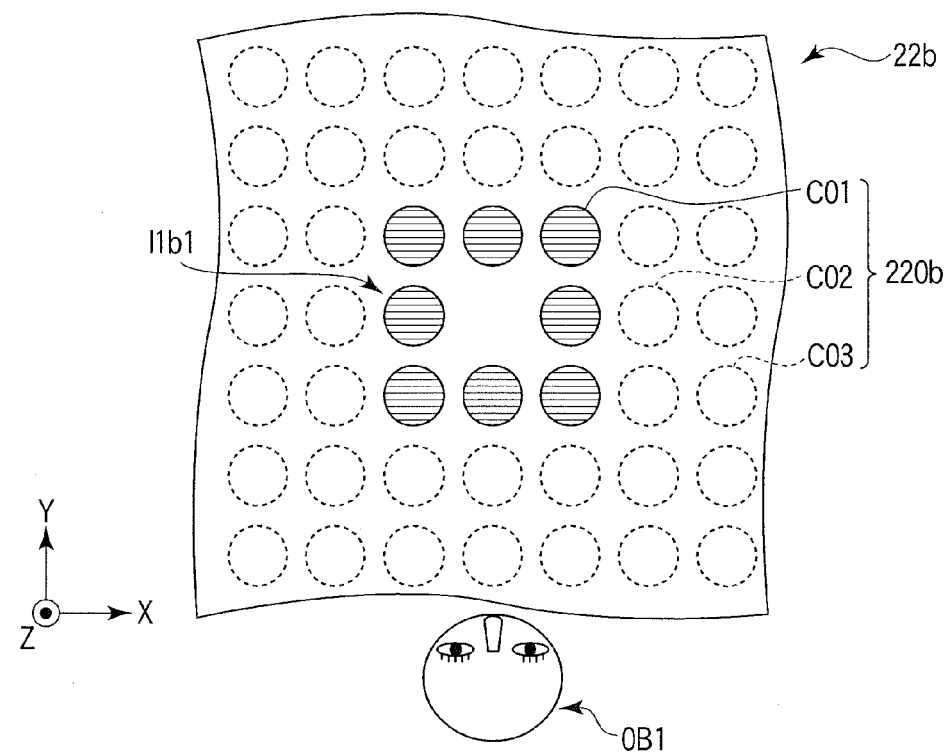
FIG. 65 is a plan view schematically showing one of the images displayed by the image display shown in FIG. 64.
Figure 66:
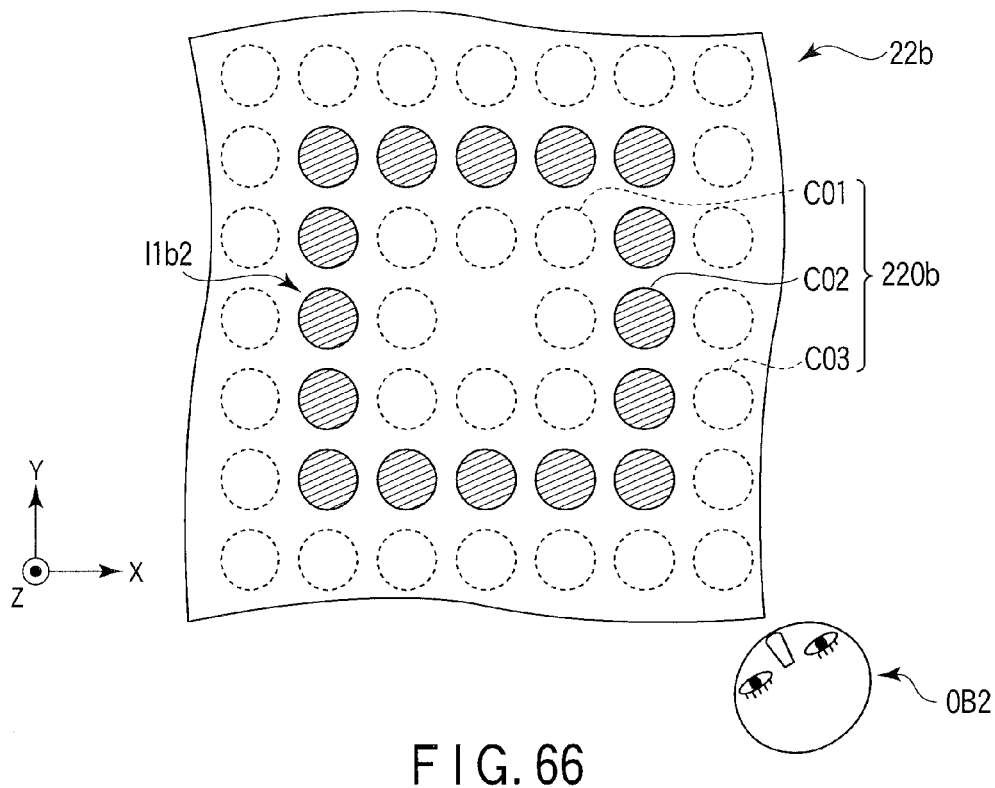
FIG. 66 is a plan view schematically showing another image displayed by the image display shown in FIG. 64.
Figure 67:
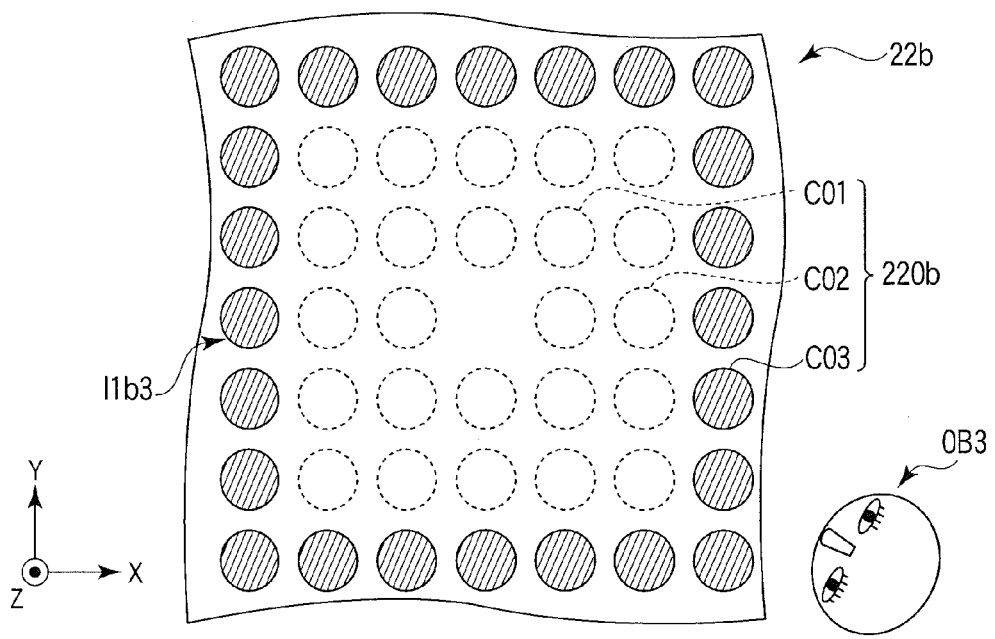
FIG. 67 is a plan view schematically showing still another image displayed by the image display shown in FIG. 64.

FIG. 64 is a plan view schematically showing an example of a structure that can be employed in the image display of the labeled article according to the fourth embodiment of the present invention. FIG. 65 is a plan view schematically showing one of the images displayed by the image display shown in FIG. 64. FIG. 66 is a plan view schematically showing another image displayed by the image display shown in FIG. 64. FIG. 67 is a plan view schematically showing still another image displayed by the image display shown in FIG. 64.

The structure shown in FIG. 64 includes the first sub-pixels CO1, the second sub-pixels CO2, and the third sub-pixels CO3 described with reference to FIGS. 58 to 63.

The first sub-pixels CO1 are arranged in a quadrilateral form. The first pixel group including the first sub-pixels CO1 forms a first pattern.

The second sub-pixels CO2 are arranged in a quadrilateral form. The second pixel group including the second sub-pixels forms a second pattern. The second pattern surrounds the first pattern. The center positions of the first and second patterns are the same.

The third sub-pixels CO3 are arranged in a quadrilateral form. The third pixel group including the third sub-pixels forms a third pattern. The third pattern surrounds the second pattern. The center positions of the second and third patterns are the same.

As shown in FIG. 65, when this configuration is employed, the observer OB1 who observes the image display 22b in a direction perpendicular to the X direction perceives the first sub-image I1b1 displayed by the first pixel group including the first sub-pixels CO1. In this case, as shown in FIG. 66, the observer OB2 who observes the image display 22b in a direction perpendicular to the axis that forms an angle of 30° in the counterclockwise direction with respect to the X direction perceives the second sub-image I1b2 displayed by the second pixel group including the second sub-pixels CO2. Further, in this case, as shown in FIG. 67, the observer OB3 who observes the image display 22b in a direction perpendicular to an axis that forms an angle of 60° in the counterclockwise direction with respect to the X direction perceives the third sub-image I1b3 displayed by the third pixel group including the third sub-pixels CO3.

The sub-images I1b1 to 11b3 have a quadrilateral shape and have different sizes. Specifically, the sub-image I1b2 is larger than the sub-image I1b1. The sub-image I1b3 is larger than the sub-image I1b2.

When the angle that the orthogonal projection of the observation direction on the XY plane forms with the X direction (hereinafter, referred to as "azimuth angle of the observation direction" or "azimuth angle") is changed from −90° to −60° while the angle of the observation direction with respect to the Z direction is kept constant, the image perceived by the observer is changed from the sub-image I1b1 to the sub-image 11b2. When the azimuth angle of the observation direction is further changed from −60° to −30° while the angle of the observation direction with respect to the Z direction is kept constant, the image perceived by the observer changes from the sub-image I1b2 to the sub-image I1b3. In other words, by rotating the observation direction about the axis parallel to the Z direction, the image perceived by the observer changes in the order of the sub-image I1b1, the sub-image I1b2, and then the sub-image I1b3, or changes in the order of the sub-image I1b3, the sub-image I1b2, and then the sub-image I1b1. Since the sub-images I1b1, 11b2, and 11b3 are geometrically similar, the observer can perceive the above change of the images as a motion picture. In this case, the center positions of the sub-images I1b1 to 11b3 are the same, and therefore, when the azimuth angle of the observation direction is changed, the image perceived by the observer appears to come closer to the observer, or appears to move away from the observer.

Figure 70:
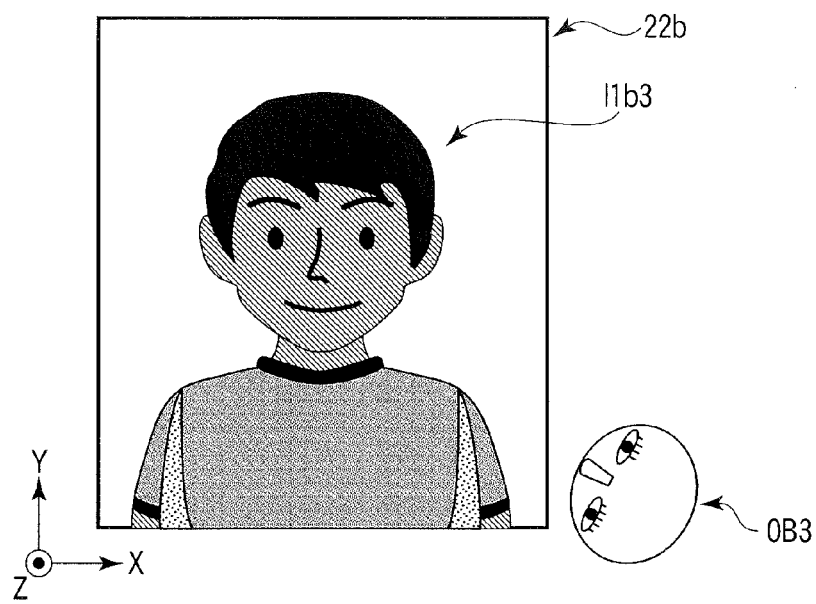
FIG. 70 is a plan view schematically showing still another image that can be displayed by the image display displaying the image shown in FIG. 68.

FIG. 68 is a plan view schematically showing an example of an image that can be displayed when the image display of the labeled article according to the fourth embodiment of the present invention employs another structure. FIG. 69 is a plan view schematically showing another image that can be displayed by the image display displaying the image shown in FIG. 68. FIG. 70 is a plan view schematically showing still another image that can be displayed by the image display displaying the image shown in FIG. 68.

In the structure described with reference to FIGS. 65 to 67, the sub-pixels CO1 to CO3 are arranged so that quadrilateral shape sub-images are displayed. When the number of sub-pixels CO1 to CO3 increases, more complicated sub-images can be displayed. For example, as shown in FIGS. 65 to 67, facial images can be displayed as the sub-images I1b1 to 11b3.

It should be noted that three original images corresponding to the sub-images I1b1 to 11b3 are needed to manufacture the image display 22b displaying the sub-images I1b1 to 11b3 shown in FIGS. 58 to 60. These original images are generated using, for example, computer graphics. Then, based on these original images, the arrangement of the sub-pixels CO1 to CO3 is determined.

On the other hand, in order to manufacture the image display 22b displaying the sub-images I1b1 to 11b3 shown in FIGS. 68 to 70, only one type of original image corresponding to one of the sub-images I1b1 to 11b3 is necessary. Since the sub-images I1b1 to 11b3 are different only in the sizes, the arrangement of the sub-pixels CO1 to CO3 can be determined based on the single original image. In this case, when the original image is obtained by taking a picture, this makes it unnecessary to generate the image using computer graphics.

The center positions of the sub-images I1b1 to 11b3 shown in FIGS. 68 to 70 are the same. Therefore, when the azimuth angle of the observation direction is changed, the image perceived by the observer appears to come closer to the observer, or appears to move away from the observer.

The sizes of the sub-images I1b1 to 11b3 are, for example, in relationship of numerical sequence.

The sizes of the sub-images I1b1 to 11b3 may be in relationship of arithmetic progression. That is, the size of the pixel group including the sub-pixels CO1, the size of the pixel group including the sub-pixels CO2, and the size of the pixel group including the sub-pixels CO3 may be in relationship of arithmetic progression. For example, the size of the sub-image I1b1 is set at 50% of the size of the sub-image I1b3, and the size of the sub-image I1b2 is set at 75% of the size of the sub-image I1b3.

In this case, when the azimuth angle of the observation direction is changed at a constant rate, the image perceived by the observer appears, for example, to come closer to the observer at a constant velocity. Alternatively, when the azimuth angle of the observation direction is changed at a constant rate, the image appears to move away from the observer at a constant velocity.

The sizes of the sub-images I1b1 to 11b3 may be in relationship of geometric progression. That is, the size of the pixel group including the sub-pixels CO1, the size of the pixel group including the sub-pixels CO2, and the size of the pixel group including the sub-pixels CO3 may be in relationship of geometric progression.

In this case, when the azimuth angle of the observation direction is changed at a constant rate, the image perceived by the observer appears to, for example, come closer to the observer at a constant acceleration. Alternatively, when the azimuth angle of the observation direction is changed at a constant rate, the image appears to move away from the observer at a constant acceleration.

In the above image display 22, the grooves of the diffraction grating included in the sub-pixel may have curved shapes. In this case, as described below, the image can change more smoothly as compared with the case where the grooves of the diffraction grating have straight shapes.

Figure 71:
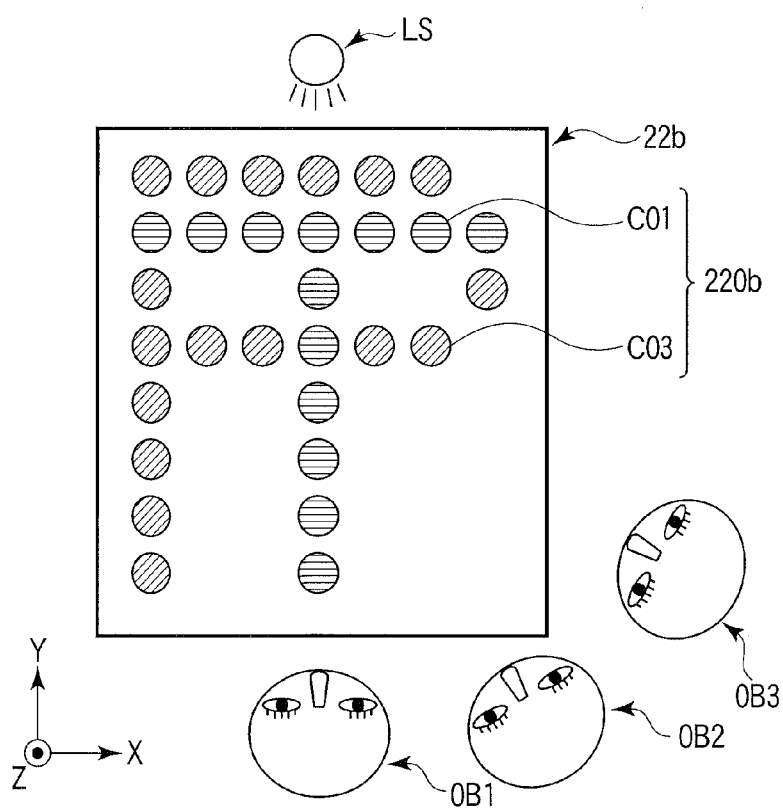
FIG. 71 is a view schematically showing an example of conditions that allow images to be perceived when the grooves of the diffraction grating have straight shapes.

FIG. 71 is a view schematically showing an example of conditions under that allow images to be perceived when the grooves of the diffraction grating have straight shapes.

The image display 22b shown in FIG. 71 includes the sub-pixels CO1 and CO3 described with reference to FIGS. 61 to 63. The grooves of the diffraction gratings included in the sub-pixels CO1 have straight shapes whose lengthwise directions are parallel to the X direction. On the other hand, the grooves of the diffraction gratings included in the sub-pixels CO1 have straight shapes whose lengthwise directions forms an angle of 60° in the counterclockwise direction with respect to the X direction.

When this configuration is employed, an observer OB1 who observes the image display 22b in a direction perpendicular to the X direction perceives a sub-image displayed by the pixel group including the sub-pixels CO1, character "T" here. In this case, an observer OB3 who observes the image display 22b in a direction perpendicular to an axis that forms an angle of 60° in the counterclockwise direction with respect to the X direction perceives a sub-image displayed by the pixel group including the sub-pixels CO3, character "P" here. However, an observer OB2 who observes the image display 22b in a direction perpendicular to the axis that forms the angle of 30° in the counterclockwise direction with respect to the X direction hardly perceives or does not perceive the sub-images.

Figure 72:
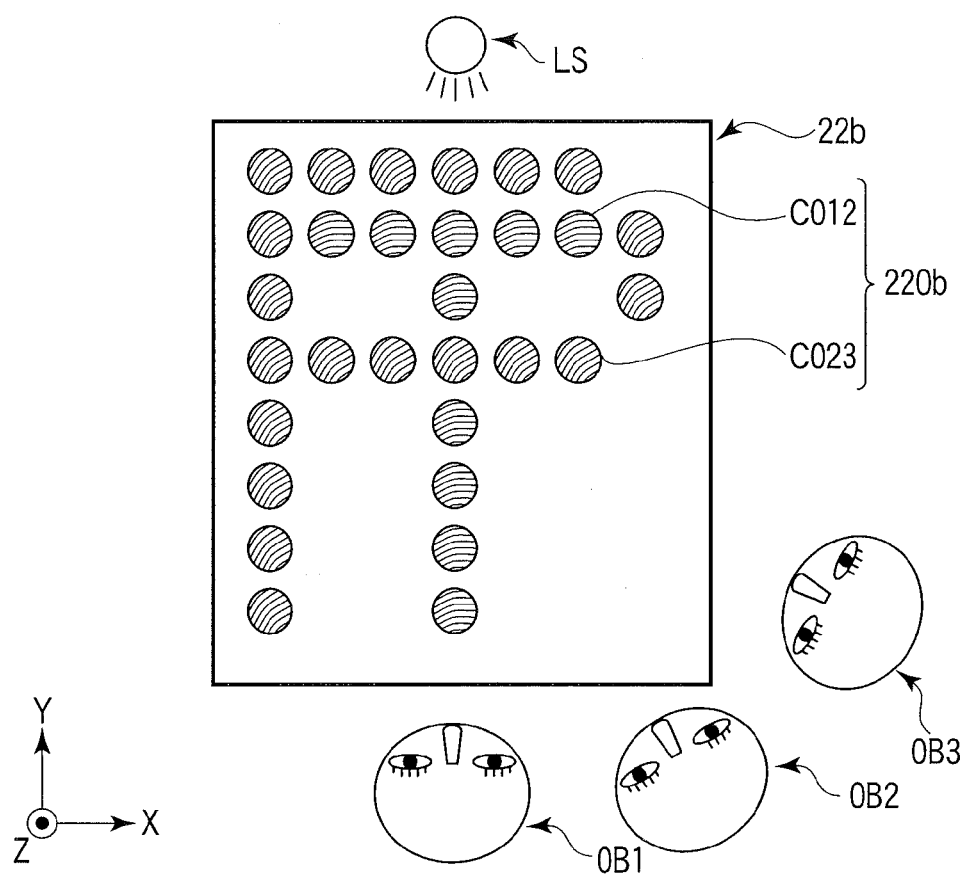
FIG. 72 is a view schematically showing an example of conditions that allow images to be perceived when the grooves of the diffraction grating are curved lines.
Figure 73:
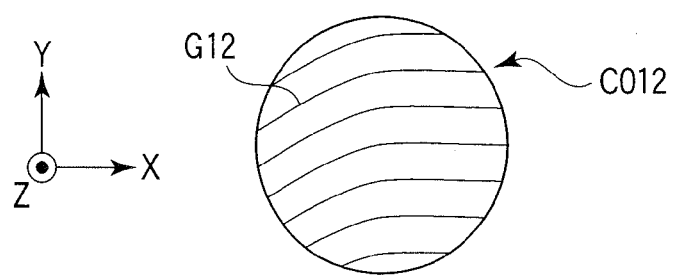
FIG. 73 is an enlarged plan view showing one of the diffraction structures included in the image display shown in FIG. 72.
Figure 74:
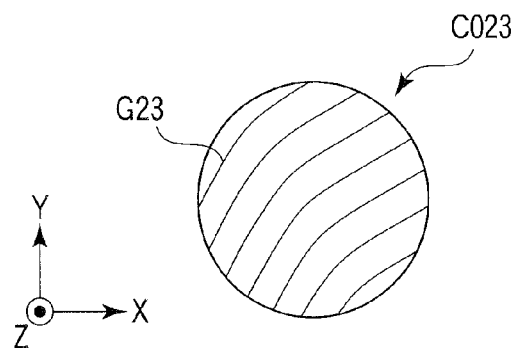
FIG. 74 is an enlarged plan view showing another diffraction structure included in the image display shown in FIG. 72.

FIG. 72 is a view schematically showing an example of conditions that allow images to be perceived when the grooves of the diffraction grating are curved lines. FIG. 73 is an enlarged plan view showing one of the diffraction structures included in the image display shown in FIG. 72. FIG. 74 is an enlarged plan view showing another diffraction structure included in the image display shown in FIG. 72.

The image display 22b shown in FIG. 72 includes sub-pixels CO12 and CO23. The sub-pixels CO12 and CO23 are the same as the sub-pixels CO1 and CO3 except that the grooves of the diffraction gratings have different shapes.

As shown in FIG. 73, each of the grooves G12 of the diffraction gratings included in the sub-pixels CO12 has a curved shape. The grooves G12 are arranged in parallel to each other. The angle that a tangent to the groove G12 forms with the X direction continuously changes from 0° to 30°. Therefore, the sub-pixel CO12 emits diffracted light with relatively high intensity over the entire range of the azimuth angle from −90° to −60°.

As shown in FIG. 74, each of the grooves G23 of the diffraction gratings included in the sub-pixels CO23 has a curved shape. The grooves G23 are arranged in parallel to each other. The angle that a tangent to the groove G23 forms with the X direction continuously changes from 30° to 60°. Therefore, the sub-pixel CO23 emits diffracted light with relatively high intensity over the entire range of the azimuth angle from −60° to −30°.

As described above, the grooves of the diffraction grating in curved shapes provides wider viewing zone than grooves in straight shapes. Therefore, the image is less likely to be perceived by the observer, or the range of the azimuth angle in which the image is not perceived can be reduced. In particular, when the maximum value of the angles that the tangents to the groove G12 form with the X direction is substantially equal to the minimum value of the angles that the tangents to the groove G23 form with the X direction, the range of the azimuth angle in which a plurality of images are seen to overlap each other can be set at substantially zero, and the range of the azimuth angle in which the observer hardly perceives or does not perceive the image can be set at substantially zero.

The image display 22 described with reference to FIGS. 72 to 74 can be modified in various forms.

Figure 75:
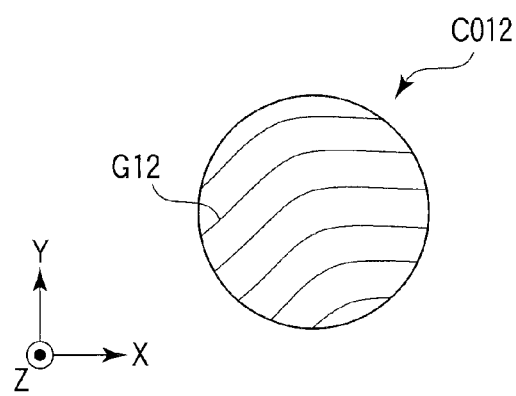
FIG. 75 is an enlarged plan view showing one of the diffraction structures that can be included in the image display according to a modification.
Figure 76:
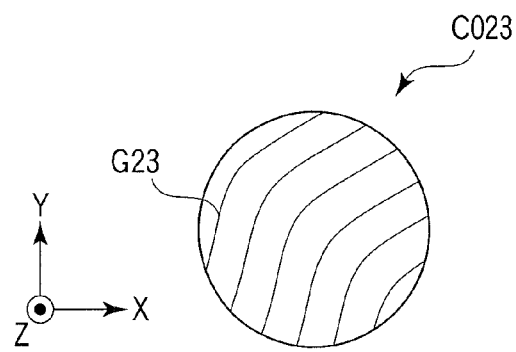
FIG. 76 is an enlarged plan view showing another diffraction structure that can be included in the image display including the diffraction structure shown in FIG. 75.

FIG. 75 is an enlarged plan view showing one of the diffraction structures that can be included in the image display according to a modification. FIG. 76 is an enlarged plan view showing another diffraction structure that can be included in the image display including the diffraction structure shown in FIG. 75.

In the sub-pixel CO12 shown in FIG. 75, each of the grooves G12 of the diffraction grating has a curved shape. The grooves G12 are arranged in parallel to each other. The angle that a tangent to the groove G12 forms with the X direction continuously changes from 0° to 45°. Therefore, the sub-pixel CO12 emits diffracted light with relatively high intensity over the entire range of the azimuth angle from −90° to −45°.

In the sub-pixel CO23 shown in FIG. 76, each of the grooves G23 of the diffraction grating has a curved shape. The grooves G23 are arranged in parallel to each other. The angle that a tangent to the groove G23 forms with the X direction continuously changes from 30° to 75°. Therefore, the sub-pixel CO23 emits diffracted light with relatively high intensity over the entire range of the azimuth angle from −60° to −15°.

Therefore, within the range of the azimuth angle from −60° to −45°, both of the image displayed by the sub-pixels CO12 and the image displayed by the sub-pixels CO23 are perceived. The images are seen to overlap each other within the range of the azimuth angle from −60° to −45°.

Figure 79:
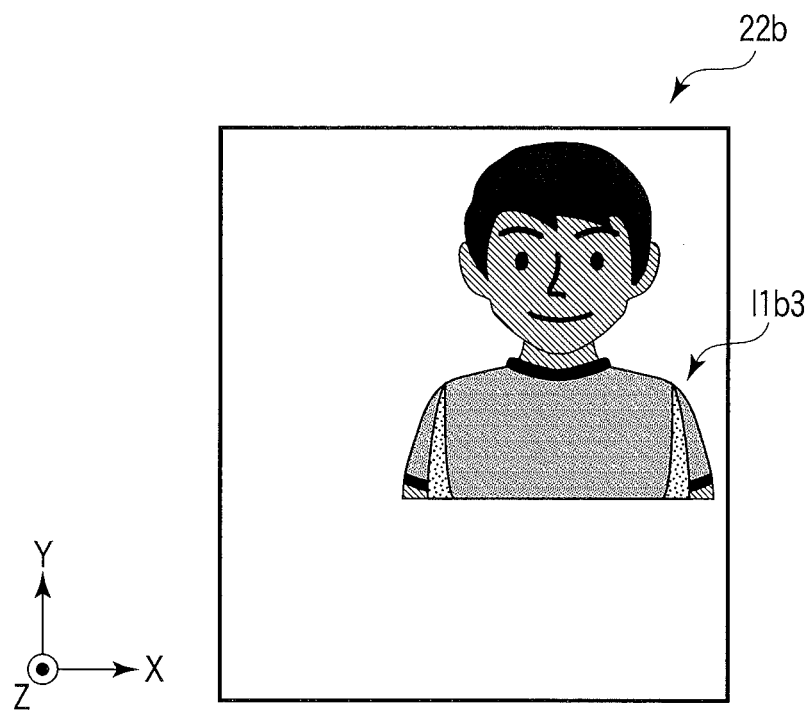
FIG. 79 is a plan view schematically showing another image that can be further displayed by the image display displaying the image shown in FIG. 77.

FIG. 77 is a plan view schematically showing one of the images that can be displayed by the image display according to another modification. FIG. 78 is a plan view schematically showing another image that can be displayed by the image display displaying the image shown in FIG. 77. FIG. 79 is a plan view schematically showing another image that can be further displayed by the image display displaying the image shown in FIG. 77.

The image display according to the modification is the same as the image display described with reference to FIGS. 68 to 70 except that the sub-images I1b1 to 11b3 are configured to have centers at different positions. That is, in the image display according to the modification, the pixel group including the sub-pixels CO1, the pixel group including the sub-pixels CO2, and the pixel group including the sub-pixels CO3 have centers at different positions. For example, the center of the sub-image I1b2 is located in the middle between the center of the sub-image I1b1 and the center of the sub-image I1b3. In this case, when the azimuth angle of the observation direction is changed, the image perceived by the observer appears to come diagonally closer to the observer, or appears to move diagonally away from the observer.

A first vector from the center of the sub-image I1b1 to the center of the sub-image I1b2 may be the same as or different from a second vector from the center of the sub-image I1b2 to the center of the sub-image I1b3. In the latter case, the first and second vectors may have the same senses and different magnitudes. Alternatively, the first and second vectors may have different senses and the same magnitudes. Alternatively, the first and second vectors may have different senses and different magnitudes.

For example, when the magnitudes of the first and second vectors are the same, and the azimuth angle of the observation direction is changed at a constant rate, the image perceived by the observer appears to be moving at a constant velocity in one or more directions perpendicular to the Z direction. When the magnitudes of the first and second vectors are different, and the azimuth angle of the observation direction is changed at a constant rate, the movement of the image perceived by the observer in one or more directions perpendicular to the Z direction appears to be decelerating or accelerating.

For the sake of simplicity, described above were cases where the image display layer 220b includes three kinds or less sub-pixels. As exemplified below, the image display layer 220b may be constituted by more kinds of sub-pixels.

The image display 22b similar to the one described with reference to FIGS. 68 to 70 was manufactured. Here, the image display layer 220b included first to eighth sub-pixels below. Each of the first to eighth sub-pixels had a square shape of side 42 μm and included a diffraction grating with curved grooves.

The first sub-pixel was designed to emit diffracted light with relatively high intensity over the entire range of the azimuth angle from −112.88° to −107.16°. The second sub-pixel was designed to emit diffracted light with relatively high intensity over the entire range of the azimuth angle from −107.16 to −101.44°. The third sub-pixel was designed to emit diffracted light with relatively high intensity over the entire range of the azimuth angle from −101.44° to −95.72°. The fourth sub-pixel was designed to emit diffracted light with relatively high intensity over the entire range of the azimuth angle from −95.72° to −90°. The fifth sub-pixel was designed to emit diffracted light with relatively high intensity over the entire range of the azimuth angle from −90° to −84.28°. The sixth sub-pixel was designed to emit diffracted light with relatively high intensity over the entire range of the azimuth angle from −84.28° to −78.56°. The seventh sub-pixel was designed to emit diffracted light with relatively high intensity over the entire range of the azimuth angle from −78.56° to −72.84°. The eighth sub-pixel was designed to emit diffracted light with relatively high intensity over the entire range of the azimuth angle from −72.84° to −67.12°.

The first sub-pixels were arranged to display a facial image as a first sub-image. The second sub-pixels are arranged to display a second sub-image with a size 1.05 times larger than the first sub-image and having a center at the same position as that of the first sub-image. The third sub-pixels were arranged to display a third sub-image with a size 1.10 times larger than the first sub-image and having a center at the same position as that of the first sub-image. The fourth sub-pixels were arranged to display a fourth sub-image with a size 1.15 times larger than the first sub-image and having a center at the same position as that of the first sub-image. The fifth sub-pixels were arranged to display a fifth sub-image with a size 1.20 times larger than the first sub-image and having a center at the same position as that of the first sub-image. The sixth sub-pixels were arranged to display a sixth sub-image with a size 1.25 times larger than the first sub-image and having a center at the same position as that of the first sub-image. The seventh sub-pixels were arranged to display a seventh sub-image with a size 1.30 times larger than the first sub-image and having a center at the same position as that of the first sub-image. The eighth sub-pixels were arranged to display an eighth sub-image with a size 1.35 times larger than the first sub-image and having a center at the same position as that of the first sub-image.

When this image display 22b was observed while the azimuth angle of the observation direction was changed, the facial image appeared to come closer or appeared to move away.

Here, as an example, the diffraction grating is shown as the relief structure. However, other relief structures such as hologram and light-scattering structure having anisotropic light-scattering property may be used instead of the diffraction grating. Even in such cases, the viewing zone of the image to be displayed can be limited. Therefore, the observer can see a moving image by changing the observation direction.

The techniques described in the first to the fourth embodiments can be combined with each other. Some of matters described in a certain embodiments may be replaced with matters described in another embodiment.

In the first to the fourth embodiments, a passport is described as an example of a labeled article. The techniques described above can also be applied to an individual authentication medium other than the passport. For example, the above technique can also be applied to an accreditation card used in an event such as Olympic and to a credit card.

The size of the labeled article is not limited. When the labeled article is used for the individual authentication, it is desirable to easily carry the labeled article. The size of an accreditation card used in an event such as Olympic is, for example, about 95 mm×about 150 mm. The size of the data page of the passport is, for example, about 125 mm×about 88 mm. The size of the credit card is, for example, about 86 mm×about 54 mm.

The shape of the article supporting the image display is not limited. However, in general, this article includes a layer as a booklet or card substrate includes. The thickness of this layer is, for example, within a range of 20 μm to 2,000 μm. Typically, the thickness of this layer is within a range of 50 μm to 1,000 μm.

The image display can be supported by, for example, a paper such as plain paper, coated paper, and synthetic paper. The synthetic paper is a layer including, for example, plastics such as polystyrene and polypropylene and an inorganic filler such as calcium carbonate. Alternatively, the synthetic paper is a composite material including such a layer and a plain paper.

The image display may be supported by a layer made of plastics such as polyvinyl chloride, polyethylene terephthalate, and polyethylene naphthalate. Alternatively, the image display may be supported by a layer made of ceramics.

A region of the surface of the article that supports the image display may have a single color throughout the entire region. Alternatively, this region may include a plurality of sub-regions having colors different from each other. In view of the visibility of the image displayed by the image display, the above region may be applied with white color using white pigment such as titanium white, magnesium carbonate, zinc oxide, barium sulfate, silica, talc, clay, or calcium carbonate.

The above technique can be used for authentication other than the individual authentication. In other words, the above technique may be used for authentication of a living body other than a human, or may be used for authentication other than a living body. For example, the above technique can be used for authentication other than a human such as animals, plants, bacteria, security, industrial products, agricultural products, marine foods, or art objects.

The above technique can also be used for purposes other than the authentication. For example, the labeled article or the image display can be used as toys, ornaments, or learning materials.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A labeled article comprising:
  an image display; and
  a substrate supporting the image display,
  wherein the image display comprises:
  a first image-displaying portion that displays first information about a certain object as a first image of object color;
  a second image-displaying portion that displays second information about the object as a second image of structural color provided by a relief structure, the relief structure including at least one structure selected from the group consisting of diffraction grating and hologram; and
  an underlayer, the second image-displaying portion being provided on the underlayer, wherein
  a reflection layer is formed on at least a part of a surface of the relief structure, the reflection layer being made of metal, metal oxide, or intermetallic compound,
  the second image-displaying portion is made of a plurality of dot-shaped portions arranged in a two-dimensional manner, the object is a person, the first image includes a facial image of the person, and the second image includes a same facial image as the facial image included in the first image, and each of the dot-shaped portions includes:
- a relief structure formation layer facing the underlayer and having the relief structure on a surface thereof that faces the underlayer,
- the reflection layer at least partially covering the relief structure, and
- an adhesive layer interposed between the reflection layer-slayer and the underlayer.

2. The labeled article according to claim 1, wherein the labeled article is an individual authentication medium.

* * * * *

UNITED STATES PATENT AND TRADEMARK OFFICE
CERTIFICATE OF CORRECTION

PATENT NO. : 9,931,883 B2  
APPLICATION NO. : 15/385273  
DATED : April 3, 2018  
INVENTOR(S) : Satoshi Gocho et al.

Page 1 of 1

It is certified that error appears in the above-identified patent and that said Letters Patent is hereby corrected as shown below:

On the Title Page

Item [54] (Title), Line 2:  
Delete "DEVICE" and insert -- ARTICLE --, therefore.

In the Specification

Column 1, Line 1:  
Delete "DEVICE" and insert -- ARTICLE --, therefore.

In the Claims

Column 63, Line 12:  
In Claim 1, delete "layer-slayer" and insert -- layer --, therefore.

Signed and Sealed this  
Thirty-first Day of July, 2018

Andrei Iancu  
*Director of the United States Patent and Trademark Office*